US012541513B1

(12) United States Patent
James et al.

(10) Patent No.: US 12,541,513 B1
(45) Date of Patent: Feb. 3, 2026

(54) QUERY MODIFICATION USING PARTITIONED DATASETS

(71) Applicant: Cisco Technology, Inc., San Jose, CA (US)

(72) Inventors: Alexander D. James, Sammamish, WA (US); Ankur Dalsukhbhai Bambharoliya, Bellevue, WA (US); Venkatasubramanian Jayaraman, Issaquah, WA (US); Salih Ammar Wajih Zainulabdeen, Seattle, WA (US); Timothy David Pavlik, Seattle, WA (US); Aditya Tammana, Barcelona (ES)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/429,234

(22) Filed: Jan. 31, 2024

Related U.S. Application Data

(60) Provisional application No. 63/482,533, filed on Jan. 31, 2023.

(51) Int. Cl.
  *G06F 17/00* (2019.01)
  *G06F 7/00* (2006.01)
  *G06F 16/2453* (2019.01)
  *G06F 16/2458* (2019.01)
  *G06F 16/27* (2019.01)

(52) U.S. Cl.
  CPC .... *G06F 16/24542* (2019.01); *G06F 16/2471* (2019.01); *G06F 16/278* (2019.01)

(58) Field of Classification Search
  CPC .......... G06F 16/24542; G06F 16/2471; G06F 16/278
  USPC ....................................................... 707/718
  See application file for complete search history.

(56) References Cited

U.S. PATENT DOCUMENTS

| 1,097,010 | A | 5/1914 | Draver |
| 7,937,344 | B2 | 5/2011 | Baum et al. |
| 8,112,425 | B2 | 2/2012 | Baum et al. |
| 8,510,538 | B1 | 8/2013 | Malewicz et al. |
| 8,751,529 | B2 | 6/2014 | Zhang et al. |
| 8,788,525 | B2 | 7/2014 | Neels et al. |

(Continued)

OTHER PUBLICATIONS

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

(Continued)

*Primary Examiner* — Pavan Mamillapalli
(74) *Attorney, Agent, or Firm* — Shook, Hardy & Bacon L.L.P.

(57) ABSTRACT

Systems and methods are disclosed for modifying a query using partitioned datasets. A query system may receive a query that includes a data field identifier and identifies a set of data to be processed. The system may use the query to identify a partitioned dataset that is associated with the query and identify partitions of the partitioned dataset that include a data field that satisfies the data field identifier. The query system may use the identified partitions to modified the query to include filter criteria that includes a partition identifier for the identified partitions.

20 Claims, 18 Drawing Sheets

(56) References Cited

U.S. PATENT DOCUMENTS

| | | | |
|---|---|---|---|
| 8,886,647 B2* | 11/2014 | Uppala | G06F 16/245 |
| | | | 707/812 |
| 9,215,240 B2 | 12/2015 | Merza et al. | |
| 9,286,413 B1 | 3/2016 | Coates et al. | |
| 10,127,258 B2 | 11/2018 | Lamas et al. | |
| 10,235,417 B1 | 3/2019 | Sterin | |
| 10,936,585 B1 | 3/2021 | Echeverria et al. | |
| 11,461,347 B1 | 10/2022 | Das | |
| 11,609,933 B1 | 3/2023 | Ozen et al. | |
| 12,174,846 B2* | 12/2024 | Viswanadha | G06F 16/2471 |
| 2003/0055822 A1* | 3/2003 | Yu | G06F 16/278 |
| 2006/0026131 A1* | 2/2006 | Soogoor | G06F 16/90 |
| 2007/0179941 A1* | 8/2007 | Huang | G06F 16/2452 |
| 2015/0169686 A1* | 6/2015 | Elias | G06F 16/24542 |
| | | | 707/718 |
| 2016/0055192 A1 | 2/2016 | Bensberg et al. | |
| 2016/0070739 A1 | 3/2016 | Gukal | |
| 2016/0085810 A1 | 3/2016 | de Castro Alves | |
| 2017/0026441 A1 | 1/2017 | Moudy | |
| 2018/0336216 A1 | 11/2018 | Bitincka | |
| 2019/0098106 A1 | 3/2019 | Mungel et al. | |
| 2019/0294598 A1 | 9/2019 | Hsiao | |
| 2020/0026709 A1* | 1/2020 | Ramaiyer | G06F 16/283 |
| 2020/0278900 A1 | 9/2020 | Abdelsalam | |
| 2021/0042341 A1 | 2/2021 | Miller | |
| 2021/0097067 A1* | 4/2021 | Virtuoso | G06F 16/2455 |
| 2021/0117425 A1 | 4/2021 | Rao | |
| 2021/0294801 A1 | 9/2021 | Pal | |
| 2022/0035686 A1 | 2/2022 | Cristofi | |
| 2022/0300473 A1 | 9/2022 | Tidwell | |
| 2022/0300496 A1 | 9/2022 | Saurabh | |

OTHER PUBLICATIONS

Carraso, David, "Exploring Splunk," published by CITO Research, New York, NY, Apr. 2012.

SLAML 10 Reports, Workshop on Managing Systems via Log Analysis and Machine Learning Techniques. ;login: Feb. 2011—Conference Reports—vol. 36, No. 1, pp. 104-110.

SPLUNK Enterprise Overview 8.0.0—splunk > turn data into doing—copyright 2020 Splunk Inc.—in 17 pages—Retrieved from Splunk Documentation <URL: https://docs.splunk.com/Documentation> on May 20, 2020.

SPLUNK Cloud User Manual 8.0.2004—splunk> turn data in doing—copyright 2020 Splunk Inc.—in 66 pages—Retrieved from Splunk Documentation <URL: https://docs.splunk.com/Documentation> on May 20, 2020.

SPLUNK Quick Reference Guide, updated 2019, available online at https://www.splunk.com/pdfs/solution-guides/splunk-quick-reference-guide.pdf, retrieved May 20, 2020.

U.S. Appl. No. 18/162,639, filed Jan. 31, 2023, James et al.
U.S. Appl. No. 18/429,254, filed Jan. 31, 2024, James et al.
U.S. Appl. No. 18/429,276, filed Jan. 31, 2024, James et al.

* cited by examiner

─ 302

─ 302A 127.0.0.1 − eva [10/Oct/2000:13:55:36-0700] "GET/apache.gif HTTP/1.0" 200 2326 0.0947
127.0.0.1 − emerson [10/Oct/2000:13:56:36-0700] "GET/eastwood.gif HTTP/1.0" 200 2980
0.0899          ─302C          ─302B
127.0.0.3 − eliza [10/Oct/2000:13:57:36-0700] "GET/ezra.gif HTTP/1.0" 200 2900 0.0857
[Sunday Oct 10 1:58:33 2010] [error] [client 127.10.1.1.015] File does not exist: /home/emmeline/
pub_html/images/alisia.gif       ─302E          ─302D
91.205.189.15 - - [28/Apr/2014:18:22:16] "GET /oldlink?itemId=EST-
14&JSESSIONID=SD6SL7FF7ADFF53113 HTTP 1.1" 200 1665 "http://
www.buttercupgames.com/oldlink?itemId=EST-14" "Mozilla/5.0 (Windwos NT 6.1; WOW 64)
AppleWebKit/536.5 (KHTML, like Gecko) Chrome/19.0.1084.46 Safari/536.5" 159

─ 304 docker: {
    container_id: f7360a148a670c4c257f4ee024be81284b6017d72ae41ea8ee5d
}                    ─304A
kubernetes: {
    container_name: kube-apiserver
    host: ip-172-20-43-173.ec2.internal
    labels: {
        k8s-app: kube-apiserver
    }
master_url: https://100.64.0.1:443/api
namespace_id: e5af26aa-4ef9-11e8-a4e1-0a2bf2ab4bba
namespace_name: kube-system
pod_id: 0a73017b-4efa-11e8-a4e1-0a2bf2ab4bba
pod_name: kube-apiserver-ip-172-20-43-173.ec2.internal    ─304B
}
log: I0503 23:04:12.595203    1 wrap.go:42] GET /apis/admissionregistrations.k8s.io/v1beta1/
validatingwebhookconfiguration 200 [[kube-apiserver/v1.9.3 (linux/amd64) kubernetes/d283541]
127.0.0.1:55026 stream: stdout
time: 2018-05-03T23:04:12.619948395Z
}

─ 306

| time | ID | CPU | memory |
|---|---|---|---|
| 10/10/00 12:01:00.013 | eliza | 14% | 80% |
| 10/10/00 12:01:05.153 | eva | 26% | 70% |

FIG. 3A

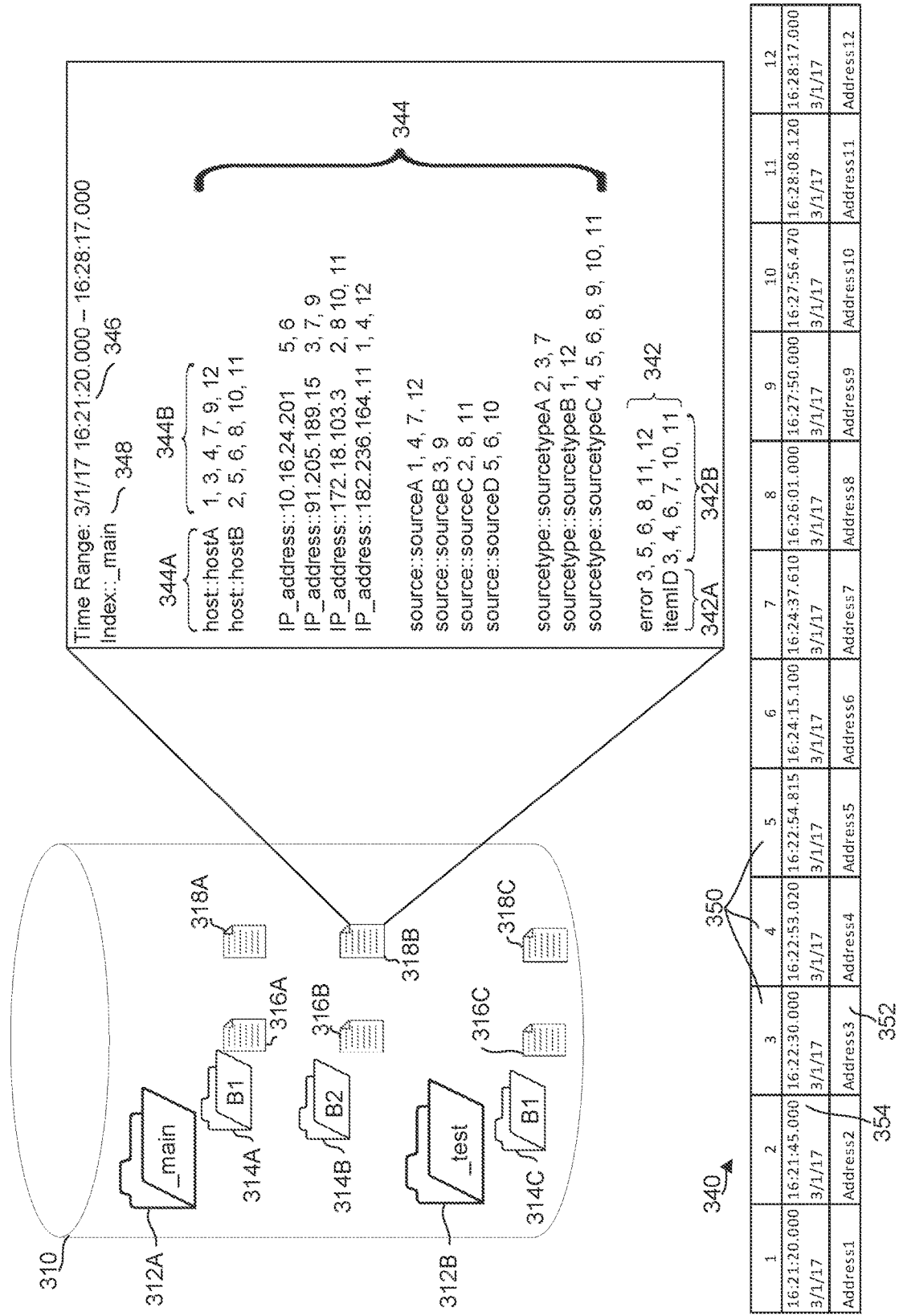

QUERY MODIFICATION USING PARTITIONED DATASETS

RELATED APPLICATIONS

Any and all applications for which a foreign or domestic priority claim is identified in the Application Data Sheet as filed with the present application are incorporated by reference under 37 CFR 1.57 and made a part of this specification. This application claims priority to U.S. Prov. App. No. 63/482,533, filed Jan. 31, 2023, entitled QUERY MODIFICATION USING PARTITIONED COMMANDS AND QUERY MODIFICATION USING PARTITIONED DATASETS, which is incorporated herein by reference for all purposes.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include log data, performance data, diagnostic data, metrics, tracing data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to managing, understanding and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing.

However, storing massive quantities of minimally processed or unprocessed data (collectively and individually referred to as "raw data") for later retrieval and analysis is becoming increasingly more feasible as storage capacity becomes more inexpensive and plentiful. In general, storing raw data and performing analysis on that data later can provide greater flexibility because it enables an analyst to analyze all of the generated data instead of only a fraction of it. Although the availability of vastly greater amounts of diverse data on diverse data systems provides opportunities to derive new insights, it also gives rise to technical challenges to search and analyze the data in a performant way.

BRIEF DESCRIPTION OF THE DRAWINGS

Illustrative examples are described in detail below with reference to the following figures:

FIG. 3A is a block diagram illustrating an embodiment of machine data received by the data intake and query system.

FIGS. 3B and 3C are block diagrams illustrating embodiments of various data structures for storing data processed by the data intake and query system.

DETAILED DESCRIPTION

Figure 1A:
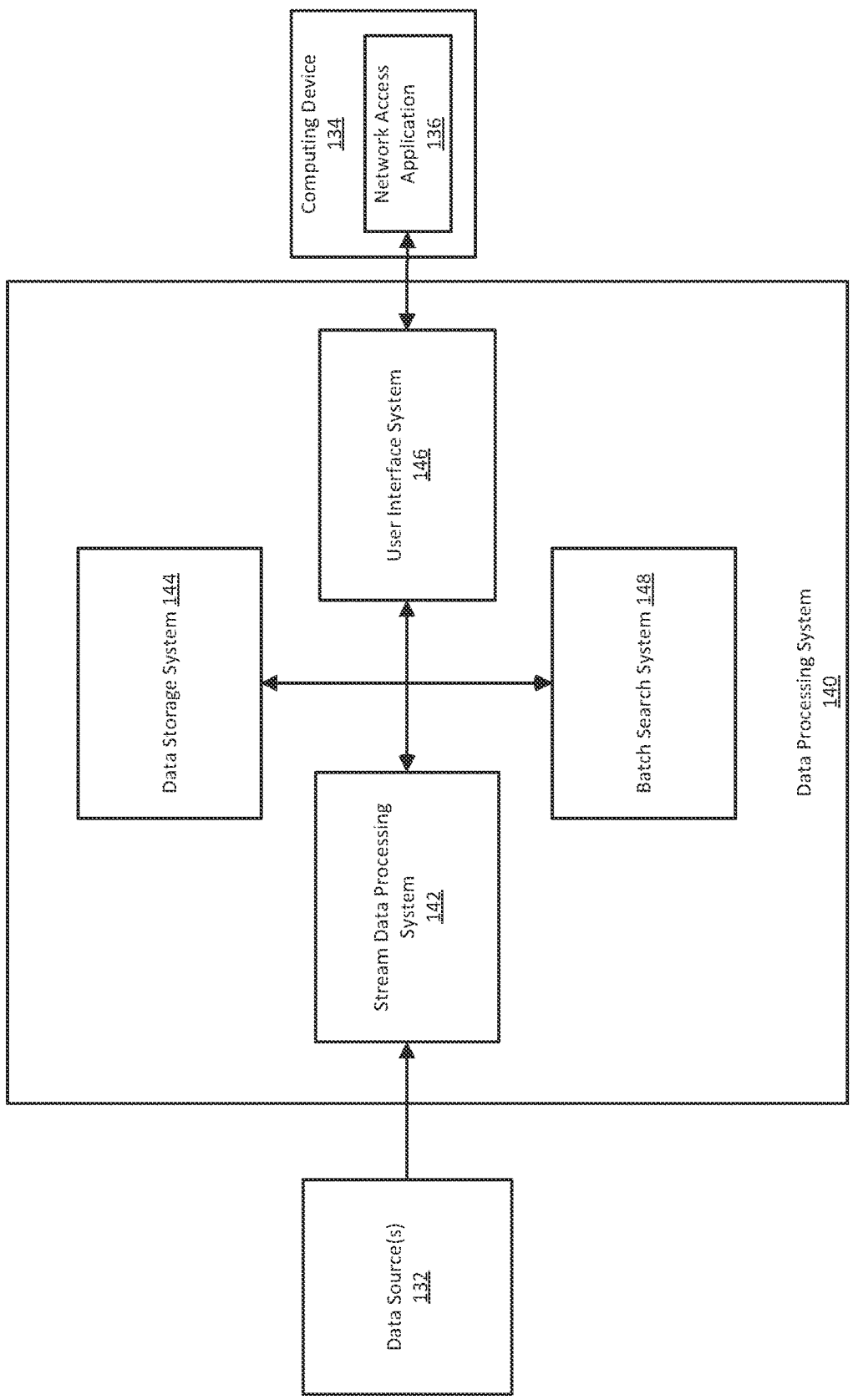
FIG. 1A depicts an example of a computing system in which aspects of the present disclosure can be implemented.

Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that concurrently report these types of information.

These challenges can be addressed by using an event-based data intake and query system, such as the SPLUNK® ENTERPRISE, SPLUNK® CLOUD, or SPLUNK® CLOUD SERVICE system developed by Splunk Inc. of San Francisco, California. These systems represent the leading platform for providing real-time operational intelligence that enables organizations to collect, index, and search machine data from various websites, applications, servers, networks, and mobile devices that power their businesses. The data intake and query system is particularly useful for analyzing data which is commonly found in system log files, network data, metrics data, tracing data, and other data input sources.

In the data intake and query system, machine data is collected and stored as "events." An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp. The time stamp may be derived from the portion of machine data in the event, determined through interpolation between temporally proximate events having known timestamps, and/or may be determined based on other configurable rules for associating timestamps with events.

In some instances, machine data can have a predefined structure, where data items with specific data formats are stored at predefined locations in the data. For example, the machine data may include data associated with fields in a database table. In other instances, machine data may not have a predefined structure (e.g., may not be at fixed, predefined locations), but may have repeatable (e.g., non-random) patterns. This means that some machine data can comprise various data items of different data types that may be stored at different locations within the data. For example, when the data source is an operating system log, an event can include one or more lines from the operating system log containing machine data that includes different types of performance and diagnostic information associated with a specific point in time (e.g., a timestamp).

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The machine data generated by such data sources can include, for example and without limitation, server log files, activity log files, configuration files, messages, network packet data, performance measurements, sensor measurements, etc.

The data intake and query system can use flexible schema to specify how to extract information from events. A flexible schema may be developed and redefined as needed. The flexible schema can be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events each having a portion of machine data associated with a timestamp, and stores the events. The system enables users to run queries against the stored events to, for example, retrieve events that meet filter criteria specified in a query, such as criteria indicating certain keywords or having specific values in defined fields. Additional query terms can further process the event data, such as, by transforming the data, etc.

As used herein, the term "field" can refer to a location in the machine data of an event containing one or more values for a specific data item. A field may be referenced by a field name associated with the field. As will be described in more detail herein, in some cases, a field is defined by an extraction rule (e.g., a regular expression) that derives one or more values or a sub-portion of text from the portion of machine data in each event to produce a value for the field for that event. The set of values produced are semantically-related (such as IP address), even though the machine data in each event may be in different formats (e.g., semantically-related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field-search the machine data of events to identify events that have the field name "UserID." In another example, a search having criteria that specifies a field name "UserID" with a corresponding field value "12345" may cause the system to field-search the machine data of events to identify events having that field-value pair (e.g., field name "UserID" with a corresponding field value of "12345"). Events are field-searchable using one or more configuration files associated with the events. Each configuration file can include one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or source-type. When events are to be searched based on a particular field name specified in a search, the system can use one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system can utilize a late-binding schema while performing queries on events. One aspect of a late-binding schema is applying extraction rules to events to extract values for specific fields during search time. More specifically, the extraction rule for a field can include one or more instructions that specify how to extract a value for the field from an event. An extraction rule can generally include any type of instruction for extracting values from machine data or events. In some cases, an extraction rule comprises a regular expression, where a sequence of characters form a search pattern. An extraction rule comprising a regular expression is referred to herein as a regex rule. The system applies a regex rule to machine data or an event to extract values for a field associated with the regex rule, where the values are extracted by searching the machine data/event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields specified in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the data intake and query system maintains the underlying machine data and uses a late-binding schema for searching the machine data, it enables a user to continue investigating and learn valuable insights about the machine data.

In some embodiments, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources.

In some embodiments, the configuration files and/or extraction rules described above can be stored in a catalog, such as a metadata catalog. In certain embodiments, the content of the extraction rules can be stored as rules or actions in the metadata catalog. For example, the identification of the data to which the extraction rule applies can be referred to a rule and the processing of the data can be referred to as an action.

1.0. OPERATING ENVIRONMENT

As will be appreciated by one of skill in the art in light of the present disclosure, the embodiments disclosed herein improve the ability of computing systems, such as data intake and query systems and/or streaming data processing systems, to provide for ingestion of data and processing of input/output operations against data. Moreover, the presently disclosed embodiments address technical problems inherent within computing systems; specifically, the difficulties of processing data according to user-defined schemas and to programmatically implementing such schemas with respect to input/output operations. These technical problems are addressed by the various technical solutions described herein, including creation of datasets partitioned according to a user-defined partitioning schema, with partitions in such a schema being user-defined and addressable, and programmatically routing input/output operations on datasets according to the schema, without requiring manual distribution of data objects among the partitions, as well as partitioned functions for operating on the partitioned datasets. Thus, the present disclosure represents an improvement in data intake and query systems and/or streaming data processing systems and computing systems in general.

The foregoing aspects and many of the attendant advantages of this disclosure will become more readily appreciated as the same become better understood by reference to the following description, when taken in conjunction with the accompanying drawings.

FIG. 1A illustrates an example of a computing environment 130 in which aspects of the present disclosure can be implemented. In FIG. 1A, the computing environment 130 illustratively includes a data processing system 140 configured to facilitate ingest, processing, and searching of data stored at the data processing system 140. The data processing system 140 of FIG. 1A may represent a simplified example of a general data intake and query system, such as the data intake and query systems described below with reference to FIGS. 1B-1C and 2-5. Accordingly, it should be understood that embodiments described with reference to FIG. 1A may additionally or alternatively be implemented on the data intake and query systems described herein. For example, the embodiments described with reference to FIG. 1A may additionally or alternatively be implemented on the data intake and query system of FIG. 1B and/or FIG. 1C. Similarly, embodiments described with reference to FIGS. 1B and 1C may additionally or alternatively be implemented on the data processing system 140. For example, the embodiments described with reference to FIGS. 1B and 1C may additionally or alternatively be implemented on data processing system 140.

In FIG. 1A, the data processing system 140 illustratively operates to collect, index, and enable searching of machine-generated data, such as for purposes of data analytics. The data processing system 140 further operates to enable data processing against streams of data, independent of or prior to collection, indexing and searching of that data. For example, the data processing system 140 can provide a stream data processing system 142 configured to conduct stream data processing on a data stream provided by a data source 132 and to output a resulting stream to a data storage system 144, where that stream can be stored as a data set queryable by a batch search system 148. The batch search system 148 can further provide a user interface system 146 enabling interaction with the stream data processing system 142, data storage system 144, and batch search system 148. For example, a client may utilize a computing device 134 with a network access application 136 (e.g., a web browser) to interface with the data processing system 140 through the user interface system 146 to configure data stream processing on the stream data processing system 142, to access data in the data storage system 144, to conduct batch searches using the batch search system 148, or the like.

Each data source 132 illustratively corresponds to a computing device that generates machine data, such as logs, metrics, or the like. For example, such machine data may be generated during operation of the data source 132 for other purposes (e.g., to implement other functionality within the computing environment 130). In some cases, the data source(s) 132 may correspond to or be similar to the host devices 104, illustrated in FIG. 1B.

The stream data processing system 142 illustratively corresponds to one or more computing devices that obtain data from the data sources 132, manipulate the data according to one or more defined sets of data stream processing instructions, and output the data to a destination, such as the data storage system 144. In some cases, the stream data processing system 142 may correspond to or be similar to the intake system 110, illustrated in FIG. 1B. Because data from data sources 132 in FIG. 1A is unbounded—that is, it has no pre-defined size or termination point—the data can be considered a data stream. Similarly, data output by the stream data processing system 142 can be considered a data stream. Accordingly, the manipulations of the stream data processing system are discussed here as stream data processing. In one embodiment, the stream data processing system 142 implements multiple sets of processing instructions, each associated with intaking a particular set of data (e.g., from one or more specified data sources 132), implementing one or more manipulations (e.g., including filtering, modifying, routing, or otherwise manipulating the data), and outputting the data (e.g., to one or more specified destinations). Each instruction set may be in some cases be referred to as a "pipeline." For example, each instruction set may be logically viewed as a pipeline through which data moves and is manipulated prior to being output.

One skilled in the art will recognize that data streams differ from defined or pre-existing data sets (referred to herein as "at-rest data sets" for brevity). For example, data streams unlike at-rest data sets typically have no fixed size or termination, but can continue (potentially indefinitely) as data is produced. Processing for at-rest data sets and data streams can differ. For example, while batch processing of an at-rest data set may apply statistical techniques (such as averages, medians, distributions, etc.) to the fixed set, stream data processing may apply such techniques to windows within the stream. Batch processing of at-rest data sets may be associated with more latency between data generation and processing than stream processing. For example, batch processing may occur periodically (e.g., every x minutes, hours, etc.), processing a past portion of data created by a data source, with each result being delayed by up to the periodicity. Stream processing may occur continuously, enabling rapid results to be produced. Batch processing of an at-rest data set can be preferably for some tasks, such as historical analysis of existing data, while stream data processing can be preferably for other tasks, such as continuous monitoring.

The stream data processing system 142 can output data streams to a variety of destinations. For example, where the batch search system 148 provides for indexing of data, the stream data processing system 142 may output a data stream to the batch search system 148 for indexing as a data set, as described in more detail below. As another example, the user interface system 146 may enable real-time review of data processing by the stream data processing system 142, and as such the stream data processing system 142 may output a data stream to the user interface system 146 for display on a computing device 134. As yet another example, the stream data processing system 142 may output a data stream to the data storage system 144 for storage.

The data storage system 144 illustratively corresponds to a network-accessible storage system, a variety of which may be used. In some cases, the data storage system 144 may correspond to or be similar to the storage system 116, illustrated in FIG. 1B. Illustratively, the data storage system 144 stores data obtained from the stream data processing system 142. For example, the data storage system 144 may bucketize data obtained from the stream data processing system 142 to create data sets accessible by the batch search system 148, such as by storing each n period of a data stream as a distinct bucket of data. While FIG. 1A depicts the data storage system 144 in communication with the stream data processing system 142 (e.g., via a network on the data processing system 140), the data storage system 144 may additionally or alternatively obtain data from data sources 132 without use of the stream data processing system 142.

The batch search system 148 illustratively corresponds to one or more computing devices that conduct batch searches or other batch processing against at-rest data sets. In some cases, the batch search system 148 may correspond to or be similar to the query system 114 and/or the indexing system 112, illustrated in FIG. 1B. The batch search system 148 may be configured to accept batch operations, such as queries, from a computing device 134 (e.g., via the user interface system 146) and apply such queries to a data set, which may for example be stored within the data storage system 144. Such queries may retrieve relevant data, manipulate the data according to one or more manipulations (e.g., filtering, routing, or transforming the data), and output results, such as by creating a new data set on the data storage system 144, presenting results to the computing device 134 via the user interface system 146, or the like.

As noted above, the user interface system 146 illustratively represents one or more computing devices providing interfaces for the data processing system 140. For example, the user interface system 146 may provide command line interfaces (CLIs), graphical user interfaces (GUIs), application programming interfaces (APIs), or the like that are accessible to computing devices 134 over a network to interact with the data processing system 140. In one embodiment, the user interface system 146 includes a web server configured to present web pages (e.g., as hypertext markup language, or "HTML", documents) to a computing device 134, which web pages provide an interface for interaction with the data processing system 140.

A computing device 134 can utilize a network accessible application 136 to access an interface provided by the user interface system 146 and thus interact with the data processing system 140. In some cases, the computing device 134 may correspond to or be similar to the client computing device 106, illustrated in FIG. 1B. For example, the network access application 136 may represent a web browser that accesses web pages provided by the user interface system 146, which web pages enable a user of the computing device 134 to, e.g., browse and retrieve data in the data storage system 144, submit queries to the batch search system 148 and obtain results of such queries, or author data stream processing instruction sets ("pipelines") for deployment on the stream data processing system 142.

Figure 1B:
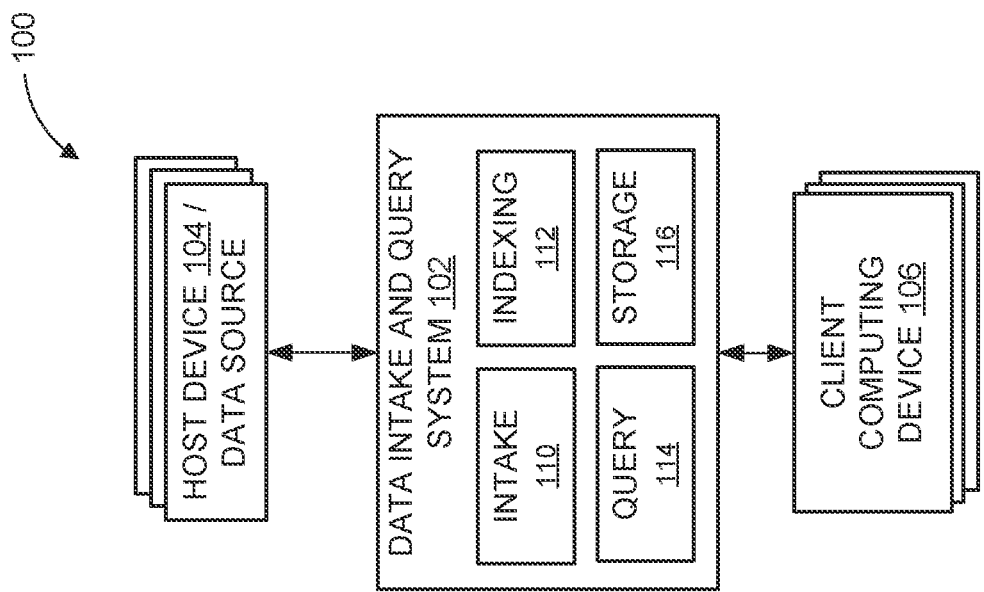
FIG. 1B is a block diagram of an embodiment of a data processing environment.

FIG. 1B is a block diagram of an embodiment of a data processing environment 100. In the illustrated embodiment, the environment 100 includes a data intake and query system 102, one or more host devices 104, and one or more client computing devices 106 (generically referred to as client device(s) 106).

The data intake and query system 102, host devices 104, and client devices 106 can communicate with each other via one or more networks, such as a local area network (LAN), wide area network (WAN), private or personal network, cellular networks, intranetworks, and/or internetworks using any of wired, wireless, terrestrial microwave, satellite links, etc., and may include the Internet. Although not explicitly shown in FIG. 1B, it will be understood that a client computing device 106 can communicate with a host device 104 via one or more networks. For example, if the host device 104 is configured as a web server and the client computing device 106 is a laptop, the laptop can communicate with the web server to view a website.

A client device 106 can correspond to a distinct computing device that can configure, manage, or sends queries to the system 102. Examples of client devices 106 may include, without limitation, smart phones, tablet computers, handheld computers, wearable devices, laptop computers, desktop computers, servers, portable media players, gaming devices, or other device that includes computer hardware (e.g., processors, non-transitory, computer-readable media, etc.) and so forth. In certain cases, a client device 106 can include a hosted, virtualized, or containerized device, such as an isolated execution environment, that shares computing resources (e.g., processor, memory, etc.) of a particular machine with other isolated execution environments.

The client devices 106 can interact with the system 102 (or a host device 104) in a variety of ways. For example, the client devices 106 can communicate with the system 102 (or a host device 104) over an Internet (Web) protocol, via a gateway, via a command line interface, via a software developer kit (SDK), a standalone application, etc. As another example, the client devices 106 can use one or more executable applications or programs to interface with the system 102.

A host device 104 can correspond to a distinct computing device or system that includes or has access to data that can be ingested, indexed, and/or searched by the system 102. Accordingly, in some cases, a client device 106 may also be a host device 104 (e.g., it can include data that is ingested by the system 102 and it can submit queries to the system 102). The host devices 104 can include, but are not limited to, servers, sensors, routers, personal computers, mobile devices, internet of things (IoT) devices, or hosting devices, such as computing devices in a shared computing resource environment on which multiple isolated execution environment (e.g., virtual machines, containers, etc.) can be instantiated, or other computing devices in an IT environment (e.g., device that includes computer hardware, e.g., processors, non-transitory, computer-readable media, etc.). In certain cases, a host device 104 can include a hosted, virtualized, or containerized device, such as an isolated execution environment, that shares computing resources (e.g., processor, memory, etc.) of a particular machine (e.g., a hosting device or hosting machine) with other isolated execution environments.

As mentioned host devices 104 can include or have access to data sources for the system 102. The data sources can include machine data found in log files, data files, distributed file systems, streaming data, publication-subscribe (pub/sub) buffers, directories of files, data sent over a network, event logs, registries, streaming data services (examples of which can include, by way of non-limiting example, Amazon's Simple Queue Service ("SQS") or Kinesis™ services, devices executing Apache Kafka™ software, or devices implementing the Message Queue Telemetry Transport (MQTT) protocol, Microsoft Azure EventHub, Google Cloud PubSub, devices implementing the Java Message Service (JMS) protocol, devices implementing the Advanced Message Queuing Protocol (AMQP)), cloud-based services (e.g., AWS, Microsoft Azure, Google Cloud, etc.), operating-system-level virtualization environments (e.g., Docker), container orchestration systems (e.g., Kubernetes), virtual machines using full virtualization or paravirtualization, or other virtualization technique or isolated execution environments.

In some cases, one or more applications executing on a host device may generate various types of machine data during operation. For example, a web server application executing on a host device 104 may generate one or more web server logs detailing interactions between the web server and any number of client devices 106 or other devices. As another example, a host device 104 implemented as a router may generate one or more router logs that record information related to network traffic managed by the router. As yet another example, a database server application executing on a host device 104 may generate one or more logs that record information related to requests sent from other devices (e.g., web servers, application servers, client devices, etc.) for data managed by the database server. Similarly, a host device 104 may generate and/or store computing resource utilization metrics, such as, but not limited to, CPU utilization, memory utilization, number of processes being executed, etc. Any one or any combination of the files or data generated in such cases can be used as a data source for the system 102.

In some embodiments, an application may include a monitoring component that facilitates generating performance data related to host device's operating state, including monitoring network traffic sent and received from the host device and collecting other device and/or application-specific information. A monitoring component may be an integrated component of the application, a plug-in, an extension, or any other type of add-on component, or a stand-alone process.

Such monitored information may include, but is not limited to, network performance data (e.g., a URL requested, a connection type (e.g., HTTP, HTTPS, etc.), a connection start time, a connection end time, an HTTP status code, request length, response length, request headers, response headers, connection status (e.g., completion, response time(s), failure, etc.)) or device performance information (e.g., current wireless signal strength of the device, a current connection type and network carrier, current memory performance information, processor utilization, memory utilization, a geographic location of the device, a device orientation, and any other information related to the operational state of the host device, etc.), device profile information (e.g., a type of client device, a manufacturer, and model of the device, versions of various software applications installed on the device, etc.) In some cases, the monitoring component can collect device performance information by monitoring one or more host device operations, or by making calls to an operating system and/or one or more other applications executing on a host device for performance information. The monitored information may be stored in one or more files and/or streamed to the system 102.

In general, a monitoring component may be configured to generate performance data in response to a monitor trigger in the code of a client application or other triggering application event, as described above, and to store the performance data in one or more data records. Each data record, for example, may include a collection of field-value pairs, each field-value pair storing a particular item of performance data in association with a field for the item. For example, a data record generated by a monitoring component may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

In some embodiments, such as in a shared computing resource environment (or hosted environment), a host device 104 may include logs or machine data generated by an application executing within an isolated execution environment (e.g., web server log file if the isolated execution environment is configured as a web server or database server log files if the isolated execution environment is configured as database server, etc.), machine data associated with the computing resources assigned to the isolated execution environment (e.g., CPU utilization of the portion of the CPU allocated to the isolated execution environment, memory utilization of the portion of the memory allocated to the isolated execution environment, etc.), logs or machine data generated by an application that enables the isolated execution environment to share resources with other isolated execution environments (e.g., logs generated by a Docker manager or Kubernetes manager executing on the host device 104), and/or machine data generated by monitoring the computing resources of the host device 104 (e.g., CPU utilization, memory utilization, etc.) that are shared between the isolated execution environments. Given the separation (and isolation) between isolated execution environments executing on a common computing device, in certain embodiments, each isolated execution environment may be treated as a separate host device 104 even if they are, in fact, executing on the same computing device or hosting device.

Accordingly, as used herein, obtaining data from a data source may refer to communicating with a host device 104 to obtain data from the host device 104 (e.g., from one or more data source files, data streams, directories on the host device 104, etc.). For example, obtaining data from a data source may refer to requesting data from a host device 104 and/or receiving data from a host device 104. In some such cases, the host device 104 can retrieve and return the requested data from a particular data source and/or the system 102 can retrieve the data from a particular data source of the host device 104 (e.g., from a particular file stored on a host device 104).

The data intake and query system 102 can ingest, index, and/or store data from heterogeneous data sources and/or host devices 104. For example, the system 102 can ingest, index, and/or store any type of machine data, regardless of the form of the machine data or whether the machine data matches or is similar to other machine data ingested, indexed, and/or stored by the system 102. In some cases, the system 102 can generate events from the received data, group the events, and store the events in buckets. The system 102 can also search heterogeneous data that it has stored or search data stored by other systems (e.g., other system data intake and query systems 102 or other non-data intake and query systems 102). For example, in response to received queries, the system 102 can assign one or more components to search events stored in the storage system or search data stored elsewhere.

As will be described herein in greater detail below, the system 102 can use one or more components to ingest, index, store, and/or search data. In some embodiments, the system 102 is implemented as a distributed system that uses multiple components to perform its various functions. For example, the system 102 can include any one or any combination of an intake system 110 (including one or more components) to ingest data, an indexing system 112 (including one or more components) to index the data, a storage system 116 (including one or more components) to store the data, and/or a query system 114 (including one or more components) to search the data, etc.

In the illustrated embodiment, the system 102 is shown having four subsystems 110, 112, 114, 116. However, it will be understood that the system 102 may include any one or any combination of the intake system 110, indexing system 112, query system 114, or storage system 116. Further, in certain embodiments, one or more of the intake system 110, indexing system 112, query system 114, or storage system 116 may be used alone or apart from the system 102. For example, the intake system 110 may be used alone to glean information from data that is not indexed or stored by the system 102, or the query system 114 may be used to search data that is unaffiliated with the system 102.

In certain embodiments, the components of the different systems may be distinct from each other or there may be some overlap. For example, one component of the system 102 may include some indexing functionality and some searching functionality and thus be used as part of the indexing system 112 and query system 114, while another computing device of the system 102 may only have ingesting or search functionality and only be used as part of those respective systems. Similarly, the components of the storage system 116 may include data stores of individual components of the indexing system and/or may be a separate shared data storage system, like Amazon S3, that is accessible to distinct components of the intake system 110, indexing system 112, and query system 114.

In some cases, the components of the system 102 are implemented as distinct computing devices having their own computer hardware (e.g., processors, non-transitory, computer-readable media, etc.) and/or as distinct hosted devices (e.g., isolated execution environments) that share computing resources or hardware in a shared computing resource environment.

For simplicity, references made herein to the intake system 110, indexing system 112, storage system 116, and query system 114 can refer to those components used for ingesting, indexing, storing, and searching, respectively. However, it will be understood that although reference is made to two separate systems, the same underlying component may be performing the functions for the two different systems. For example, reference to the indexing system indexing data and storing the data in the storage system 116 or the query system searching the data may refer to the same component (e.g., same computing device or hosted device) indexing the data, storing the data, and then searching the data that it stored.

As will be described in greater detail herein, the intake system 110 can receive data from the host devices 104 or data sources, perform one or more preliminary processing operations on the data, and communicate the data to the indexing system 112, query system 114, storage system 116, or to other systems (which may include, for example, data processing systems, telemetry systems, real-time analytics systems, data stores, databases, etc., any of which may be operated by an operator of the system 102 or a third party). Given the amount of data that can be ingested by the intake system 110, in some embodiments, the intake system can include multiple distributed computing devices or components working concurrently to ingest the data.

The intake system 110 can receive data from the host devices 104 in a variety of formats or structures. In some embodiments, the received data corresponds to raw machine data, structured or unstructured data, correlation data, data files, directories of files, data sent over a network, event logs, registries, messages published to streaming data sources, performance metrics, sensor data, image and video data, etc. In some cases, the intake system 110 may correspond to or include the stream data processing system.

The preliminary processing operations performed by the intake system 110 can include, but is not limited to, associating metadata with the data received from a host device 104, extracting a timestamp from the data, identifying individual events within the data, extracting a subset of machine data for transmittal to the indexing system 112, enriching the data, etc. As part of communicating the data to the indexing system, the intake system 110 can route the data to a particular component of the intake system 110 or dynamically route the data based on load-balancing, etc. In certain cases, one or more components of the intake system 110 can be installed on a host device 104.

1.4.2. Indexing System Over View

As will be described in greater detail herein, the indexing system 112 can include one or more components (e.g., indexing nodes) to process the data and store it, for example, in the storage system 116. As part of processing the data, the indexing system can identify distinct events within the data, timestamps associated with the data, organize the data into buckets or time series buckets, convert editable buckets to non-editable buckets, store copies of the buckets in the storage system 116, merge buckets, generate indexes of the data, etc. In addition, the indexing system 112 can update various catalogs or databases with information related to the buckets (pre-merged or merged) or data that is stored in the storage system 116, and can communicate with the intake system 110 about the status of the data storage.

As will be described in greater detail herein, the query system 114 can include one or more components to receive, process, and execute queries. In some cases, the query system 114 can use the same component to process and execute the query or use one or more components to receive and process the query (e.g., a search head) and use one or more other components to execute at least a portion of the query (e.g., search nodes). In some cases, a search node and an indexing node may refer to the same computing device or hosted device performing different functions. In certain cases, a search node can be a separate computing device or hosted device from an indexing node.

Queries received by the query system 114 can be relatively complex and identify a set of data to be processed and a manner of processing the set of data. In certain cases, the query can be implemented using a pipelined command language or other query language. As described herein, in some cases, the query system 114 can execute parts of the query in a distributed fashion (e.g., one or more mapping phases or parts associated with identifying and gathering the set of data identified in the query) and execute other parts of the query on a single component (e.g., one or more reduction phases). However, it will be understood that in some cases multiple components can be used in the map and/or reduce functions of the query execution.

In some cases, as part of executing the query, the query system 114 can use one or more catalogs or databases to identify the set of data to be processed or its location in the storage system 116 and/or can retrieve data from the storage system 116. In addition, in some embodiments, the query system 114 can store some or all of the query results in the storage system 116.

In some cases, the storage system 116 may include one or more data stores associated with or coupled to the components of the indexing system 112 that are accessible via a system bus or local area network. In certain embodiments, the storage system 116 may be a shared storage system 116, like Amazon S3 or Google Cloud Storage, that are accessible via a wide area network.

As mentioned and as will be described in greater detail below, the storage system 116 can be made up of one or more data stores storing data that has been processed by the indexing system 112. In some cases, the storage system includes data stores of the components of the indexing system 112 and/or query system 114. In certain embodiments, the storage system 116 can be implemented as a shared storage system 116. The shared storage system 116 can be configured to provide high availability, highly resilient, low loss data storage. In some cases, to provide the high availability, highly resilient, low loss data storage, the shared storage system 116 can store multiple copies of the data in the same and different geographic locations and across different types of data stores (e.g., solid state, hard drive, tape, etc.). Further, as data is received at the shared storage system 116 it can be automatically replicated multiple times according to a replication factor to different data stores across the same and/or different geographic locations. In some embodiments, the shared storage system 116 can correspond to cloud storage, such as Amazon Simple Storage Service (S3) or Elastic Block Storage (EBS), Google Cloud Storage, Microsoft Azure Storage, etc.

In some embodiments, indexing system 112 can read to and write from the shared storage system 116. For example, the indexing system 112 can copy buckets of data from its local or shared data stores to the shared storage system 116. In certain embodiments, the query system 114 can read from, but cannot write to, the shared storage system 116. For example, the query system 114 can read the buckets of data stored in shared storage system 116 by the indexing system 112, but may not be able to copy buckets or other data to the shared storage system 116. In some embodiments, the intake system 110 does not have access to the shared storage system 116. However, in some embodiments, one or more components of the intake system 110 can write data to the shared storage system 116 that can be read by the indexing system 112.

As described herein, in some embodiments, data in the system 102 (e.g., in the data stores of the components of the indexing system 112, shared storage system 116, or search nodes of the query system 114) can be stored in one or more time series buckets. Each bucket can include raw machine data associated with a timestamp and additional information about the data or bucket, such as, but not limited to, one or more filters, indexes (e.g., TSIDX, inverted indexes, keyword indexes, etc.), bucket summaries, etc. In some embodiments, the bucket data and information about the bucket data is stored in one or more files. For example, the raw machine data, filters, indexes, bucket summaries, etc. can be stored in respective files in or associated with a bucket. In certain cases, the group of files can be associated together to form the bucket.

The system 102 can include additional components that interact with any one or any combination of the intake system 110, indexing system 112, query system 114, and/or storage system 116. Such components may include, but are not limited to an authentication system, orchestration system, one or more catalogs or databases, a gateway, etc.

An authentication system can include one or more components to authenticate users to access, use, and/or configure the system 102. Similarly, the authentication system can be used to restrict what a particular user can do on the system 102 and/or what components or data a user can access, etc.

An orchestration system can include one or more components to manage and/or monitor the various components of the system 102. In some embodiments, the orchestration system can monitor the components of the system 102 to detect when one or more components has failed or is unavailable and enable the system 102 to recover from the failure (e.g., by adding additional components, fixing the failed component, or having other components complete the tasks assigned to the failed component). In certain cases, the orchestration system can determine when to add components to or remove components from a particular system 110, 112, 114, 116 (e.g., based on usage, user/tenant requests, etc.). In embodiments where the system 102 is implemented in a shared computing resource environment, the orchestration system can facilitate the creation and/or destruction of isolated execution environments or instances of the components of the system 102, etc.

In certain embodiments, the system 102 can include various components that enable it to provide stateless services or enable it to recover from an unavailable or unresponsive component without data loss in a time efficient manner. For example, the system 102 can store contextual information about its various components in a distributed way such that if one of the components becomes unresponsive or unavailable, the system 102 can replace the unavailable component with a different component and provide the replacement component with the contextual information. In this way, the system 102 can quickly recover from an unresponsive or unavailable component while reducing or eliminating the loss of data that was being processed by the unavailable component.

In some embodiments, the system 102 can store the contextual information in a catalog, as described herein. In certain embodiments, the contextual information can correspond to information that the system 102 has determined or learned based on use. In some cases, the contextual information can be stored as annotations (manual annotations and/or system annotations), as described herein.

In certain embodiments, the system 102 can include an additional catalog that monitors the location and storage of data in the storage system 116 to facilitate efficient access of the data during search time. In certain embodiments, such a catalog may form part of the storage system 116.

In some embodiments, the system 102 can include a gateway or other mechanism to interact with external devices or to facilitate communications between components of the system 102. In some embodiments, the gateway can be implemented using an application programming interface (API). In certain embodiments, the gateway can be implemented using a representational state transfer API (REST API).

In some environments, a user of a system 102 may install and configure, on computing devices owned and operated by the user, one or more software applications that implement some or all of the components of the system 102. For example, with reference to FIG. 1B, a user may install a software application on server computers owned by the user and configure each server to operate as one or more components of the intake system 110, indexing system 112, query system 114, shared storage system 116, or other components of the system 102. This arrangement generally may be referred to as an "on-premises" solution. That is, the system 102 is installed and operates on computing devices directly controlled by the user of the system 102. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 102 operate.

In certain embodiments, one or more of the components of the system 102 can be implemented in a shared computing resource environment. In this context, a shared computing resource environment or cloud-based service can refer to a service hosted by one more computing resources that are accessible to end users over a network, for example, by using a web browser or other application on a client device to interface with the remote computing resources. For example, a service provider may provide a system 102 by managing computing resources configured to implement various aspects of the system (e.g., intake system 110, indexing system 112, query system 114, shared storage system 116, other components, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

When implemented in a shared computing resource environment, the underlying hardware (non-limiting examples: processors, hard drives, solid-state memory, RAM, etc.) on which the components of the system 102 execute can be shared by multiple customers or tenants as part of the shared computing resource environment. In addition, when implemented in a shared computing resource environment as a cloud-based service, various components of the system 102 can be implemented using containerization or operating-system-level virtualization, or other virtualization technique. For example, one or more components of the intake system 110, indexing system 112, or query system 114 can be implemented as separate software containers or container instances. Each container instance can have certain computing resources (e.g., memory, processor, etc.) of an underlying hosting computing system (e.g., server, microprocessor, etc.) assigned to it, but may share the same operating system and may use the operating system's system call interface. Each container may provide an isolated execution environment on the host system, such as by providing a memory space of the hosting system that is logically isolated from memory space of other containers. Further, each container may run the same or different computer applications concurrently or separately, and may interact with each other. Although reference is made herein to containerization and container instances, it will be understood that other virtualization techniques can be used. For example, the components can be implemented using virtual machines using full virtualization or paravirtualization, etc. Thus, where reference is made to "containerized" components, it should be understood that such components may additionally or alternatively be implemented in other isolated execution environments, such as a virtual machine environment.

Implementing the system 102 in a shared computing resource environment can provide a number of benefits. In some cases, implementing the system 102 in a shared computing resource environment can make it easier to install, maintain, and update the components of the system 102. For example, rather than accessing designated hardware at a particular location to install or provide a component of the system 102, a component can be remotely instantiated or updated as desired. Similarly, implementing the system 102 in a shared computing resource environment or as a cloud-based service can make it easier to meet dynamic demand. For example, if the system 102 experiences significant load at indexing or search, additional compute resources can be deployed to process the additional data or queries. In an "on-premises" environment, this type of flexibility and scalability may not be possible or feasible.

In addition, by implementing the system 102 in a shared computing resource environment or as a cloud-based service can improve compute resource utilization. For example, in an on-premises environment if the designated compute resources are not being used by, they may sit idle and unused. In a shared computing resource environment, if the compute resources for a particular component are not being used, they can be re-allocated to other tasks within the system 102 and/or to other systems unrelated to the system 102.

As mentioned, in an on-premises environment, data from one instance of a system 102 is logically and physically separated from the data of another instance of a system 102 by virtue of each instance having its own designated hardware. As such, data from different customers of the system 102 is logically and physically separated from each other. In a shared computing resource environment, components of a system 102 can be configured to process the data from one customer or tenant or from multiple customers or tenants. Even in cases where a separate component of a system 102 is used for each customer, the underlying hardware on which the components of the system 102 are instantiated may still process data from different tenants. Accordingly, in a shared computing resource environment, the data from different tenants may not be physically separated on distinct hardware devices. For example, data from one tenant may reside on the same hard drive as data from another tenant or be processed by the same processor. In such cases, the system 102 can maintain logical separation between tenant data. For example, the system 102 can include separate directories for different tenants and apply different permissions and access controls to access the different directories or to process the data, etc.

In certain cases, the tenant data from different tenants is mutually exclusive and/or independent from each other. For example, in certain cases, Tenant A and Tenant B do not share the same data, similar to the way in which data from a local hard drive of Customer A is mutually exclusive and independent of the data (and not considered part) of a local hard drive of Customer B. While Tenant A and Tenant B may have matching or identical data, each tenant would have a separate copy of the data. For example, with reference again to the local hard drive of Customer A and Customer B example, each hard drive could include the same file. However, each instance of the file would be considered part of the separate hard drive and would be independent of the other file. Thus, one copy of the file would be part of Customer's A hard drive and a separate copy of the file would be part of Customer B's hard drive. In a similar manner, to the extent Tenant A has a file that is identical to a file of Tenant B, each tenant would have a distinct and independent copy of the file stored in different locations on a data store or on different data stores.

Further, in certain cases, the system 102 can maintain the mutual exclusivity and/or independence between tenant data even as the tenant data is being processed, stored, and searched by the same underlying hardware. In certain cases, to maintain the mutual exclusivity and/or independence between the data of different tenants, the system 102 can use tenant identifiers to uniquely identify data associated with different tenants.

In a shared computing resource environment, some components of the system 102 can be instantiated and designated for individual tenants and other components can be shared by multiple tenants. In certain embodiments, a separate intake system 110, indexing system 112, and query system 114 can be instantiated for each tenant, whereas the shared storage system 116 or other components (e.g., data store, metadata catalog, and/or acceleration data store, described below) can be shared by multiple tenants. In some such embodiments where components are shared by multiple tenants, the components can maintain separate directories for the different tenants to ensure their mutual exclusivity and/or independence from each other. Similarly, in some such embodiments, the system 102 can use different hosting computing systems or different isolated execution environments to process the data from the different tenants as part of the intake system 110, indexing system 112, and/or query system 114.

In some embodiments, individual components of the intake system 110, indexing system 112, and/or query system 114 may be instantiated for each tenant or shared by multiple tenants. For example, some individual intake system components (e.g., forwarders, output ingestion buffer) may be instantiated and designated for individual tenants, while other intake system components (e.g., a data retrieval subsystem, intake ingestion buffer, and/or streaming data processor), may be shared by multiple tenants.

In certain embodiments, an indexing system 112 (or certain components thereof) can be instantiated and designated for a particular tenant or shared by multiple tenants. In some embodiments where a separate indexing system 112 is instantiated and designated for each tenant, different resources can be reserved for different tenants. For example, Tenant A can be consistently allocated a minimum of four indexing nodes and Tenant B can be consistently allocated a minimum of two indexing nodes. In some such embodiments, the four indexing nodes can be reserved for Tenant A and the two indexing nodes can be reserved for Tenant B, even if Tenant A and Tenant B are not using the reserved indexing nodes.

In embodiments where an indexing system 112 is shared by multiple tenants, components of the indexing system 112 can be dynamically assigned to different tenants. For example, if Tenant A has greater indexing demands, additional indexing nodes can be instantiated or assigned to Tenant A's data. However, as the demand decreases, the indexing nodes can be reassigned to a different tenant, or terminated. Further, in some embodiments, a component of the indexing system 112 can concurrently process data from the different tenants.

In some embodiments, one instance of query system 114 may be shared by multiple tenants. In some such cases, the same search head can be used to process/execute queries for different tenants and/or the same search nodes can be used to execute query for different tenants. Further, in some such cases, different tenants can be allocated different amounts of compute resources. For example, Tenant A may be assigned more search heads or search nodes based on demand or based on a service level arrangement than another tenant. However, once a search is completed the search head and/or nodes assigned to Tenant A may be assigned to Tenant B, deactivated, or their resource may be re-allocated to other components of the system 102, etc.

In some cases, by sharing more components with different tenants, the functioning of the system 102 can be improved. For example, by sharing components across tenants, the system 102 can improve resource utilization thereby reducing the amount of resources allocated as a whole. For example, if four indexing nodes, two search heads, and four search nodes are reserved for each tenant then those compute resources are unavailable for use by other processes or tenants, even if they go unused. In contrast, by sharing the indexing nodes, search heads, and search nodes with different tenants and instantiating additional compute resources, the system 102 can use fewer resources overall while providing improved processing time for the tenants that are using the compute resources. For example, if tenant A is not using any search nodes and tenant B has many searches running, the system 102 can use search nodes that would have been reserved for tenant A to service tenant B. In this way, the system 102 can decrease the number of compute resources used/reserved, while improving the search time for tenant B and improving compute resource utilization.

Figure 1C:
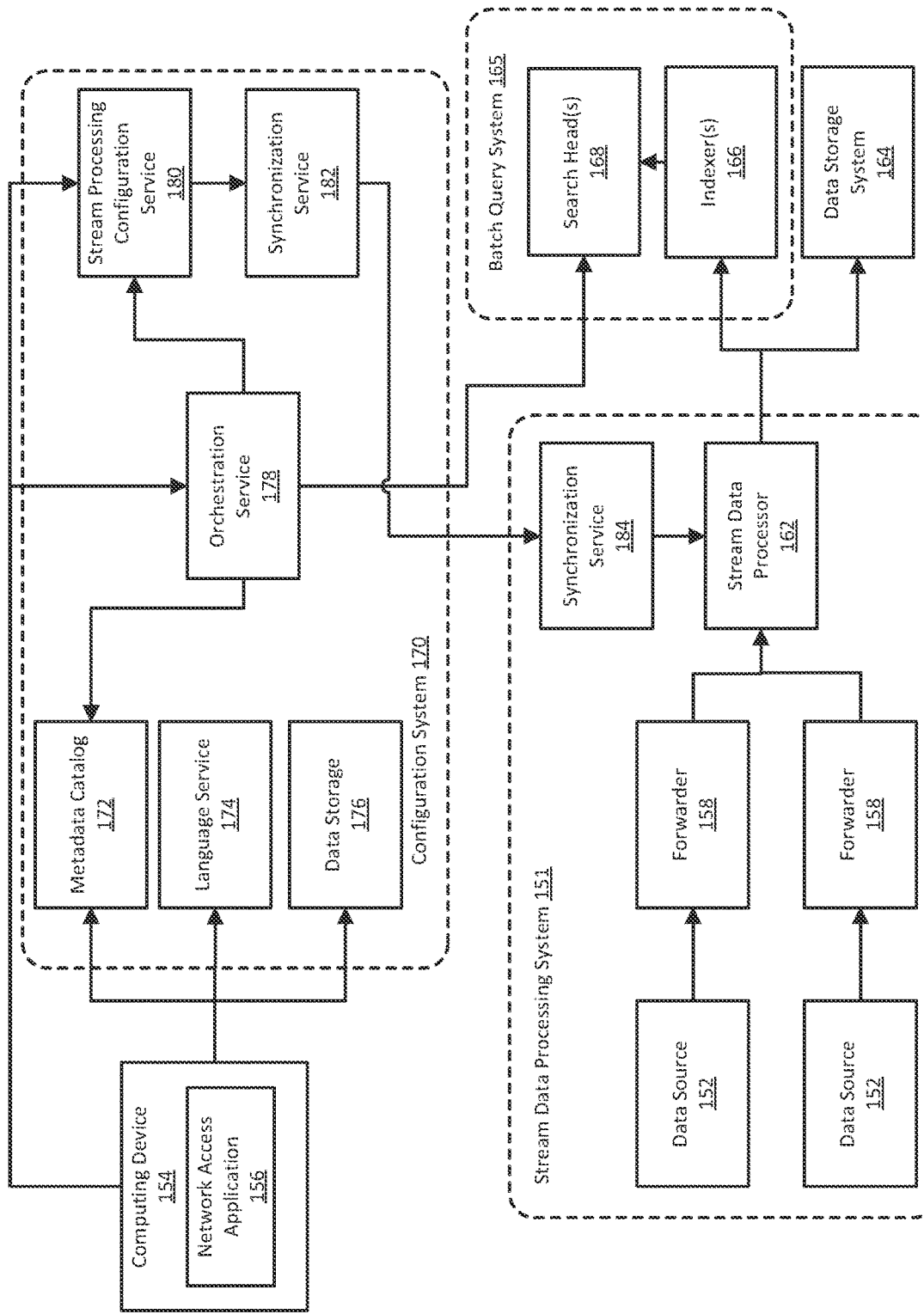
FIG. 1C illustrates an example implementation of a data intake and query system including a stream data processing system.

One example implementation of a data intake and query system including a stream data processing system is shown in FIG. 1C. The data intake and query system of FIG. 1C includes a batch query system 165, including a search head 168 and an indexer 166. The search head 168 and indexer 166 may operate similarly to the various search heads and indexers described herein, such as the search heads described herein with reference to the data intake and query system 102.

As shown in FIG. 1C, the search head 168 and indexer 166 can (in addition or alternatively to obtaining from data sources 152) obtain data from a stream data processor 162 of a stream data processing system 151. The stream data processor 162, in turn, can be configured to obtain data from data sources 152 as an input data stream, manipulate the data according to one or more data stream processing instruction set, and output the resulting data stream to indexers 166 or other network-accessible storage, such as the data storage system 164. For example, the stream data processing system 151 can include one or more forwarders 158 configured to obtain data from data sources 152 and forward the data to the stream data processor 162. In one example, the stream data processor 162 conducts filtering prior to data moving to indexers 166. Illustratively, the stream data processor 162 may identify high value data and route such data to indexers 166, while routing remaining data to the data storage system 164. In another example, the stream data processor 162 conducts other manipulations, such as re-formatting data, compressing data, or the like.

Illustratively, forwarders 158 may be configured to support a variety of protocols, transmission formats, and data formats that may be used by various data sources 152, and to forward such data to a stream data processor 162 in a format acceptable to the process 162. In some implementations, the stream data processor 162 may obtain data directly from data sources 152 and forwarders 158 may be omitted.

The data intake and query system of FIG. 1C can further include a configuration system 170 enabling user configuration of the stream data processing system 151, the batch query system 165, or both. Illustratively, a user may utilize a network access application 156, such as a web browser, executing on a computing device 154 to interact with the configuration system 170 and appropriately configure the stream data processing system 151, the batch query system 165, or both. The configuration system 170 can include a variety of elements facilitating such configuration. For example, the configuration system 170 can include data storage 176 for storage of information used by the network access application 156, such as web pages renderable on the application 156 to display interfaces facilitating configuration. The configuration system 170 can further include a language service 174 to facilitate creation of batch queries and/or pipelines implementable on the data intake and query system. For example, the language service 174 may be configured to interpret textual queries as either or both batch queries and pipelines, and generate computer executable instructions executable by the respective stream data processing system 151 and batch query system 165 to implement the textual queries. The configuration system 170 can further include a metadata catalog 172 storing information regarding the data intake and query system, such as groups (e.g., buckets) of data stored on the batch query system 165, identifiers for such groups, indexes of such groups, etc. and a configuration of the stream data processing system 151, such as data stream processing instruction sets deployed to the system 151 or metadata regarding such pipelines. Illustratively, the network access application 156 may utilize metadata stored within the metadata catalog 172 to enable a user of the computing device 154 to browse data on the data intake and query system, form queries against that data, configure or reconfigure pipelines, and the like.

The configuration system 170 shown in FIG. 1C further includes an orchestration service 178 configured to orchestrate operation of the data intake and query system. For example, the orchestration service 178 can be configured to determine whether to implement a query statement on the stream data processing system 151, the batch query system 165, or both (based, e.g., on a time range specified within the query, a source or destination specified in the query, etc.). The orchestration service 178 can further maintain the metadata catalog 172 based on results of such queries. In accordance with embodiments of the present disclosure, the orchestration service 178 may act as a user interface system 146, monitoring for vulnerabilities of applications installed on the configuration system 170, stream data processing system 151, or batch query system 165 and providing indications of data potentially compromised by such vulnerabilities.

The configuration system 170 in FIG. 1C further includes a stream processing configuration service 180 enabling configuration of the stream data processing system 151. For example, the stream processing configuration service 180 may obtain configuration instructions from the computing device 154 and/or from the orchestration service 178 and generate a configuration for the stream data processing system 151 from such instructions. For example, the stream processing configuration service 180 may generate instructions to implement a data stream processing instruction set based on input from the computing device 154 and/or the orchestration service 178. The stream processing configuration service 180 can illustratively interact with a synchronization service 182 to provide configuration data to the stream data processing system 151. For example, the synchronization service 182 of the configuration system 170 may interact with a synchronization service 184 of the stream data processing system 151 to synchronize a configuration of the stream data process 162 with that generated at the stream processing configuration service 180.

Accordingly, by use of the configuration system 170, a user at a computing device 154 may configure and utilize either or both the stream data processing system 151 and batch query system 165.

In one embodiment, each of the configuration system 170, stream data processing system 151, and batch query system 165 is implemented within a distinct computing environment. For example, the configurations system 170 may be implemented within a multi-tenant hosted computing environment (which hosted computing environment is sometimes referred to as a "cloud computing environment"). The stream data processing system 151 may be implemented within a private computing environment, such as a private data center of an end user of the data intake and query system, which private computing environment may be referred to in some cases as an "on premises" environment. The batch query system 165 may be implemented within a single tenanted hosted computing environment, such as a cloud-hosted environment dedicated to the end user associated with the batch query system 165. Each of the elements of FIG. 1C may be in communication with one another via one or more networks, including private networks and/or public networks. Lines within FIG. 1C should be understood to depict illustrative logical interactions between elements; however, elements may interact in ways not depicted within FIG. 1C.

2.0. DATA INGESTION, INDEXING, AND STORAGE

Figure 2:
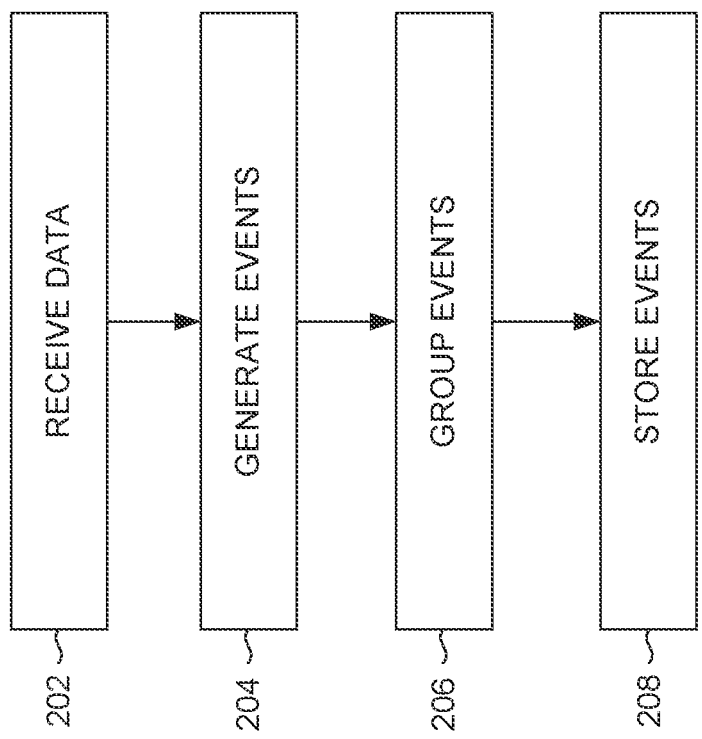
FIG. 2 is a flow diagram illustrating an embodiment of a routine implemented by the data intake and query system to process, index, and store data.

FIG. 2 is a flow diagram illustrating an embodiment of a routine implemented by the system 102 to process, index, and store data received from host devices 104. The data flow illustrated in FIG. 2 is provided for illustrative purposes only. It will be understood that one or more of the steps of the processes illustrated in FIG. 2 may be removed or that the ordering of the steps may be changed. Furthermore, for the purposes of illustrating a clear example, one or more particular system components are described in the context of performing various operations during each of the data flow stages. For example, the intake system 110 is described as receiving machine data and the indexing system 112 is described as generating events, grouping events, and storing events. However, other system arrangements and distributions of the processing steps across system components may be used. For example, in some cases, the intake system 110 may generate events.

At block 202, the intake system 110 receives data from a host device 104. The intake system 110 initially may receive the data as a raw data stream generated by the host device 104. For example, the intake system 110 may receive a data stream from a log file generated by an application server, from a stream of network data from a network device, or from any other source of data. Non-limiting examples of machine data that can be received by the intake system 110 is described herein with reference to FIG. 3A.

In some embodiments, the intake system 110 receives the raw data and may segment the data stream into messages, possibly of a uniform data size, to facilitate subsequent processing steps. The intake system 110 may thereafter process the messages in accordance with one or more rules to conduct preliminary processing of the data. In one embodiment, the processing conducted by the intake system 110 may be used to indicate one or more metadata fields applicable to each message. For example, the intake system 110 may include metadata fields within the messages, or publish the messages to topics indicative of a metadata field. These metadata fields may, for example, provide information related to a message as a whole and may apply to each event that is subsequently derived from the data in the message. For example, the metadata fields may include separate fields specifying each of a host, a source, and a sourcetype related to the message. A host field may contain a value identifying a host name or IP address of a device that generated the data. A source field may contain a value identifying a source of the data, such as a pathname of a file or a protocol and port related to received network data. A sourcetype field may contain a value specifying a particular sourcetype label for the data. Additional metadata fields may also be included, such as a character encoding of the data, if known, and possibly other values that provide information relevant to later processing steps. In certain embodiments, the intake system 110 may perform additional operations, such as, but not limited to, identifying individual events within the data, determining timestamps for the data, further enriching the data, etc.

At block 204, the indexing system 112 generates events from the data. In some cases, as part of generating the events, the indexing system 112 can parse the data of the message. In some embodiments, the indexing system 112 can determine a sourcetype associated with each message (e.g., by extracting a sourcetype label from the metadata fields associated with the message, etc.) and refer to a sourcetype configuration corresponding to the identified sourcetype to parse the data of the message. The sourcetype definition may include one or more properties that indicate to the indexing system 112 to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a sourcetype for the data is unknown to the indexing system 112, the indexing system 112 may infer a sourcetype for the data by examining the structure of the data. Then, the indexing system 112 can apply an inferred sourcetype definition to the data to create the events.

In addition, as part of generating events from the data, the indexing system 112 can determine a timestamp for each event. Similar to the process for parsing machine data, the indexing system 112 may again refer to a sourcetype definition associated with the data to locate one or more properties that indicate instructions for determining a timestamp for each event. The properties may, for example, instruct the indexing system 112 to extract a time value from a portion of data for the event (e.g., using a regex rule), to interpolate time values based on timestamps associated with temporally proximate events, to create a timestamp based on a time the portion of machine data was received or generated, to use the timestamp of a previous event, or use any other rules for determining timestamps, etc.

The indexing system 112 can also associate events with one or more metadata fields. In some embodiments, a timestamp may be included in the metadata fields. These metadata fields may include any number of "default fields" that are associated with all events, and may also include one more custom fields as defined by a user. In certain embodiments, the default metadata fields associated with each event may include a host, source, and sourcetype field including or in addition to a field storing the timestamp.

In certain embodiments, the indexing system 112 can also apply one or more transformations to event data that is to be included in an event. For example, such transformations can include removing a portion of the event data (e.g., a portion used to define event boundaries, extraneous characters from the event, other extraneous text, etc.), masking a portion of event data (e.g., masking a credit card number), removing redundant portions of event data, etc. The transformations applied to event data may, for example, be specified in one or more configuration files and referenced by one or more sourcetype definitions.

At block 206, the indexing system 112 can group events. In some embodiments, the indexing system 112 can group events based on time. For example, events generated within a particular time period or events that have a time stamp within a particular time period can be grouped together to form a bucket. A non-limiting example of a bucket is described herein with reference to FIG. 3B.

In certain embodiments, multiple components of the indexing system, such as an indexing node, can concurrently generate events and buckets. Furthermore, each indexing node that generates and groups events can concurrently generate multiple buckets. For example, multiple processors of an indexing node can concurrently process data, generate events, and generate buckets. Further, multiple indexing nodes can concurrently generate events and buckets. As such, ingested data can be processed in a highly distributed manner.

In some embodiments, as part of grouping events together, the indexing system 112 can generate one or more inverted indexes for a particular group of events. A non-limiting example of an inverted index is described herein with reference to FIG. 3C. In certain embodiments, the inverted indexes can include location information for events of a bucket. For example, the events of a bucket may be compressed into one or more files to reduce their size. The inverted index can include location information indicating the particular file and/or location within a particular file of a particular event.

In certain embodiments, the inverted indexes may include keyword entries or entries for field values or field name-value pairs found in events. In some cases, a field name-value pair can include a pair of words connected by a symbol, such as an equal sign or colon. The entries can also include location information for events that include the keyword, field value, or field value pair. In this way, relevant events can be quickly located. In some embodiments, fields can automatically be generated for some or all of the field names of the field name-value pairs at the time of indexing. For example, if the string "dest=10.0.1.2" is found in an event, a field named "dest" may be created for the event and assigned a value of "10.0.1.2." In certain embodiments, the indexing system can populate entries in the inverted index with field name-value pairs by parsing events using one or more regex rules to determine a field value associated with a field defined by the regex rule. For example, the regex rule may indicate how to find a field value for a userID field in certain events. In some cases, the indexing system 112 can use the sourcetype of the event to determine which regex to use for identifying field values.

Figure 3B:
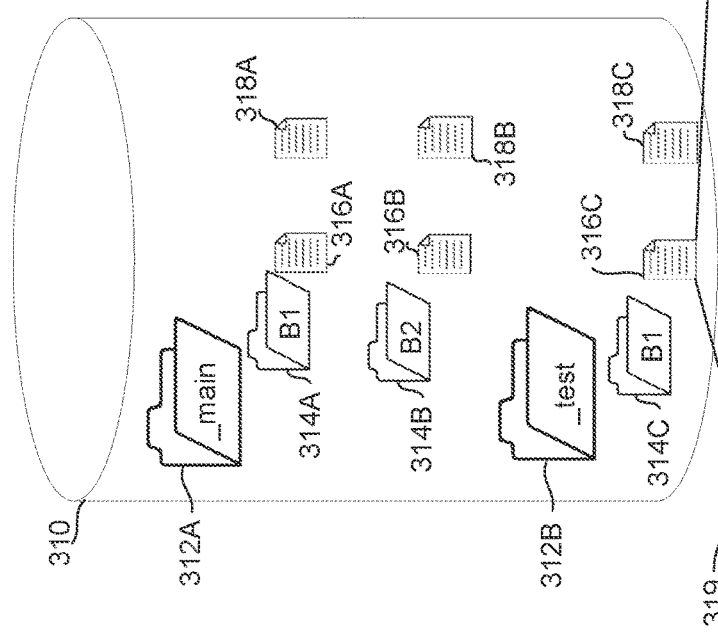

At block 208, the indexing system 112 stores the events with an associated timestamp in the storage system 116, which may be in a local data store and/or in a shared storage system. Timestamps enable a user to search for events based on a time range. In some embodiments, the stored events are organized into "buckets," where each bucket stores events associated with a specific time range based on the timestamps associated with each event. As mentioned, FIGS. 3B and 3C illustrate an example of a bucket. This improves time-based searching, as well as allows for events with recent timestamps, which may have a higher likelihood of being accessed, to be stored in a faster memory to facilitate faster retrieval. For example, buckets containing the most recent events can be stored in flash memory rather than on a hard disk. In some embodiments, each bucket may be associated with an identifier, a time range, and a size constraint.

The indexing system 112 may be responsible for storing the events in the storage system 116. As mentioned, the events or buckets can be stored locally on a component of the indexing system 112 or in a shared storage system 116. In certain embodiments, the component that generates the events and/or stores the events (indexing node) can also be assigned to search the events. In some embodiments separate components can be used for generating and storing events (indexing node) and for searching the events (search node).

By storing events in a distributed manner (either by storing the events at different components or in a shared storage system 116), the query system 114 can analyze events for a query in parallel. For example, using mapreduce techniques, multiple components of the query system (e.g., indexing or search nodes) can concurrently search and provide partial responses for a subset of events to another component (e.g., search head) that combines the results to produce an answer for the query. By storing events in buckets for specific time ranges, the indexing system 112 may further optimize the data retrieval process by the query system 114 to search buckets corresponding to time ranges that are relevant to a query. In some embodiments, each bucket may be associated with an identifier, a time range, and a size constraint. In certain embodiments, a bucket can correspond to a file system directory and the machine data, or events, of a bucket can be stored in one or more files of the file system directory. The file system directory can include additional files, such as one or more inverted indexes, high performance indexes, permissions files, configuration files, etc.

In embodiments where components of the indexing system 112 store buckets locally, the components can include a home directory and a cold directory. The home directory can store hot buckets and warm buckets, and the cold directory stores cold buckets. A hot bucket can refer to a bucket that is capable of receiving and storing additional events. A warm bucket can refer to a bucket that can no longer receive events for storage but has not yet been moved to the cold directory. A cold bucket can refer to a bucket that can no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some embodiments, components of the indexing system 112 may also have a quarantine bucket that contains events having potentially inaccurate information, such as an incorrect timestamp associated with the event or a timestamp that appears to be an unreasonable timestamp for the corresponding event. The quarantine bucket may have events from any time range; as such, the quarantine bucket may always be searched at search time. Additionally, components of the indexing system may store old, archived data in a frozen bucket that is not capable of being searched at search time. In some embodiments, a frozen bucket may be stored in slower and/or larger memory, such as a hard disk, and may be stored in offline and/or remote storage.

In some embodiments, components of the indexing system 112 may not include a cold directory and/or cold or frozen buckets. For example, in embodiments where buckets are copied to a shared storage system 116 and searched by separate components of the query system 114, buckets can be deleted from components of the indexing system as they are stored to the storage system 116. In certain embodiments, the shared storage system 116 may include a home directory that includes warm buckets copied from the indexing system 112 and a cold directory of cold or frozen buckets as described above.

FIG. 3A is a block diagram illustrating an embodiment of machine data received by the system 102. The machine data can correspond to data from one or more host devices 104 or data sources. As mentioned, the data source can correspond to a log file, data stream or other data structure that is accessible by a host device 104. In the illustrated embodiment of FIG. 3A, the machine data has different forms. For example, the machine data 302 may be log data that is unstructured or that does not have any clear structure or fields and include different portions 302A-302E that correspond to different entries of the log and that separated by boundaries. Such data may also be referred to as raw machine data.

The machine data 304 may be referred to as structured or semi-structured machine data as it does include some data in a JSON structure defining certain field and field values (e.g., machine data 304A showing field name: field values container_name: kube-apiserver, host: ip 172 20 43 173.ec2.internal, pod_id: 0a73017b-4efa-11e8-a4e1-0a2bf2ab4bba, etc.), but other parts of the machine data 304 is unstructured or raw machine data (e.g., machine data 304B). The machine data 306 may be referred to as structured data as it includes particular rows and columns of data with field names and field values.

In some embodiments, the machine data 302 can correspond to log data generated by a host device 104 configured as an Apache server, the machine data 304 can correspond to log data generated by a host device 104 in a shared computing resource environment, and the machine data 306 can correspond to metrics data. Given the differences between host devices 104 that generated the log data 302, 304, the form of the log data 302, 304 is different. In addition, as the log data 304 is from a host device 104 in a shared computing resource environment, it can include log data generated by an application being executed within an isolated execution environment (304B, excluding the field name "log:") and log data generated by an application that enables the sharing of computing resources between isolated execution environments (all other data in 304). Although shown together in FIG. 3A, it will be understood that machine data with different hosts, sources, or sourcetypes can be received separately and/or found in different data sources and/or host devices 104.

As described herein, the system 102 can process the machine data based on the form in which it is received. In some cases, the intake system 110 can utilize one or more rules to process the data. In certain embodiments, the intake system 110 can enrich the received data. For example, the intake system may add one or more fields to the data received from the host devices 104, such as fields denoting the host, source, sourcetype, index, or tenant associated with the incoming data. In certain embodiments, the intake system 110 can perform additional processing on the incoming data, such as transforming structured data into unstructured data (or vice versa), identifying timestamps associated with the data, removing extraneous data, parsing data, indexing data, separating data, categorizing data, routing data based on criteria relating to the data being routed, and/or performing other data transformations, etc.

In some cases, the data processed by the intake system 110 can be communicated or made available to the indexing system 112, the query system 114, and/or to other systems. In some embodiments, the intake system 110 communicates or makes available streams of data using one or more shards. For example, the indexing system 112 may read or receive data from one shard and another system may receive data from another shard. As another example, multiple systems may receive data from the same shard.

As used herein, a partition can refer to a logical division of data. In some cases, the logical division of data may refer to a portion of a data stream, such as a shard from the intake system 110. In certain cases, the logical division of data can refer to an index or other portion of data stored in the storage system 116, such as different directories or file structures used to store data or buckets. Accordingly, it will be understood that the logical division of data referenced by the term partition will be understood based on the context of its use.

FIGS. 3B and 3C are block diagrams illustrating embodiments of various data structures for storing data processed by the system 102. FIG. 3B includes an expanded view illustrating an example of machine data stored in a data store 310 of the data storage system 116. It will be understood that the depiction of machine data and associated metadata as rows and columns in the table 319 of FIG. 3B is merely illustrative and is not intended to limit the data format in which the machine data and metadata is stored in various embodiments described herein. In one particular embodiment, machine data can be stored in a compressed or encrypted format. In such embodiments, the machine data can be stored with or be associated with data that describes the compression or encryption scheme with which the machine data is stored. The information about the compression or encryption scheme can be used to decompress or decrypt the machine data, and any metadata with which it is stored, at search time.

In the illustrated embodiment of FIG. 3B the data store 310 includes a directory 312 (individually referred to as 312A, 312B) for each index (or partition) that contains a portion of data stored in the data store 310 and a sub-directory 314 (individually referred to as 314A, 314B, 314C) for one or more buckets of the index. In the illustrated embodiment of FIG. 3B, each sub-directory 314 corresponds to a bucket and includes an event data file 316 (individually referred to as 316A, 316B, 316C) and an inverted index 318 (individually referred to as 318A, 318B, 318C). However, it will be understood that each bucket can be associated with fewer or more files and each sub-directory 314 can store fewer or more files.

In the illustrated embodiment, the data store 310 includes a_main directory 312A associated with an index "main" and a_test directory 312B associated with an index "_test." However, the data store 310 can include fewer or more directories. In some embodiments, multiple indexes can share a single directory or all indexes can share a common directory. Additionally, although illustrated as a single data store 310, it will be understood that the data store 310 can be implemented as multiple data stores storing different portions of the information shown in FIG. 3C. For example, a single index can span multiple directories or multiple data stores.

Furthermore, although not illustrated in FIG. 3B, it will be understood that, in some embodiments, the data store 310 can include directories for each tenant and sub-directories for each index of each tenant, or vice versa. Accordingly, the directories 312A and 312B can, in certain embodiments, correspond to sub-directories of a tenant or include sub-directories for different tenants.

In the illustrated embodiment of FIG. 3B, two sub-directories 314A, 314B of the_main directory 312A and one sub-directory 312C of the_test directory 312B are shown. The sub-directories 314A, 314B, 314C can correspond to buckets of the indexes associated with the directories 312A, 312B. For example, the sub-directories 314A and 314B can correspond to buckets "B1" and "B2," respectively, of the index "_main" and the sub-directory 314C can correspond to bucket "B1" of the index "_test." Accordingly, even though there are two "B1" buckets shown, as each "B1" bucket is associated with a different index (and corresponding directory 312), the system 102 can uniquely identify them.

Although illustrated as buckets "B1" and "B2," it will be understood that the buckets (and/or corresponding sub-directories 314) can be named in a variety of ways. In certain embodiments, the bucket (or sub-directory) names can include information about the bucket. For example, the bucket name can include the name of the index with which the bucket is associated, a time range of the bucket, etc.

As described herein, each bucket can have one or more files associated with it, including, but not limited to one or more raw machine data files, bucket summary files, filter files, inverted indexes (also referred to herein as high performance indexes or keyword indexes), permissions files, configuration files, etc. In the illustrated embodiment of FIG. 3B, the files associated with a particular bucket can be stored in the sub-directory corresponding to the particular bucket. Accordingly, the files stored in the sub-directory 314A can correspond to or be associated with bucket "B1," of index "main," the files stored in the sub-directory 314B can correspond to or be associated with bucket "B2" of index "main," and the files stored in the sub-directory 314C can correspond to or be associated with bucket "B1" of index "test."

FIG. 3B further illustrates an expanded event data file 316C showing an example of data that can be stored therein. In the illustrated embodiment, four events 320, 322, 324, 326 of the machine data file 316C are shown in four rows. Each event 320-326 includes machine data 330 and a timestamp 332. The machine data 330 can correspond to the machine data received by the system 102. For example, in the illustrated embodiment, the machine data 330 of events 320, 322, 324, 326 corresponds to portions 302A, 302B, 302C, 302D, respectively, of the machine data 302 after it was processed by the indexing system 112.

Metadata 334-338 associated with the events 320-326 is also shown in the table 319. In the illustrated embodiment, the metadata 334-338 includes information about a host 334, source 336, and sourcetype 338 associated with the events 320-326. Any of the metadata can be extracted from the corresponding machine data, or supplied or defined by an entity, such as a user or computer system. The metadata fields 334-338 can become part of, stored with, or otherwise associated with the events 320-326. In certain embodiments, the metadata 334-338 can be stored in a separate file of the sub-directory 314C and associated with the machine data file 316C. In some cases, while the timestamp 332 can be extracted from the raw data of each event, the values for the other metadata fields may be determined by the indexing system 112 based on information it receives pertaining to the host device 104 or data source of the data separate from the machine data.

While certain default or user-defined metadata fields can be extracted from the machine data for indexing purposes, the machine data within an event can be maintained in its original condition. As such, in embodiments in which the portion of machine data included in an event is unprocessed or otherwise unaltered, it is referred to herein as a portion of raw machine data. For example, in the illustrated embodiment, the machine data of events 320-326 is identical to the portions of the machine data 302A-302D, respectively, used to generate a particular event. Similarly, the entirety of the machine data 302 may be found across multiple events. As such, unless certain information needs to be removed for some reasons (e.g. extraneous information, confidential information), all the raw machine data contained in an event can be preserved and saved in its original form. Accordingly, the data store in which the event records are stored is sometimes referred to as a "raw record data store." The raw record data store contains a record of the raw event data tagged with the various fields.

In other embodiments, the portion of machine data in an event can be processed or otherwise altered relative to the machine data used to create the event. With reference to the machine data 304, the machine data of a corresponding event (or events) may be modified such that only a portion of the machine data 304 is stored as one or more events. For example, in some cases, only machine data 304B of the machine data 304 may be retained as one or more events or the machine data 304 may be altered to remove duplicate data, confidential information, etc.

In FIG. 3B, the first three rows of the table 319 present events 320, 322, and 324 and are related to a server access log that records requests from multiple clients processed by a server, as indicated by entry of "access.log" in the source column 336. In the example shown in FIG. 3B, each of the events 320-324 is associated with a discrete request made to the server by a client. The raw machine data generated by the server and extracted from a server access log can include the IP address 1140 of the client, the user id 1141 of the person requesting the document, the time 1142 the server finished processing the request, the request line 1143 from the client, the status code 1144 returned by the server to the client, the size of the object 1145 returned to the client (in this case, the gif file requested by the client) and the time spent 1146 to serve the request in microseconds. In the illustrated embodiments of FIGS. 3A and 3B, all the raw machine data retrieved from the server access log is retained and stored as part of the corresponding events 320-324 in the file 316C.

Event 326 is associated with an entry in a server error log, as indicated by "error.log" in the source column 336 that records errors that the server encountered when processing a client request. Similar to the events related to the server access log, all the raw machine data in the error log file pertaining to event 326 can be preserved and stored as part of the event 326.

Saving minimally processed or unprocessed machine data in a data store associated with metadata fields in the manner similar to that shown in FIG. 3B is advantageous because it allows search of all the machine data at search time instead of searching only previously specified and identified fields or field-value pairs. As mentioned above, because data structures used by various embodiments of the present disclosure maintain the underlying raw machine data and use a late-binding schema for searching the raw machines data, it enables a user to continue investigating and learn valuable insights about the raw data. In other words, the user is not compelled to know about all the fields of information that will be needed at data ingestion time. As a user learns more about the data in the events, the user can continue to refine the late-binding schema by defining new extraction rules, or modifying or deleting existing extraction rules used by the system.

FIG. 3C illustrates an embodiment of another file that can be included in one or more subdirectories 314 or buckets. Specifically, FIG. 3C illustrates an exploded view of an embodiments of an inverted index 318B in the sub-directory 314B, associated with bucket "B2" of the index "main," as well as an event reference array 340 associated with the inverted index 318B.

In some embodiments, the inverted indexes 318 can correspond to distinct time-series buckets. As such, each inverted index 318 can correspond to a particular range of time for an index. In the illustrated embodiment of FIG. 3C, the inverted indexes 318A, 318B correspond to the buckets "B1" and "B2," respectively, of the index "_main," and the inverted index 318C corresponds to the bucket "B1" of the index "test." In some embodiments, an inverted index 318 can correspond to multiple time-series buckets (e.g., include information related to multiple buckets) or inverted indexes 318 can correspond to a single time-series bucket.

Each inverted index 318 can include one or more entries, such as keyword (or token) entries 342 or field-value pair entries 344. Furthermore, in certain embodiments, the inverted indexes 318 can include additional information, such as a time range 346 associated with the inverted index or an index identifier 348 identifying the index associated with the inverted index 318. It will be understood that each inverted index 318 can include less or more information than depicted. For example, in some cases, the inverted indexes 318 may omit a time range 346 and/or index identifier 348. In some such embodiments, the index associated with the inverted index 318 can be determined based on the location (e.g., directory 312) of the inverted index 318 and/or the time range of the inverted index 318 can be determined based on the name of the sub-directory 314.

Token entries, such as token entries 342 illustrated in inverted index 318B, can include a token 342A (e.g., "error," "itemID," etc.) and event references 342B indicative of events that include the token. For example, for the token "error," the corresponding token entry includes the token "error" and an event reference, or unique identifier, for each event stored in the corresponding time-series bucket that includes the token "error." In the illustrated embodiment of FIG. 3C, the error token entry includes the identifiers 3, 5, 6, 8, 11, and 12 corresponding to events located in the bucket "B2" of the index "main."

In some cases, some token entries can be default entries, automatically determined entries, or user specified entries. In some embodiments, the indexing system 112 can identify each word or string in an event as a distinct token and generate a token entry for the identified word or string. In some cases, the indexing system 112 can identify the beginning and ending of tokens based on punctuation, spaces, etc. In certain cases, the indexing system 112 can rely on user input or a configuration file to identify tokens for token entries 342, etc. It will be understood that any combination of token entries can be included as a default, automatically determined, or included based on user-specified criteria.

Similarly, field-value pair entries, such as field-value pair entries 344 shown in inverted index 318B, can include a field-value pair 344A and event references 344B indicative of events that include a field value that corresponds to the field-value pair (or the field-value pair). For example, for a field-value pair sourcetype::sendmail, a field-value pair entry 344 can include the field-value pair "sourcetype::sendmail" and a unique identifier, or event reference, for each event stored in the corresponding time-series bucket that includes a sourcetype "sendmail."

In some cases, the field-value pair entries 344 can be default entries, automatically determined entries, or user specified entries. As a non-limiting example, the field-value pair entries for the fields "host," "source," and "sourcetype" can be included in the inverted indexes 318 as a default. As such, all of the inverted indexes 318 can include field-value pair entries for the fields "host," "source," and "sourcetype." As yet another non-limiting example, the field-value pair entries for the field "IP_address" can be user specified and may only appear in the inverted index 318B or the inverted indexes 318A, 318B of the index "main" based on user-specified criteria. As another non-limiting example, as the indexing system 112 indexes the events, it can automatically identify field-value pairs and create field-value pair entries 344. For example, based on the indexing system's 212 review of events, it can identify IP_address as a field in each event and add the IP_address field-value pair entries to the inverted index 318B (e.g., based on punctuation, like two keywords separated by an '=' or ':' etc.). It will be understood that any combination of field-value pair entries can be included as a default, automatically determined, or included based on user-specified criteria.

With reference to the event reference array 340, each unique identifier 350, or event reference, can correspond to a unique event located in the time series bucket or machine data file 316B. The same event reference can be located in multiple entries of an inverted index 318. For example if an event has a sourcetype "splunkd," host "www1" and token "warning," then the unique identifier for the event can appear in the field-value pair entries 344 "sourcetype::splunkd" and "host::www1," as well as the token entry "warning." With reference to the illustrated embodiment of FIG. 3C and the event that corresponds to the event reference 3, the event reference 3 is found in the field-value pair entries 344 "host::hostA," "source::sourceB," "sourcetype::sourcetypeA," and "IP_address::91.205.189.15" indicating that the event corresponding to the event references is from hostA, sourceB, of sourcetypeA, and includes "91.205.189.15" in the event data.

For some fields, the unique identifier is located in only one field-value pair entry for a particular field. For example, the inverted index 318 may include four sourcetype field-value pair entries 344 corresponding to four different sourcetypes of the events stored in a bucket (e.g., sourcetypes: sendmail, splunkd, web_access, and web_service). Within those four sourcetype field-value pair entries, an identifier for a particular event may appear in only one of the field-value pair entries. With continued reference to the example illustrated embodiment of FIG. 3C, since the event reference 7 appears in the field-value pair entry "sourcetype::sourcetypeA," then it does not appear in the other field-value pair entries for the sourcetype field, including "sourcetype::sourcetypeB," "sourcetype::sourcetypeC," and "sourcetype::sourcetypeD."

The event references 350 can be used to locate the events in the corresponding bucket or machine data file 316. For example, the inverted index 318B can include, or be associated with, an event reference array 340. The event reference array 340 can include an array entry 350 for each event reference in the inverted index 318B. Each array entry 350 can include location information 352 of the event corresponding to the unique identifier (non-limiting example: seek address of the event, physical address, slice ID, etc.), a timestamp 354 associated with the event, or additional information regarding the event associated with the event reference, etc.

For each token entry 342 or field-value pair entry 344, the event reference 342B, 344B, respectively, or unique identifiers can be listed in chronological order or the value of the event reference can be assigned based on chronological data, such as a timestamp associated with the event referenced by the event reference. For example, the event reference 1 in the illustrated embodiment of FIG. 3C can correspond to the first-in-time event for the bucket, and the event reference 12 can correspond to the last-in-time event for the bucket. However, the event references can be listed in any order, such as reverse chronological order, ascending order, descending order, or some other order (e.g., based on time received or added to the machine data file), etc. Further, the entries can be sorted. For example, the entries can be sorted alphabetically (collectively or within a particular group), by entry origin (e.g., default, automatically generated, user-specified, etc.), by entry type (e.g., field-value pair entry, token entry, etc.), or chronologically by when added to the inverted index, etc. In the illustrated embodiment of FIG. 3C, the entries are sorted first by entry type and then alphabetically.

In some cases, inverted indexes 318 can decrease the search time of a query. For example, for a statistical query, by using the inverted index, the system 102 can avoid the computational overhead of parsing individual events in a machine data file 316. Instead, the system 102 can use the inverted index 318 separate from the raw record data store to generate responses to the received queries.

3.0. QUERY PROCESSING AND EXECUTION

Figure 4A:
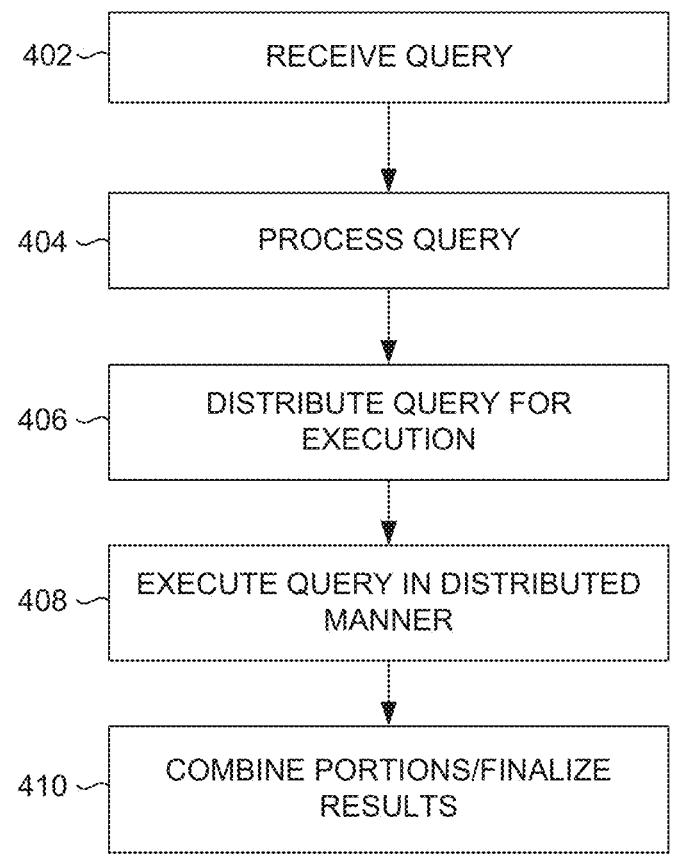
FIG. 4A is a flow diagram illustrating an embodiment of a routine implemented by the query system to execute a query.

FIG. 4A is a flow diagram illustrating an embodiment of a routine implemented by the query system 114 for executing a query. At block 402, the query system 114 receives a search query. As described herein, the query can be in the form of a pipelined command language or other query language and include filter criteria used to identify a set of data and processing criteria used to process the set of data.

At block 404, the query system 114 processes the query. As part of processing the query, the query system 114 can determine whether the query was submitted by an authenticated user and/or review the query to determine that it is in a proper format for the data intake and query system 102, has correct semantics and syntax, etc. In addition, the query system 114 can determine what, if any, configuration files or other configurations to use as part of the query.

In addition as part of processing the query, the query system 114 can determine what portion(s) of the query to execute in a distributed manner (e.g., what to delegate to search nodes) and what portions of the query to execute in a non-distributed manner (e.g., what to execute on the search head). For the parts of the query that are to be executed in a distributed manner, the query system 114 can generate specific commands, for the components that are to execute the query. This may include generating subqueries, partial queries or different phases of the query for execution by different components of the query system 114. In some cases, the query system 114 can use map-reduce techniques to determine how to map the data for the search and then reduce the data. Based on the map-reduce phases, the query system 114 can generate query commands for different components of the query system 114.

As part of processing the query, the query system 114 can determine where to obtain the data. For example, in some cases, the data may reside on one or more indexing nodes or search nodes, as part of the storage system 116 or may reside in a shared storage system or a system external to the system 102. In some cases, the query system 114 can determine what components to use to obtain and process the data. For example, the query system 114 can identify search nodes that are available for the query, etc.

At block 406, the query system 1206 distributes the determined portions or phases of the query to the appropriate components (e.g., search nodes). In some cases, the query system 1206 can use a catalog to determine which components to use to execute the query (e.g., which components include relevant data and/or are available, etc.).

At block 408, the components assigned to execute the query, execute the query. As mentioned, different components may execute different portions of the query. In some cases, multiple components (e.g., multiple search nodes) may execute respective portions of the query concurrently and communicate results of their portion of the query to another component (e.g., search head). As part of the identifying the set of data or applying the filter criteria, the components of the query system 114 can search for events that match (or satisfy) the criteria specified in the query. These criteria can include matching keywords (range of keywords, e.g., using a wildcard) or specific values (or range of values) for certain fields. The searching operations at block 408 may use the late-binding schema to extract values for specified fields from events at the time the query is processed. In some embodiments, one or more rules for extracting field values may be specified as part of a source-type definition in a configuration file or in the query itself. In certain embodiments where search nodes are used to obtain the set of data, the search nodes can send the relevant events back to the search head, or use the events to determine a partial result, and send the partial result back to the search head.

At block 410, the query system 114 combines the partial results and/or events to produce a final result for the query. As mentioned, in some cases, combining the partial results and/or finalizing the results can include further processing the data according to the query. Such processing may entail joining different set of data, transforming the data, and/or performing one or more mathematical operations on the data, preparing the results for display, etc.

In some examples, the results of the query are indicative of performance or security of the IT environment and may help improve the performance of components in the IT environment. This final result may comprise different types of data depending on what the query requested. For example, the results can include a listing of matching events returned by the query, or some type of visualization of the data from the returned events. In another example, the final result can include one or more calculated values derived from the matching events.

The results generated by the query system 114 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring to the search jobs.

The query system 114 can also perform various operations to make the search more efficient. For example, before the query system 114 begins execution of a query, it can determine a time range for the query and a set of common keywords that all matching events include. The query system 114 may then use these parameters to obtain a superset of the eventual results. Then, during a filtering stage, the query system 114 can perform field-extraction operations on the superset to produce a reduced set of search results. This speeds up queries, which may be particularly helpful for queries that are performed on a periodic basis. In some cases, to make the search more efficient, the query system 114 can use information known about certain data sets that are part of the query to filter other data sets. For example, if an early part of the query includes instructions to obtain data with a particular field, but later commands of the query do not rely on the data with that particular field, the query system 114 can omit the superfluous part of the query from execution.

Various embodiments of the present disclosure can be implemented using, or in conjunction with, a pipelined command language. A pipelined command language is a language in which a set of inputs or data is operated on by a first command in a sequence of commands, and then subsequent commands in the order they are arranged in the sequence. Such commands can include any type of functionality for operating on data, such as retrieving, searching, filtering, aggregating, processing, transmitting, and the like. As described herein, a query can thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, can be formulated such that the order in which the commands are arranged defines the order in which the commands are applied to a set of data or the results of an earlier executed command. For example, a first command in a command sequence can include filter criteria used to search or filter for specific data. The results of the first command can then be passed to another command listed later in the command sequence for further processing.

In various embodiments, a query can be formulated as a command sequence defined in a command line of a search UI. In some embodiments, a query can be formulated as a sequence of SPL commands. Some or all of the SPL commands in the sequence of SPL commands can be separated from one another by a pipe symbol "|." In such embodiments, a set of data, such as a set of events, can be operated on by a first SPL command in the sequence, and then a subsequent SPL command following a pipe symbol "|" after the first SPL command operates on the results produced by the first SPL command or other set of data, and so on for any additional SPL commands in the sequence. As such, a query formulated using SPL comprises a series of consecutive commands that are delimited by pipe "|" characters. The pipe character indicates to the system that the output or result of one command (to the left of the pipe) should be used as the input for one of the subsequent commands (to the right of the pipe). This enables formulation of queries defined by a pipeline of sequenced commands that refines or enhances the data at each step along the pipeline until the desired results are attained. Accordingly, various embodiments described herein can be implemented with Splunk Processing Language (SPL) used in conjunction with the SPLUNK® ENTERPRISE system.

While a query can be formulated in many ways, a query can start with a search command and one or more corresponding search terms or filter criteria at the beginning of the pipeline. Such search terms or filter criteria can include any combination of keywords, phrases, times, dates, Boolean expressions, fieldname-field value pairs, etc. that specify which results should be obtained from different locations. The results can then be passed as inputs into subsequent commands in a sequence of commands by using, for example, a pipe character. The subsequent commands in a sequence can include directives for additional processing of the results once it has been obtained from one or more indexes. For example, commands may be used to filter unwanted information out of the results, extract more information, evaluate field values, calculate statistics, reorder the results, create an alert, create summary of the results, or perform some type of aggregation function. In some embodiments, the summary can include a graph, chart, metric, or other visualization of the data. An aggregation function can include analysis or calculations to return an aggregate value, such as an average value, a sum, a maximum value, a root mean square, statistical values, and the like.

Due to its flexible nature, use of a pipelined command language in various embodiments is advantageous because it can perform "filtering" as well as "processing" functions. In other words, a single query can include a search command and search term expressions, as well as data-analysis expressions. For example, a command at the beginning of a query can perform a "filtering" step by retrieving a set of data based on a condition (e.g., records associated with server response times of less than 1 microsecond). The results of the filtering step can then be passed to a subsequent command in the pipeline that performs a "processing" step (e.g. calculation of an aggregate value related to the filtered events such as the average response time of servers with response times of less than 1 microsecond). Furthermore, the search command can allow events to be filtered by keyword as well as field criteria. For example, a search command can filter events based on the word "warning" or filter events based on a field value "10.0.1.2" associated with a field "clientip."

The results obtained or generated in response to a command in a query can be considered a set of results data. The set of results data can be passed from one command to another in any data format. In one embodiment, the set of result data can be in the form of a dynamically created table. Each command in a particular query can redefine the shape of the table. In some implementations, an event retrieved from an index in response to a query can be considered a row with a column for each field value. Columns can contain basic information about the data and/or data that has been dynamically extracted at search time.

Figure 4B:
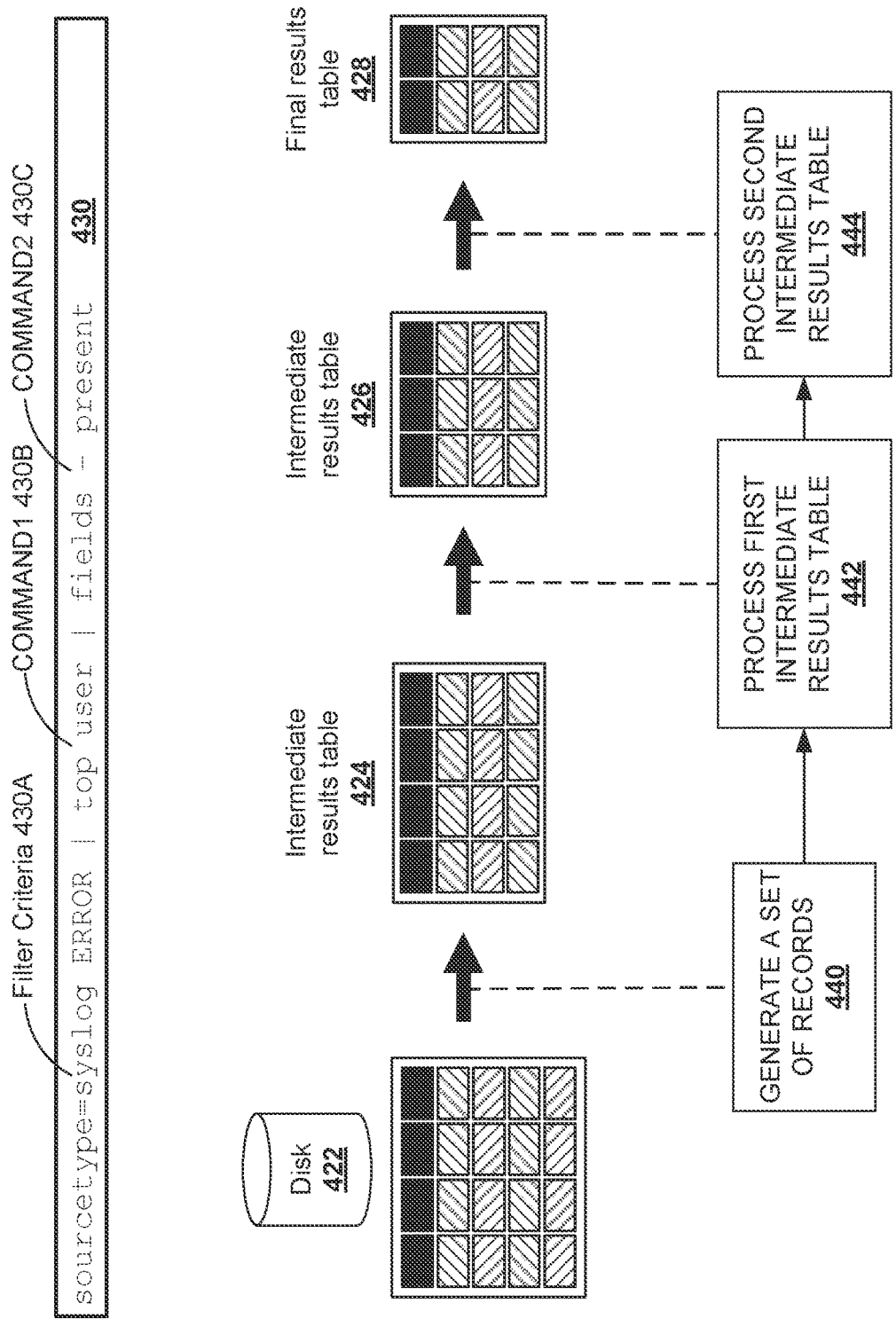
FIG. 4B provides a visual representation of the manner in which a pipelined command language or query can operate

FIG. 4B provides a visual representation of the manner in which a pipelined command language or query can operate in accordance with the disclosed embodiments. The query 430 can be input by the user and submitted to the query system 114. In the illustrated embodiment, the query 430 comprises filter criteria 430A, followed by two commands 430B, 430C (namely, Command1 and Command2). Disk 422 represents data as it is stored in a data store to be searched. For example, disk 422 can represent a portion of the storage system 116 or some other data store that can be searched by the query system 114. Individual rows of can represent different events and columns can represent different fields for the different events. In some cases, these fields can include raw machine data, host, source, and sourcetype.

At block 440, the query system 114 uses the filter criteria 430A (e.g., "sourcetype=syslog ERROR") to filter events stored on the disk 422 to generate an intermediate results table 424. Given the semantics of the query 430 and order of the commands, the query system 114 can execute the filter criteria 430A portion of the query 430 before executing Command1 or Command2.

Rows in the table 424 may represent individual records, where each record corresponds to an event in the disk 422 that satisfied the filter criteria. Columns in the table 424 may correspond to different fields of an event or record, such as "user," "count," percentage," "timestamp," or the raw machine data of an event, etc. Notably, the fields in the intermediate results table 424 may differ from the fields of the events on the disk 422. In some cases, this may be due to the late binding schema described herein that can be used to extract field values at search time. Thus, some of the fields in table 424 may not have existed in the events on disk 422.

Illustratively, the intermediate results table 424 has fewer rows than what is shown in the disk 422 because only a subset of events retrieved from the disk 422 satisfied the filter criteria 430A "sourcetype=syslog ERROR." In some embodiments, instead of searching individual events or raw machine data, the set of events in the intermediate results table 424 may be generated by a call to a pre-existing inverted index.

At block 442, the query system 114 processes the events of the first intermediate results table 424 to generate the second intermediate results table 426. With reference to the query 430, the query system 114 processes the events of the first intermediate results table 424 to identify the top users according to Command1. This processing may include determining a field value for the field "user" for each record in the intermediate results table 424, counting the number of unique instances of each "user" field value (e.g., number of users with the name David, John, Julie, etc.) within the intermediate results table 424, ordering the results from largest to smallest based on the count, and then keeping only the top 10 results (e.g., keep an identification of the top 10 most common users). Accordingly, each row of table 426 can represent a record that includes a unique field value for the field "user," and each column can represent a field for that record, such as fields "user," "count," and "percentage."

At block 444, the query system 114 processes the second intermediate results table 426 to generate the final results table 428. With reference to query 430, the query system 114 applies the command "fields-present" to the second intermediate results table 426 to generate the final results table 428. As shown, the command "fields—present" of the query 430 results in one less column, which may represent that a field was removed during processing. For example, the query system 114 may have determined that the field "percentage" was unnecessary for displaying the results based on the Command2. In such a scenario, each record of the final results table 428 would include a field "user," and "count." Further, the records in the table 428 would be ordered from largest count to smallest count based on the query commands.

It will be understood that the final results table 428 can be a third intermediate results table, which can be pipelined to another stage where further filtering or processing of the data can be performed, e.g., preparing the data for display purposes, filtering the data based on a condition, performing a mathematical calculation with the data, etc. In different embodiments, other query languages, such as the Structured Query Language ("SQL"), can be used to create a query.

As described herein, extraction rules can be used to extract field-value pairs or field values from data. An extraction rule can comprise one or more regex rules that specify how to extract values for the field corresponding to the extraction rule. In addition to specifying how to extract field values, the extraction rules may also include instructions for deriving a field value by performing a function on a character string or value retrieved by the extraction rule. For example, an extraction rule may truncate a character string or convert the character string into a different data format. Extraction rules can be used to extract one or more values for a field from events by parsing the portions of machine data in the events and examining the data for one or more patterns of characters, numbers, delimiters, etc., that indicate where the field begins and, optionally, ends. In certain embodiments, extraction rules can be stored in one or more configuration files. In some cases, a query itself can specify one or more extraction rules.

In some cases, extraction rules can be applied at data ingest by the intake system 110 and/or indexing system 112. For example, the intake system 110 and indexing system 112 can apply extraction rules to ingested data and/or events generated from the ingested data and store results in an inverted index.

The system 102 advantageously allows for search time field extraction. In other words, fields can be extracted from the event data at search time using late-binding schema as opposed to at data ingestion time, which was a major limitation of the prior art systems. Accordingly, extraction rules can be applied at search time by the query system 114. The query system can apply extraction rules to events retrieved from the storage system 116 or data received from sources external to the system 102. Extraction rules can be applied to all the events in the storage system 116 or to a subset of the events that have been filtered based on some filter criteria (e.g., event timestamp values, etc.).

Figure 4C:
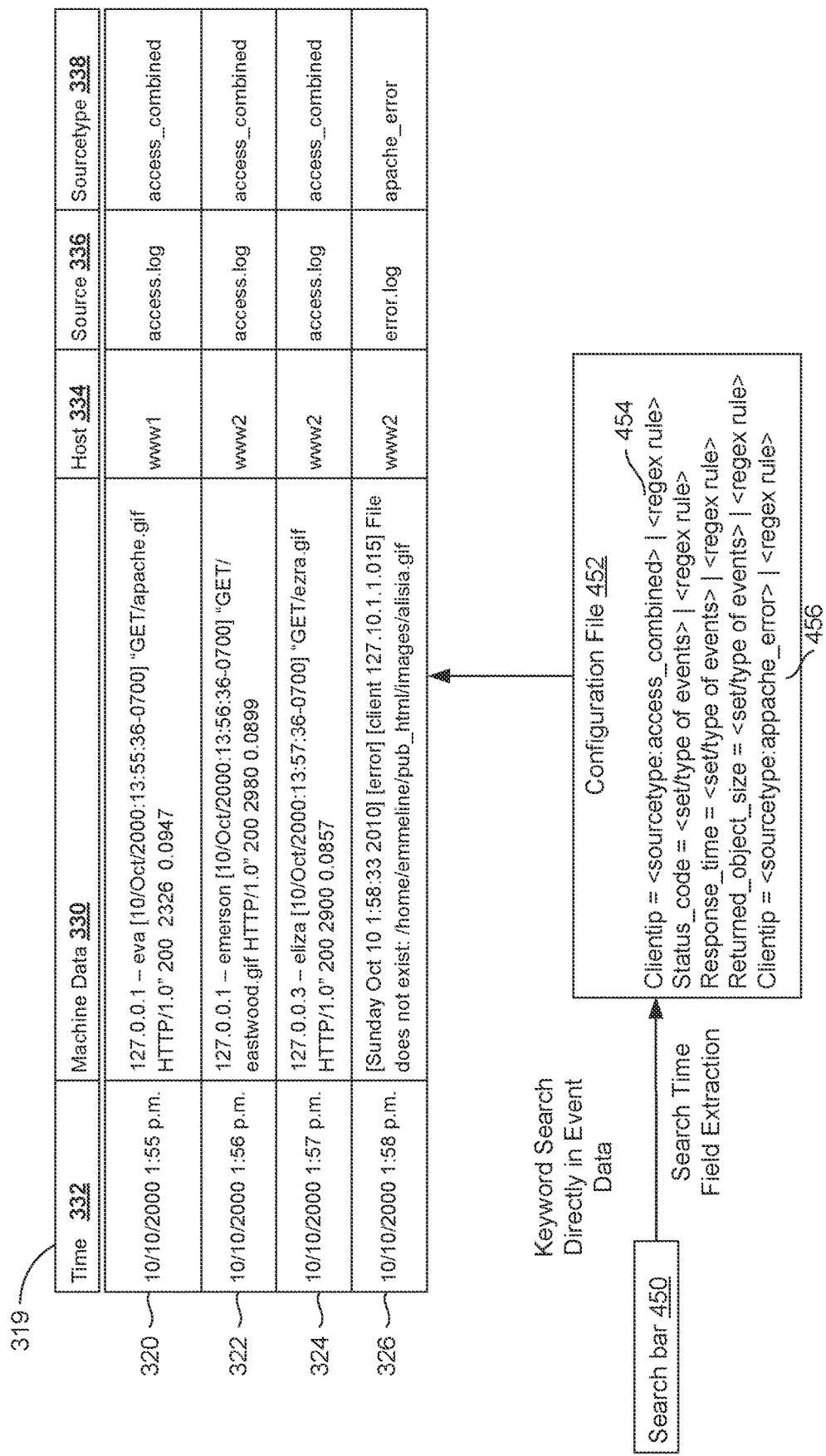
FIG. 4C is a block diagram illustrating an embodiment of a configuration file that includes various extraction rules that can be applied to events.

FIG. 4C is a block diagram illustrating an embodiment of the table 319 showing events 320-326, described previously with reference to FIG. 3B. As described herein, the table 319 is for illustrative purposes, and the events 320-326 may be stored in a variety of formats in an event data file 316 or raw record data store. Further, it will be understood that the event data file 316 or raw record data store can store millions of events. FIG. 4C also illustrates an embodiment of a search bar 450 for entering a query and a configuration file 452 that includes various extraction rules that can be applied to the events 320-326.

As a non-limiting example, if a user inputs a query into search bar 450 that includes only keywords (also known as "tokens"), e.g., the keyword "error" or "warning," the query system 114 can search for those keywords directly in the events 320-326 stored in the raw record data store.

As described herein, the indexing system 112 can optionally generate and use an inverted index with keyword entries to facilitate fast keyword searching for event data. If a user searches for a keyword that is not included in the inverted index, the query system 114 may nevertheless be able to retrieve the events by searching the event data for the keyword in the event data file 316 or raw record data store directly. For example, if a user searches for the keyword "eva," and the name "eva" has not been indexed at search time, the query system 114 can search the events 320-326 directly and return the first event 320. In the case where the keyword has been indexed, the inverted index can include a reference pointer that will allow for a more efficient retrieval of the event data from the data store. If the keyword has not been indexed, the query system 114 can search through the events in the event data file to service the search.

In many cases, a query include fields. The term "field" refers to a location in the event data containing one or more values for a specific data item. Often, a field is a value with a fixed, delimited position on a line, or a name and value pair, where there is a single value to each field name. A field can also be multivalued, that is, it can appear more than once in an event and have a different value for each appearance, e.g., email address fields. Fields are searchable by the field name or field name-value pairs. Some examples of fields are "clientip" for IP addresses accessing a web server, or the "From" and "To" fields in email addresses.

By way of further example, consider the query, "status=404." This search query finds events with "status" fields that have a value of "404." When the search is run, the query system 114 does not look for events with any other "status" value. It also does not look for events containing other fields that share "404" as a value. As a result, the search returns a set of results that are more focused than if "404" had been used in the search string as part of a keyword search. Note also that fields can appear in events as "key=value" pairs such as "user_name=Bob." But in most cases, field values appear in fixed, delimited positions without identifying keys. For example, the data store may contain events where the "user_name" value always appears by itself after the timestamp as illustrated by the following string: "Nov 15 09:33:22 evaemerson."

FIG. 4C illustrates the manner in which configuration files may be used to configure custom fields at search time in accordance with the disclosed embodiments. In response to receiving a query, the query system 114 determines if the query references a "field." For example, a query may request a list of events where the "clientip" field equals "127.0.0.1." If the query itself does not specify an extraction rule and if the field is not an indexed metadata field, e.g., time, host, source, sourcetype, etc., then in order to determine an extraction rule, the query system 114 may, in one or more embodiments, locate configuration file 452 during the execution of the query.

Configuration file 452 may contain extraction rules for various fields, e.g., the "clientip" field. The extraction rules may be inserted into the configuration file 452 in a variety of ways. In some embodiments, the extraction rules can comprise regular expression rules that are manually entered in by the user.

In one or more embodiments, as noted above, a field extractor may be configured to automatically generate extraction rules for certain field values in the events when the events are being created, indexed, or stored, or possibly at a later time. In one embodiment, a user may be able to dynamically create custom fields by highlighting portions of a sample event that should be extracted as fields using a graphical user interface. The system can then generate a regular expression that extracts those fields from similar events and store the regular expression as an extraction rule for the associated field in the configuration file 452.

In some embodiments, the indexing system 112 can automatically discover certain custom fields at index time and the regular expressions for those fields will be automatically generated at index time and stored as part of extraction rules in configuration file 452. For example, fields that appear in the event data as "key=value" pairs may be automatically extracted as part of an automatic field discovery process. Note that there may be several other ways of adding field definitions to configuration files in addition to the methods discussed herein.

Events from heterogeneous sources that are stored in the storage system 116 may contain the same fields in different locations due to discrepancies in the format of the data generated by the various sources. For example, event 326 also contains a "clientip" field, however, the "clientip" field is in a different format from events 320, 322, and 324. Furthermore, certain events may not contain a particular field at all. To address the discrepancies in the format and content of the different types of events, the configuration file 452 can specify the set of events to which an extraction rule applies. For example, extraction rule 454 specifies that it is to be used with events having a sourcetype "access_combined," and extraction rule 456 specifies that it is to be used with events having a sourcetype "apache_error." Other extraction rules shown in configuration file 452 specify a set or type of events to which they apply. In addition, the extraction rules shown in configuration file 452 include a regular expression for parsing the identified set of events to determine the corresponding field value. Accordingly, each extraction rule may pertain to only a particular type of event. Accordingly, if a particular field, e.g., "clientip" occurs in multiple types of events, each of those types of events can have its own corresponding extraction rule in the configuration file 452 and each of the extraction rules would comprise a different regular expression to parse out the associated field value. In some cases, the sets of events are grouped by sourcetype because events generated by a particular source can have the same format.

The field extraction rules stored in configuration file 452 can be used to perform search-time field extractions. For example, for a query that requests a list of events with sourcetype "access_combined" where the "clientip" field equals "127.0.0.1," the query system 114 can locate the configuration file 452 to retrieve extraction rule 454 that allows it to extract values associated with the "clientip" field from the events where the sourcetype is "access_combined" (e.g., events 320-324). After the "clientip" field has been extracted from the events 320, 322, 324, the query system 114 can then apply the field criteria by performing a compare operation to filter out events where the "clientip" field does not equal "127.0.0.1." In the example shown in FIG. 4C, the events 320 and 322 would be returned in response to the user query. In this manner, the query system 114 can service queries with filter criteria containing field criteria and/or keyword criteria.

It should also be noted that any events filtered by performing a search-time field extraction using a configuration file 452 can be further processed by directing the results of the filtering step to a processing step using a pipelined search language. Using the prior example, a user can pipeline the results of the compare step to an aggregate function by asking the query system 114 to count the number of events where the "clientip" field equals "127.0.0.1."

By providing the field definitions for the queried fields at search time, the configuration file 452 allows the event data file or raw record data store to be field searchable. In other words, the raw record data store can be searched using keywords as well as fields, wherein the fields are searchable name/value pairings that can distinguish one event from another event and can be defined in configuration file 452 using extraction rules. In comparison to a search containing field names, a keyword search may result in a search of the event data directly without the use of a configuration file.

Further, the ability to add schema to the configuration file 452 at search time results in increased efficiency and flexibility. A user can create new fields at search time and simply add field definitions to the configuration file 452. As a user learns more about the data in the events, the user can continue to refine the late-binding schema by adding new fields, deleting fields, or modifying the field extraction rules in the configuration file for use the next time the schema is used by the system 102. Because the system 102 maintains the underlying raw data and uses late-binding schema for searching the raw data, it enables a user to continue investigating and learn valuable insights about the raw data long after data ingestion time. Similarly, multiple field definitions can be added to the configuration file to capture the same field across events generated by different sources or sourcetypes. This allows the system 102 to search and correlate data across heterogeneous sources flexibly and efficiently.

The system 102 can use one or more data models to search and/or better understand data. A data model is a hierarchically structured search-time mapping of semantic knowledge about one or more datasets. It encodes the domain knowledge used to build a variety of specialized searches of those datasets. Those searches, in turn, can be used to generate reports.

The above-described system provides significant flexibility by enabling a user to analyze massive quantities of minimally-processed data "on the fly" at search time using a late-binding schema, instead of storing pre-specified portions of the data in a database at ingestion time. This flexibility enables a user to see valuable insights, correlate data, and perform subsequent queries to examine interesting aspects of the data that may not have been apparent at ingestion time.

Performing extraction and analysis operations at search time can involve a large amount of data and require a large number of computational operations, which can cause delays in processing the queries. In some embodiments, the system 102 can employ a number of unique acceleration techniques to speed up analysis operations performed at search time. These techniques include: performing search operations in parallel using multiple components of the query system 114, using an inverted index 118, and accelerating the process of generating reports.

To facilitate faster query processing, a query can be structured such that multiple components of the query system 114 (e.g., search nodes) perform the query in parallel, while aggregation of search results from the multiple components is performed at a particular component (e.g., search head). For example, consider a scenario in which a user enters the query "Search "error" | stats count BY host." The query system 114 can identify two phases for the query, including: (1) subtasks (e.g., data retrieval or simple filtering) that may be performed in parallel by multiple components, such as search nodes, and (2) a search results aggregation operation to be executed by one component, such as the search head, when the results are ultimately collected from the search nodes.

Based on this determination, the query system 114 can generate commands to be executed in parallel by the search nodes, with each search node applying the generated commands to a subset of the data to be searched. In this example, the query system 114 generates and then distributes the following commands to the individual search nodes: "Search "error" | prestats count BY host." In this example, the "prestats" command can indicate that individual search nodes are processing a subset of the data and are responsible for producing partial results and sending them to the search head. After the search nodes return the results to the search head, the search head aggregates the received results to form a single search result set. By executing the query in this manner, the system effectively distributes the computational operations across the search nodes while reducing data transfers. It will be understood that the query system 114 can employ a variety of techniques to use distributed components to execute a query. In some embodiments, the query system 114 can use distributed components for only mapping functions of a query (e.g., gather data, applying filter criteria, etc.). In certain embodiments, the query system 114 can use distributed components for mapping and reducing functions (e.g., joining data, combining data, reducing data, etc.) of a query.

4.0. EXAMPLE USE CASES

The system 102 provides various schemas, dashboards, and visualizations that simplify developers' tasks to create applications with additional capabilities, including but not limited to security, data center monitoring, IT service monitoring, and client/customer insights.

An embodiment of an enterprise security application is as SPLUNK® ENTERPRISE SECURITY, which performs monitoring and alerting operations and includes analytics to facilitate identifying both known and unknown security threats based on large volumes of data stored by the system 102. The enterprise security application provides the security practitioner with visibility into security-relevant threats found in the enterprise infrastructure by capturing, monitoring, and reporting on data from enterprise security devices, systems, and applications. Through the use of the system 102 searching and reporting capabilities, the enterprise security application provides a top-down and bottom-up view of an organization's security posture.

An embodiment of an IT monitoring application is SPLUNK® IT SERVICE INTELLIGENCE™ which performs monitoring and alerting operations. The IT monitoring application also includes analytics to help an analyst diagnose the root cause of performance problems based on large volumes of data stored by the system 102 as correlated to the various services an IT organization provides (a service-centric view). This differs significantly from conventional IT monitoring systems that lack the infrastructure to effectively store and analyze large volumes of service-related events. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, an IT monitoring application system stores large volumes of minimally-processed service-related data at ingestion time for later retrieval and analysis at search time, to perform regular monitoring, or to investigate a service issue. To facilitate this data retrieval process, the IT monitoring application enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the events that pertains to the entity, whether produced by the entity itself or by another machine, and considering the many various ways the entity may be identified in machine data (such as by a URL, an IP address, or machine name). The service and entity definitions can organize events around a service so that all of the events pertaining to that service can be easily identified. This capability provides a foundation for the implementation of Key Performance Indicators.

As described herein, the system 102 can receive heterogeneous data from disparate systems. In some cases, the data from the disparate systems may be related and correlating the data can result in insights into client or customer interactions with various systems of a vendor. To aid in the correlation of data across different systems, multiple field definitions can be added to one or more configuration files to capture the same field or data across events generated by different sources or sourcetypes. This can enable the system 102 to search and correlate data across heterogeneous sources flexibly and efficiently.

Figure 4D:
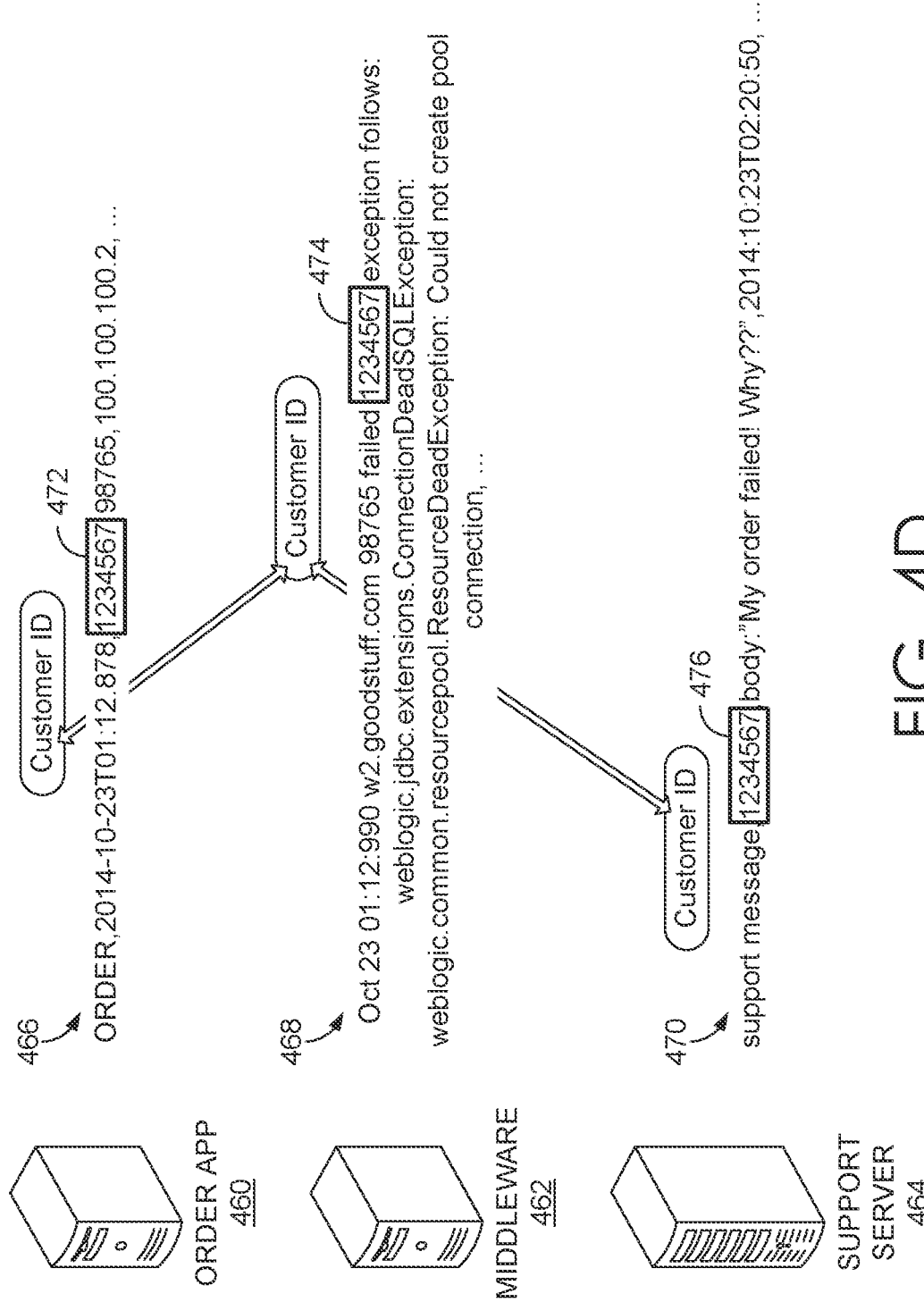
FIG. 4D is a block diagram illustrating an example scenario where a common customer identifier is found among log data received from disparate data sources.

As a non-limiting example and with reference to FIG. 4D, consider a scenario in which a common customer identifier is found among log data received from three disparate data sources. In this example, a user submits an order for merchandise using a vendor's shopping application program 460 running on the user's system. In this example, the order was not delivered to the vendor's server due to a resource exception at the destination server that is detected by the middleware code 462. The user then sends a message to the customer support server 464 to complain about the order failing to complete. The three systems 460, 462, 464 are disparate systems that do not have a common logging format. The shopping application program 460 sends log data 466 to the system 102 in one format, the middleware code 462 sends error log data 468 in a second format, and the support server 464 sends log data 470 in a third format.

Using the log data received at the system 102 from the three systems 460, 462, 464, the vendor can uniquely obtain an insight into user activity, user experience, and system behavior. The system 102 allows the vendor's administrator to search the log data from the three systems 460, 462, 464, thereby obtaining correlated information, such as the order number and corresponding customer ID number of the person placing the order. The system 102 also allows the administrator to see a visualization of related events via a user interface. The administrator can query the system 102 for customer ID field value matches across the log data from the three systems 460, 462, 464 that are stored in the storage system 116. While the customer ID field value exists in the data gathered from the three systems 460, 462, 464, it may be located in different areas of the data given differences in the architecture of the systems. The query system 114 obtains events from the storage system 116 related to the three systems 460, 462, 464. The query system 114 then applies extraction rules to the events in order to extract field values for the field "customer ID" that it can correlate. As described herein, the query system 114 may apply a different extraction rule to each set of events from each system when the event format differs among systems. In this example, a user interface can display to the administrator the events corresponding to the common customer ID field values 472, 474, and 476, thereby providing the administrator with insight into a customer's experience. The system 102 can provide additional user interfaces and reports to aid a user in analyzing the data associated with the customer.

5.0. PARTITION DATASETS AND PARTITION COMMANDS

As described herein, queries received by the query system 114 can be relatively complex and identify a set of data to be processed and a manner of processing the set of data. In some cases, the set of data may be identified using one or more data source identifiers and/or one or more filter criteria, and the manner of processing the set of data may be identified using one or more query commands in the query. In certain cases, the set of data may be large (e.g., on the order of millions or billions of data records), and the query system 114 may process the set of data as a monolithic set of data. Given the size and processing performed on the set of data, it may take the query system 114 several minutes, hours, or more to process the set of data.

As described herein, the query system 114 may improve the retrieval and processing of the set of data by using one or more partitioned datasets. A partitioned dataset may include a dataset that has been logically partitioned in some way, such as based on field values of one or more data fields, data obtained from a lookup, the origin of the data, keywords, etc. As a non-limiting example, a partitioned dataset may include multiple partitions based on the sourcetype of the underlying data (e.g., data records of sourcetype=windows_server may be in one partition and data records of sourcetype=apache_server may be in another partition). In some such cases, the partitioned dataset may include a separate partition for each distinct sourcetype and/or may include a set number of partitions as defined by a user (e.g., a partition for sourcetype=windows_server, a partition for sourcetype=apache_server, and a default partition for all other sourcetypes).

As another example, a partitioned dataset may include multiple partitions based on field values for multiple fields (or multiple values) of the underlying data. For example, using source and sourcetype to determine partitions of a partitioned dataset, the partitioned dataset may include separate partitions for each unique combination of source and sourcetype and/or include a set number of user-defined partitions based on specific sources and sourcetypes (e.g., a partition for sourcetype=windows_server and source=win1, sourcetype=windows_server and source=win2, a partition for sourcetype=apache_server, a partition for source=lin_5, and a default partition for data that does not fall into one of the aforementioned partitions). As yet another example, the partitioned dataset may be partitioned based on its country of origin (e.g., US, China, Canada, Germany, etc.) or other information associated with underlying data. It will be understood that fewer, more, or different criteria may be used to define the partitions.

In some cases, the partitioned datasets may be partitioned at ingest, storage, or search time by any one or any combination of the intake system 110, the indexing system 112, the query system 114 and/or the storage system 116. As such, the system 102 may use the partitioned datasets at any particular time or at different times during the intake, indexing, storage, or query process. U.S. application Ser. No. 18/162,639, incorporated herein by reference, includes some details regarding how partitioned datasets may be partitioned at ingest.

In certain cases, the partitioned datasets are user defined in that a user may determine which datasets to partition and how the partitioned datasets are to be partitioned (e.g., what partition criteria to use to assign data to different partitions and/or the partition criteria values for data in the different partitions). As such, the partitioned datasets may be highly flexible and customizable based on user preference and/or definitions.

The system 102 may use the partitioned datasets to improve or optimize query execution. In some cases, the query system 114 may identify one or more properties of different partitions within a partitioned dataset and use the identified properties to reduce the quantity of records retrieved as the set of data. For example, based on a determination that the data within a particular partition of a partitioned dataset does not include fields used in the query, the query system 114 may not retrieve the particular partition from the source (e.g., and omit it as part of the retrieved set of data). As another example, the query system 114 may identify the partitions that include data having fields used in the query and include an identifier for those partitions in the query (e.g., as filter criteria to reduce the amount of data retrieved as part of the set of data). Accordingly, the partitioned datasets may enable the query system 114 to reduce the amount of data retrieved from a data source, thereby reducing the amount of data processed as part of the query and decreasing query execution time.

In certain cases, the query system 114 may monitor and/or prioritize the processing of the different partitions of a partitioned dataset. For example, the query system 114 may prioritize a particular partition by providing dedicated compute resources (e.g., dedicated processors, memory, pipelines, etc.) for processing the partition, whereas other partitions may share compute resources.

In some cases, data in different partitions of a partitioned dataset may include different fields, be associated with different metadata, and/or have a different structure or format. Based on the differences, a query may include different commands to process the different partitions. For example, if a query involves removing personally identifiable information (PII) from underlying data, the query may include different privacy commands to remove PII from different jurisdictions. This may be due to what is considered PII in the different jurisdictions and/or the structure of the data from the different jurisdictions. For example, where results of a query may contain PII of Japan, United Kingdom, and the United States, the query may include conditional statements and separate functions to remove the PII from the three separate countries. In such a scenario, a user would have to know and enter the different functions of the different countries. If the data implicated additional countries, additional query commands may need to be added.

To address these issues, the query system 114 may enable a user to enter a (single) command (also referred to herein as a partitioned command) that is associated with a set of commands (also referred to herein as partition commands or partition-specific commands) configured to operate on data from one or more partitions of a partitioned dataset. The partitioned command and partition commands may be system defined (e.g., built into the query system 114 by a developer of the query system 114) and/or defined by a user of the query system 114.

The partitioned command may abstract the complexity of processing data from different partitions from the user and enable the user to more quickly enter and initiate execution of a query. For example, with reference to the privacy example, the query system 114 may enable a user to enter one privacy function (e.g., "remove_PII") and internally determine which partition commands will be used to process the data. In some cases, the query system 114 may determine that the data to be processed originates from Japan, UK, and the US, and modify the query (before initiating execution) to include the privacy functions for the different countries (e.g., "remove_PII_JP," "remove_PII_UK," and "remove_PII_US"). In this way, the user may be unaware of the existence or use of the partition commands for the different partitions. Moreover, if additional partition commands are desired for additional partitions (e.g., a PII command for Canada), the query system 114 may enable a user to create and submit an additional partition command. The additional partition command may then be used by additional users.

Although described above and below with reference to the query system 114, it will be understood that the functionality described herein at least with reference to partitioned datasets, partitioned commands, etc., may also be implemented in the stream data processing system 142 and/or the stream data processing system 151. In some such cases, the partitioned commands and partitioned dataset definitions (or partitioned dataset records) may be compiled to a pipeline that effectively continuously executes the logic of the partitioned commands and/or partitioned datasets.

Figure 5:
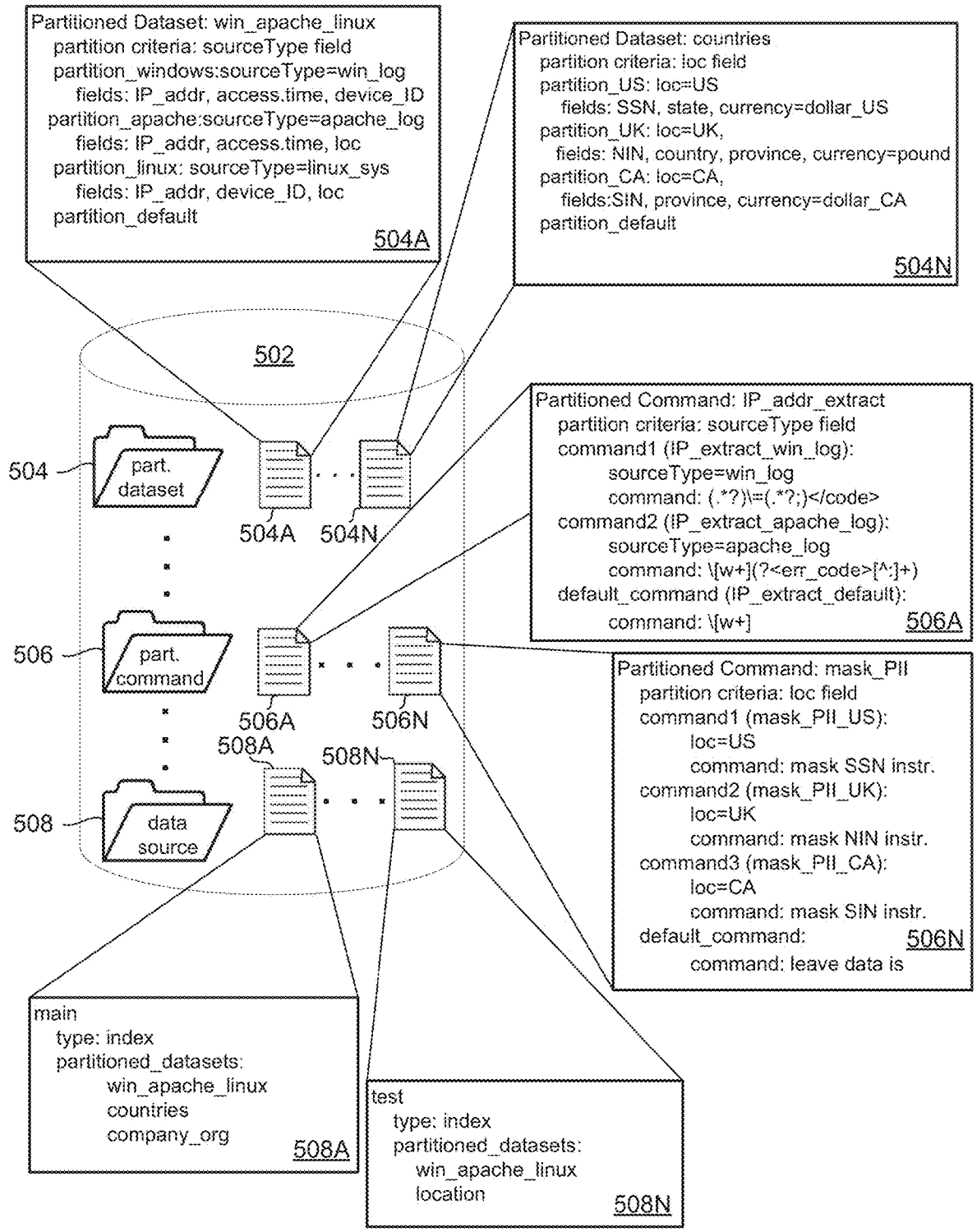
FIG. 5 is a block diagram illustrating an embodiment of a metadata catalog.

FIG. 5 is a block diagram illustrating an example of a metadata catalog 502. The metadata catalog 502 can be implemented using one or more data stores, databases, computing devices, or the like. In some embodiments, the metadata catalog 502 is implemented using one or more relational databases, such as, but not limited to, Dynamo DB and/or Aurora DB.

The metadata catalog 502 may store information about partitioned datasets and/or partitions of the partitioned datasets used or supported by the query system 114. In the illustrated example, the metadata catalog 502 stores and/or maintains records for one or more partitioned datasets (e.g., partitioned data set records 504), one or more partitioned commands (e.g., partitioned command records 506), and one or more data sources (e.g., data source records 508). It will be understood that the metadata catalog 502 may store more or less records as desired. Although shown in the illustrated example as belonging to different folders, or files, it will be understood, that the various partitioned dataset records 504, partitioned command records 506, and data source records 508 may be stored in the same file, directory, and/or database. For example, in certain cases, the metadata catalog 502 may include the partitioned dataset records 504, partitioned command records 506, and data source records 508 as entries in a database.

In the illustrated example of FIG. 5, two partitioned dataset records 504A, 504N, two partition command records 506A, 506N, and two data source records 508A, 508N are shown. However, it will be understood that fewer or more partitioned dataset records 405, partitioned command records 506, and/or data source records 508 may be included in the metadata catalog 502.

The partitioned dataset record(s) 504 may be user specified or system specified. If user specified, a user of the query system 114 may provide information on how particular partitioned datasets are to be partitioned. System specified partition datasets may have the query system 114 provide information on how particular partitioned datasets are to be partitioned. Each partitioned dataset entry 504 may include partition criteria that indicates how the corresponding partitioned dataset is to be partitioned, and/or how to assign data to the different partitions.

The partition or pivot criteria may indicate how data within the partitioned dataset is partitioned and/or identify the criteria used to partition the data of the partitioned dataset. The partition and/or pivot criteria of a partitioned dataset may be chosen based on any number of factors. For example, the criteria may be chosen based on fields with low cardinality (e.g., high commonality at least in association with the partition itself or concepts associated with the partition). In some cases, a user may specify specific criteria for each partition. For example, one partition may be based on a particular field value for one field and another partition may be based on a different field value for a different field. Moreover, users of the query system 114 may create default partitions for data in a partitioned dataset that does not satisfy criteria of other partitions of the partitioned dataset. In some such cases, data within a partitioned dataset may be assigned to a partition even when it does not satisfy the partition criteria values for a particular partition. Although illustrated as using the sourcetype field, it will be understood that the partitioned dataset may use any combination of values, fields, metadata, or other criteria to partition data. In some cases, the partitioned dataset record 504A may omit a partition/pivot criteria. For example, a user may use different criteria for different partitions (e.g., different fields with different field values) to assign data to different partitions of a partitioned dataset. As such, there may not be a common field or criteria used to assign data to each partition.

In some cases, the partitioned data set records 504 may include or track metadata and/or attributes about each partitioned dataset. For example, as different query searches are performed by the query system 114 against certain datasets over time and among multiple query searches, patterns and/or trends concerning data within the dataset may emerge. As one example, partition criteria values associated with each partitioned partition/pivot criteria may be tracked for patterns and/or trends. As another example, usage of each partitioned dataset may be tracked for patterns and/or trends (e.g., how often a certain partition is used and/or reference by query searches).

In the illustrated example of FIG. 5, the partitioned dataset record 504A includes various pieces of information or entries related to the partitioned dataset "win_apache_linux." For example, the partitioned dataset record 504A, includes a partitioned dataset identifier ("win_apache_linux"), partition/pivot criteria, and information regarding some or all of the partitions of the partitioned dataset. In the illustrated example, the partitioned dataset record 504A identifies the sourcetype field as the partition/pivot criteria, indicating that data within the partitioned dataset "win_apache_linux" are assigned partitions based on a field value for the sourcetype field.

The partitioned dataset record 504A also includes information related to the partition criteria values for the different partitions (e.g., the field values or other values that cause data to be assigned to a particular partition). As shown, the partition "partition_windows" includes data records or events with the sourcetype "win_log," the partition "partition_apache" includes data records or events with the sourcetype "apache_log," and the partition "partition_linux" includes data records or events with the sourcetype "linux_sys." The partitioned dataset record 504A also identifies a default partition that includes data that may not otherwise satisfy the partition criteria values of the other partitions.

The partitioned dataset record 504A further includes information about the data records in the different partitions. For example, the partitioned dataset record 504A indicates that the data records or events in the partition "partition_windows" include (e.g., in the data itself, associated with the data, or determinable via one or more lookups, etc.) the fields IP_addr, access.time, device_ID, the data records or events in the partition "partition_apache" include the fields IP_addr, access.time, loc, and the data records or events in the partition "partition_linux" include the fields IP_addr, device_ID, loc.

Similar to the partitioned dataset record 504A, the partitioned dataset record 504N includes various pieces of information or entries related to the partitioned dataset "countries." For example, the partitioned dataset record 504N, includes a partitioned dataset identifier ("countries"), partition/pivot criteria ("loc field"), and information regarding some or all of the partitions of the partitioned dataset. In the illustrated example, the partitioned dataset record 504A identifies the location field as the partition/pivot criteria, indicating that data within the partitioned dataset countries are assigned to partitions based on a field value for the loc field.

As shown, the partition "partition_US" includes data records or events with the partition criteria value "US" for the field "loc," the partition "partition_UK" includes data with the partition criteria value "UK" for the field "loc," and the partition "partition_CA" includes with the partition criteria value "CA" for the field "loc." The partitioned dataset record 504A also identifies a default partition that includes data that may not otherwise satisfy the partition criteria values of the other partitions.

The partitioned dataset record 504N further includes information about the data records in the different partitions. For example, the partitioned dataset record 504N indicates that the data records or events in the partition "partition_US" include (e.g., in the data itself, associated with the data, or determinable via one or more lookups, etc.) the fields SSN, dollar_cost, state, the data records or events in the partition "partition_UK" include the fields NIN, pound_cost, country, province and the data records or events in the partition "partition_CA" include the fields SIN, dollar_cost, province.

Although the examples above describe the partitioning of partitioned datasets based on field values of a particular field, it will be understood that the partitioned datasets may be partitioned in a variety of ways. In some cases, the partitioned datasets may be partitioned using multiple field/field values, metadata associated with the records of a partitioned dataset, data obtained by performing a lookup, and/or other characteristics of the data (e.g., location of device that generated the data, where the data is stored, user that accesses or controls the data, etc.). Accordingly, it will be understood that the partition criteria values for a particular partition may include multiple values.

The partitioned command record(s) 506 may include information or metadata regarding partitioned commands, such as partition-specific commands associated with a particular partitioned command and the partitions on which the partition-specific commands are to operate. In some cases, the partitioned command records 506 may be used to identify the partition-specific commands that are to be used in a particular query (e.g., to process particular partitions referenced in the query).

In the illustrated example of FIG. 5, the partitioned command record 506A stores information related to the partitioned command "IP_addr_extract." For example, the partitioned command record 506A includes a partitioned command identifier ("IP_addr_extract"), partition/pivot criteria, and information regarding some or all of the partition-specific commands of the partitioned command.

In the illustrated example, the partitioned command record 506A identifies the sourcetype field as the partition/pivot criteria, indicating that data processed using "IP_addr_extract" is partitioned based on a field value for the sourcetype field. Although illustrated as using the sourcetype field, it will be understood that the partitioned command may use any one any combination of values, fields, metadata, or other criteria as the partition criteria to partition data. In some cases, the partitioned command record 506A may omit a partition/pivot criteria. For example, a user may use different criteria for different partitions (e.g., different fields with different field values) to assign data to different partitions of a partitioned dataset. As such, there may not be a common field or criteria used to assign data to each partition.

The partitioned command record 506A further identifies multiple partition-specific commands "IP_extract_win_log," "IP_extract_apache_log," "IP_extract_default" of the partitioned command "IP_addr_extract." As described herein, the partition-specific commands are configured to operate on data within particular partitions of a partitioned dataset. In the illustrated example, the partition-specific command "IP_extract_win_log" is configured to operate on data with the partition criteria value of sourcetype "win_log" (which may correspond to "partition_windows" shown in the partitioned dataset record 504A), the partition-specific command "IP_extract_apache_log" is configured to operate on data with the partition criteria value of sourcetype "apache_log," (which may correspond to "partition_apache" shown in the partitioned dataset record 504A), and the partition-specific command "IP_extract_default" is configured to operate on data that does not have sourcetype "win_log" or "apache_log." In addition to identifying the partition criteria (and partition criteria values) used to assign data to the different partition-specific commands, the partitioned command record 506A includes the command or instructions that are to be included in a query to perform the respective partition-specific commands. For example, "IP_extract_win_log" is implemented using the extraction rule "(.*?) \=(.*?;)</code>" and "IP_extract_apache_log" is implemented using the extraction rule "\[w+] (?<err_code>[^:]+)," and "IP_extract_default" is implemented using the extraction rule "\[w+]."

As a non-limiting example, if the query system 114 (or a stream data processing system) receives a query that includes the partitioned function IP_addr_extract, it may replace the reference to IP_addr_extract with one or more query commands to extract IP addresses from data with sourcetype "win_log" using "(.*?)\=(.*?;)</code>" (the "IP_extract_win_log" command), extract IP addresses from data with sourcetype "apache_log" using "\[w+] (?<err_code>[^:]+)" (the "IP_extract_apache_log" command), and extract IP addresses from data with other sourcetypes using the extraction rule "\[w+]" (the "IP_extract_default" command). In certain cases, if the query system 114 determines that none of the data includes the partition criteria values for a particular partition-specific command, it may omit the partition-specific command from the modified query. Put another way, the query system 114 may include partition-specific commands for partitions that it identifies as being part of the set of data to be processed. For example, if the query system 114 determines that none of the data to be processed has sourcetype "win_log," it may omit the "IP_extract_win_log" command from the modified query, etc. (or include the "IP_extract_apache_log" based on a determination that the set of data includes data from the relevant partition). In some cases, the query system 114 may omit or include the default partition-specific command as desired.

Similar to the partitioned command record 506A, the partitioned command record 506N includes various pieces of information or entries related to the partitioned command "mask_PII." For example, the partitioned command record 506N includes a partitioned command identifier ("mask_PII"), partition/pivot criteria ("loc field"), and information regarding some or all of the partition-specific commands of the partitioned command.

In the illustrated example, the partitioned command record 506A identifies the loc field as the partition/pivot criteria, indicating that it may have different partition-specific commands for data with different field values for the loc field. Accordingly, the partitioned command "mask_PII" may be associated with masking personally identifiable information (PII) based at least on a location associated with the data (e.g., where the data originated, where it is processed, etc.).

The partitioned command record 506N further identifies multiple partition-specific commands "mask_PII_US," "mask_PII_UK," "mask_PII_CA" of the partitioned command "mask_PII" and partition criteria values (or partition-specific criteria) for the respective partition-specific commands. The partition-specific command "mask_PII_US" is configured to operate on data from the United States "loc=US," (which may correspond to "partition_US" shown in the partitioned dataset record 504N), the partition-specific command "mask_PII_UK" is configured to operate on data from the United Kingdom "loc-UK," (which may correspond to "partition_UK" shown in the partitioned dataset record 504N), the partition-specific command "mask_PII_CA" is configured to operate on data from Canada "loc-CA," (which may correspond to "partition_CA" shown in the partitioned dataset record 504N), and default_command is configured to operate on data that is not from the United States, the United Kingdom, or Canada.

In addition to identifying the partition criteria (and partition criteria values or partition-specific criteria) used to partition data and assign it to different partition-specific commands, the partitioned command record 506N includes the command or instructions that are to be included in a query to perform the particular partition-specific command. For example, "mask SSN instr." refers to the query commands that may be inserted into a modified query to mask PII in data from the United States, "mask NIN instr." refers to the query commands that may be inserted into a modified query to mask PII in data from the United Kingdom, and "mask SIN instr." refers to the query commands that may be inserted into a modified query to mask PII in data from Canada.

As described herein, the partitioned command records 506 may be dynamically generated and/or modified dynamically by the system. In some cases, the query system 114 (or any other system described herein) may generate the partitioned command records 506 based on sets of data processing commands created by one or more users or tenants. For example, a user may write a function or set of data processing commands to process particular data (e.g., a partition of data). As part of writing the set of data processing commands, the user may indicate the features or partition-specific criteria of the data that is to be processed using the sets of data processing commands. For example, a user or tenant may indicate that the set of data processing commands is meant to mask PII data from the United Kingdom. The user may save or store the set of data processing commands as a function or file in a directory accessible by the query system 114.

Similarly, another user or tenant (asynchronously and unbeknownst to the first user) may create a set of data processing commands to mask PII data from the United States and store the set of data processing commands as a different file in the same or different directory. As such, the system may have access to a set of data processing commands to mask PII data from the U.S. and a separate set of data processing commands to mask PII from the U.K.

Accordingly, the system may generate and/or modify a partitioned command record 506 using the unrelated sets of data processing commands generated by different users and/or tenants. With continued reference to the mask_PII example, the system may associate the two sets of data processing commands (e.g., the mask PII from the U.S. data processing commands and the mask PII from the U.K. data processing commands) with the partitioned command "mask_PII" and generate a body (or content) for the partitioned command using the sets of data processing commands.

In some cases, the query system 114 may generate or modify the body of the data processing command when a query is received (e.g., each time a query is received and/or or at a when a threshold number is received), after a threshold period has elapsed, when a change is made to any set of data processing commands associated with the partitioned command (e.g., a set of data processing commands is added, removed, or modified).

As part of generating the body of the partitioned command, the system can retrieve the sets of data processing commands associated with the partitioned command and generate sets of partition-specific commands corresponding to the sets of data processing commands. For example, for the set of data processing commands corresponding to the mask PII from the U.S., the system may generate one or more commands to be included in the body of the partitioned command that causes the system to mask the PII in data from the U.S. In some cases, this may include commands indicating how to process the data. In certain cases, the generated commands may include a reference to the commands that indicate how to process the data (e.g., like a function call).

In certain cases, as part of generating the partition-specific commands, the system may translate the sets of data processing commands from one query language to another.

The system may also generate partition-specific criteria to indicate which data is to be processed by which sets of partition-specific commands. For example, using the criteria from a particular set of data processing commands, the system may generate the partition-specific criteria used to assign data to be processed by the particular partition-specific commands. As described herein, the partition-specific criteria may include field values, keywords, etc., or any combination thereof.

With reference to partitioned command record 506N, the system generated four sets of partition specific commands corresponding to mask_PII_US, mask_PII_UK, mask_PII_CA, and default. Moreover, using the criteria from the different sets of data processing commands, the system generated the partition-specific criteria "loc=US," "loc=UK," and "loc=CA," respectively.

The default partition-specific command may be used to process data that does not satisfy one of "loc=US," "loc=UK," and "loc-CA" and may be generated separately based on predetermined commands. Although the illustrated example shows only one field-value pair for the partition-specific criteria, it will be understood that the partition-specific criteria may use multiple fields, field-values, keywords, etc. Moreover, different partition-specific criteria for different partition-specific commands may use the same or different fields to assign data.

By generating partitioned commands (or bodies of partitioned commands) from disparate sets of data processing commands generated by different users or tenants, the system may be able to process more data for different users. For example, the system may process data for a user that it would have otherwise been unable to. Moreover, the use of different data processing commands that are created or generated asynchronously enables the system to provide greater processing power and efficiency to users in less time. The data source records 508 may include information or metadata related to data sources from which a set of data may be extracted. In some cases, the data sources records may also be considered partitioned dataset records that reference other partitioned datasets. The data source records 508 may indicate a type of the data source or dataset and identify one or more partitioned datasets that include data that can be found in the respective data source. The data source records 508 may be used to identify partitioned datasets that may be used as part of query. For example, if a query identifies the data source "main," the query system 114 may use the data source record 508A to identify the partitioned datasets found within the data source "main." The query system 114 may use the identified partitioned datasets to review the partitioned data set records 504 to identify properties of partitions within the respective partitioned datasets, such as the partition criteria (e.g., fields, etc.), and use the determined properties to optimize or modify the query. For example, the query system 114 may use the properties to reduce the amount of data retrieved from the data source main and/or to prioritize one partition over another during query execution.

In the illustrated example of FIG. 5, the data source record 508A includes a data source identifier (main), identifies a type of the data source "main" (index), and identifies the partitioned datasets that may be found in the data source "main" (win_apache_linux, countries, and company_org). The type "index" may indicate that the data source is represented as a directory of one or more buckets that contain one or more files of data that can be retrieved as part of query.

Similarly, the data source record 508N includes a data source identifier (test), identifies a type of the data source "test" (index), and identifies the partitioned datasets that may be found in the data source "test" (win_apache_linux and location). Similar to the data source "main," the type "index" of the data source "test" may indicate that the data source is represented as a directory of one or more buckets that contain one or more files of data that can be retrieved as part of query.

Figure 6:
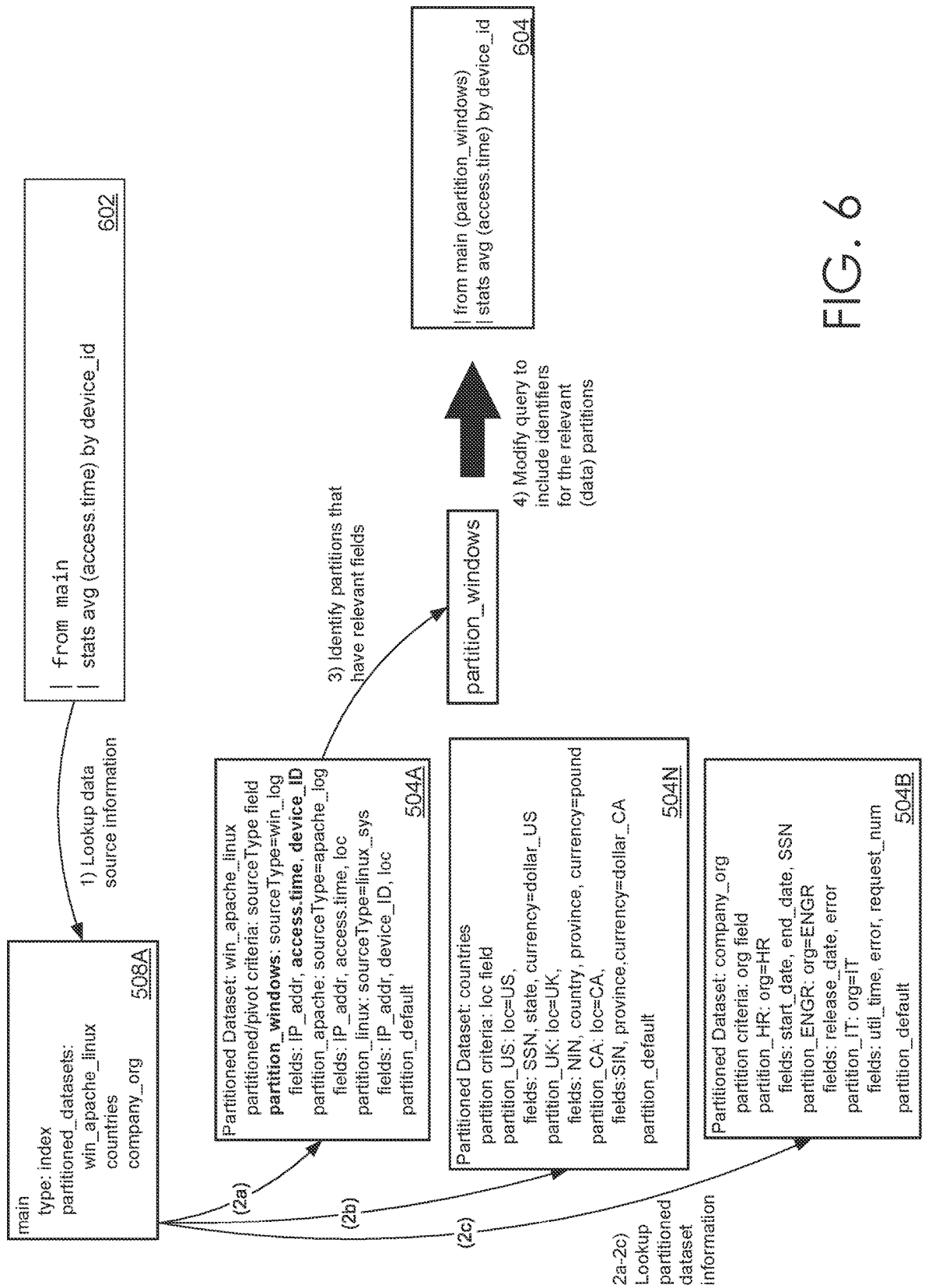
FIG. 6 is a data flow diagram illustrating an embodiment of the data flow and communications between a variety of the components of a query system to execute a query involving partitioned datasets.

FIG. 6 is a data flow diagram illustrating an embodiment of the data flow and communications between the query system 114 as it processes a query 602. In some cases, the query processing described herein with reference to FIG. 6 occurs before the query system 114 executes the query. For example, the steps shown in FIG. 6 may occur as part of a query planning phase. Although reference is made to the query system 114, it will be understood that the functionality described herein may be implemented in the stream data processing system 142 and/or the stream data processing system 151. In some such cases, the partitioned commands and partitioned dataset definitions (or partitioned dataset records) may be compiled to a pipeline that effectively (continuously) executes the logic of the partitioned commands and/or partitioned datasets.

As shown in reference to the query 602, the query system 114 may receive a query string "| from main|stats avg (access.time) by device_id." The "from" command may instruct the query system 114 to use a dataset of a data source associated with the "main" index discussed in FIG. 5. Further, "stats avg (access.time) by device_id" of the query string may instruct the query system 114 to take a statistical average of values within the field "access.time" and perform sorting by "device_id" (e.g., by identification of each device in the data source associated with the "main" index).

At 1), the query system 114 looks up information regarding the data source identified in the query 602 (e.g., information regarding the data source "main"). In some cases, this may include analyzing the data source record 508A, which is associated with the data source. As part of evaluating the data source record 508A, the query system 114 may determine that there are three partitioned datasets to evaluate, "win_apache_linux," "countries," and "company_org" that may include data relevant to the query 602.

At 2a), 2b), and 2c), the query system 114 looks up information regarding the partitioned datasets associated with the query (e.g., the partitioned datasets associated with the data source "main"). As part of steps 2a), 2b), and 2c), the query system 114 evaluates the partitioned dataset record 504A (described previously), the partitioned dataset record 504N (described previously), and a partitioned dataset record 504B associated with the partitioned dataset "company_org."

As illustrated in FIG. 6, the partitioned dataset record 504B includes information regarding the partitioned dataset "company_org," including a partitioned dataset identifier (company_org), partition/pivot criteria (org field), and information about various partitions of the partitioned dataset "company_org" (e.g., that partition_HR includes data that satisfies the partition criteria value (or partition-specific criteria) org=HR and include fields start_date, end_date, and SSN; the partition_ENGR includes data that satisfies the partition criteria value (or partition-specific criteria) org=ENGR and include fields release_date, error; the partition_IT includes data that satisfies the partition criteria value (or partition-specific criteria) org=IT and include fields util_time, error, request_num; and partition_default includes data that does not satisfy the aforementioned partition criteria values).

At 3), the query system 114 identifies partitions of the partitioned datasets that include fields associated with the query 602. For example, the query system 114 may determine that given the query command "stats avg (access.time) by device_id," the data to be processed includes or is associated with field values for the fields "access.time" and "device_id," and that data that does not include field values for these fields will not be included in the final results. Accordingly, the query system 114 may analyze the partitioned dataset records 504 to identify the partitions of the partitioned datasets that include the aforementioned fields. In the illustrated example, the query system 114 determines that data in the partition "partition_windows" includes the fields associated with the query (e.g., access.time and device_id) and that the other partitions do not include (all of) the fields associated with the query.

At 4), the query system 114 modifies the query 602 to form a modified query 604. The modified query 604 references the partition that includes the fields associated with the query (e.g., partition_windows). In the illustrated example, the modified query 604 includes a partition identifier in the modified query 604, however, it will be understood that the query system 114 may reference the partition in other ways. In some cases, the query system 114 may include the partition criteria values (or partition-specific criteria) in the modified query 604. In some cases, the reference to the relevant partition may be used by the query system 114 as filter criteria as part of retrieving the set of data to be searched. In this way, the query system 114 may use the partitioned datasets to reduce the amount of data retrieved and/or processed as part of the query 602 (modified to modified query 604). For example, the query system 114 may discard query 602 in favor of modified query 604 and continue processing (and then execute the modified query 604).

Although FIG. 6 describes the use of partitioned datasets to reduce the amount of data retrieved for a query, it will be understood that the partitioned datasets may be used in a variety of ways to modify and/or optimize a query. In some cases, the query system 114 may use the partitioned datasets to track the progress of a query and/or to prioritize different data in a query. For example, based on a query command or user request, the query system 114 may prioritize the processing of the partition "partition_linux" over other partitions (e.g., by dedicating compute resources to the processing of "partition_linux," whereas the other partitions may share compute resources).

In certain cases, the query system 114 may indicate that certain partitions are to be processed in certain locations or in a particular way. For example, the query system 114 may indicate that partition_UK is to be processed in the United Kingdom and partition_US data is to be processed in the United States, or indicate that the partition_UK data is to be masked in the United Kingdom before being communicated to a location outside of the United Kingdom. In this way, partitioned datasets may enable significant flexibility in the processing of data. Moreover, by allowing a user to select the partitioned datasets, the query system 114 may enable significant customization in how different partitions of partitioned datasets are to be processed. Moreover, as the partitioning may occur at ingest, the system 102 may use the partitions to control the flow or processing of data throughout the lifecycle of the data or at any point during the system's 102 control of the data.

Figure 7:
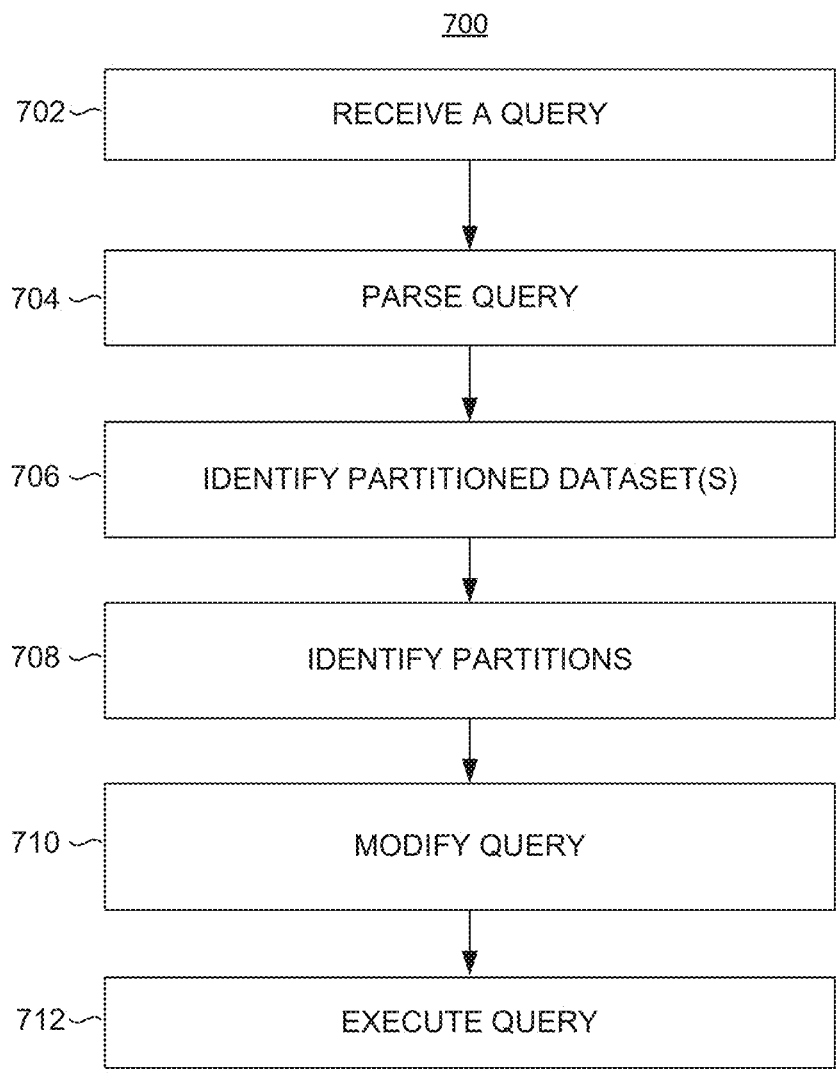
FIG. 7 is a flow diagram illustrating an embodiment of a routine implemented by the query system to plan the execution of a query.

FIG. 7 is a flow diagram illustrating an example of a routine 700 implemented by the query system 114 to execute a query. Although described as being implemented by the query system 114, it will be understood that one or more elements outlined for routine 700 can be implemented by one or more computing devices/components that are associated with the data processing system 140, such as the stream data processing system 142 and/or the stream data processing system 151. Thus, the following illustrative embodiment should not be construed as limiting. The example routine 700 can be implemented, for example, by a computing device that comprises a processor and a non-transitory computer-readable medium. The non-transitory computer readable medium can be storing instructions that, when executed by the processor, can cause the processor to perform the operations of the illustrated routine 700. Alternatively, or additionally, the routine 700 can be implemented using a non-transitory computer-readable medium storing instructions that, when executed by one or more processors, case the one or more processors to perform the operations of the routine 700 of FIG. 7.

At block 702, the query system 114 receives a query. The query system 114 may receive the query from the client device 106. In receiving the query, the query system 114 may perform pre-processing on the query to confirm that the client device 106 has appropriate authorizations to request the query be executed. The client device 106 may also perform a semantic or syntax review of the query to verify that the query is a valid query.

At block 704, the query system 114 parses the query. As part of parsing the query, the query system 114 may identify one or more data source identifiers (or dataset identifiers), one or more commands, and/or one or more field identifiers (or other processing criteria). The data source identifiers may enable the query system 114 to identify a data source to use when processing the query. Similarly, a dataset identifier may enable the query system 114 to identify a set of data to be processed. The field identifiers may identify one or more fields to be used when processing the query. The commands may indicate how the query system 114 is to process the data that it retrieves.

In some cases, the query system 114 may identify field identifiers associated with particular commands. In some cases, the query system 114 identifies a field that is to be used by a particular command to process data. For example, query system 114 may determine that the command "avg (by access.time)" indicates that the function "avg" is to use the field "access.time" to calculate an average for some number of events or data records.

The data source identifier may be used by the query system 114 to identify a data source (e.g., identify "main" as the data source) for use when processing the query. For example, the query system 114 may use the identified data source to further identify partitioned datasets associated with the data source. As described herein, partitioned datasets may be used by the query system 114 to optimize a query, such as the query referred to in the routine 700.

The at least one field identifier (e.g., "access.time" from query 602 in FIG. 6) may be used by the query system 114 to identify one or more fields for use when processing the query. For example, the query system 114 may use the identified one or more fields to further identify which partitions of partitioned datasets include those one or more fields. As described herein, identifying fields in a query that are also included in partitions may enable the query system 114 to optimize a query, such as the query referred to in the routine 700. In certain cases, the field identifier may include a range. For example, the identifier may include a wild card or range of values.

The at least one command (e.g., "stats avg" from query 602 in FIG. 6) may be used by the query system 114 when processing the query. For example, the query system 114 may identify that the "stats avg" (described earlier in FIG. 6) command may be used when processing the query.

At block 706, the query system 114 identifies a partitioned dataset associated with the identified data source. As described herein, the query system 114 may identify partitioned datasets associated with a particular data source by analyzing a data source record (e.g., the data source record 508A) and/or one or more partitioned dataset records in a metadata catalog. As described herein, the metadata catalog may include various records for data sources, partitioned datasets, partitioned commands, etc. In some cases, a data source record may identify one or more partitioned datasets associated with the data source (e.g., that have at least some data in the data source). In certain cases, a partitioned dataset record may identify one or more partitions of the partitioned dataset and indicate how data is assigned to the different partitions (e.g., values for partition criteria, such as field values for fields, that are used to assign data to different partitions of the partitioned dataset).

As part of evaluating the data source record (or partitioned dataset record), the query system 114 may determine that there are one or more partitioned datasets to evaluate. For example, with reference to FIG. 6, the query system 114 may determine that the partitioned datasets "win_apache_linux," "countries," and "company_org" are associated with the data source "main" based on a review of the data source record 508A (however, as also described herein the data source records 508 may be considered a partitioned dataset record with the partitions "win_apache_linux," "countries," and "company_org").

At block 708, the query system 114 identifies a set of partitions of the partitioned dataset that include a data field that satisfies the data field identifier. In some cases, the query system 114 uses a metadata catalog to identify the set of partitions that include the data field. For example, with reference to FIG. 6, the query system 114 may use the field identifiers (e.g. "access.time" and "device_id") to analyze partitioned dataset records (e.g., partitioned dataset records 504A, 504B, 504N) and to identify the partitions of the partitioned datasets that include the fields "access.time" and "device_id." As described herein, in certain cases, the data field identifier may include a range. For example, the data field identifier may include a wildcard or range of values. In some such cases, the query system 114 identifies a set of partitions of the partitioned dataset that include a data field that falls within (satisfies) the range. In certain cases, satisfying the data field identifier may correspond to having a data field that falls within the range or having a data field that exactly matches the data field identifier. In certain cases, fuzzy logic may be used to determine if there is a match.

At block 710, the query system 114 modifies the query. As described herein, the query system 114 may modify the query by referencing the partitions that includes the fields associated with the query. In modifying the query, the query system 114 may include, in the modified query, partition identifiers of the partitions identified at block 708 (e.g., modifying the "from" data source command "from main" to "from main (partition_windows)"). In some cases, the reference to the relevant partition may be used by the query system 114 as filter criteria as part of retrieving the set of data to be searched. With reference to the example of FIG. 6, the query system 114 may include partition identifiers for the partitions "partition_windows" and "partition_apache" or otherwise identify the partitions that include data relevant to the search. The identifiers may be used as filter criteria to reduce the amount of data retrieved from the data source.

At block 712, the query system 114 executes the modified query. As described herein, the query system 114 may execute a query (e.g., the modified query) using partitioned datasets to reduce the amount of data retrieved and/or processed as part of the query. In some cases, the modified query may be further processed to generate a query execution plan, and the query system 114 may execute the query execution plan.

Fewer, more, or different blocks may be used with routine 700. In some cases, blocks 704 may be combined such that the query system 114 identifies the partitioned dataset as part of parsing the query. For example, in some cases, the query may include a partitioned dataset identifier or the data source identifier may be considered an example of a partitioned dataset identifier. Accordingly, the query system 114 may parse the query to identify a partitioned dataset identifier and then identify partitions associated with the partitioned dataset (e.g., block 708).

Figure 8:
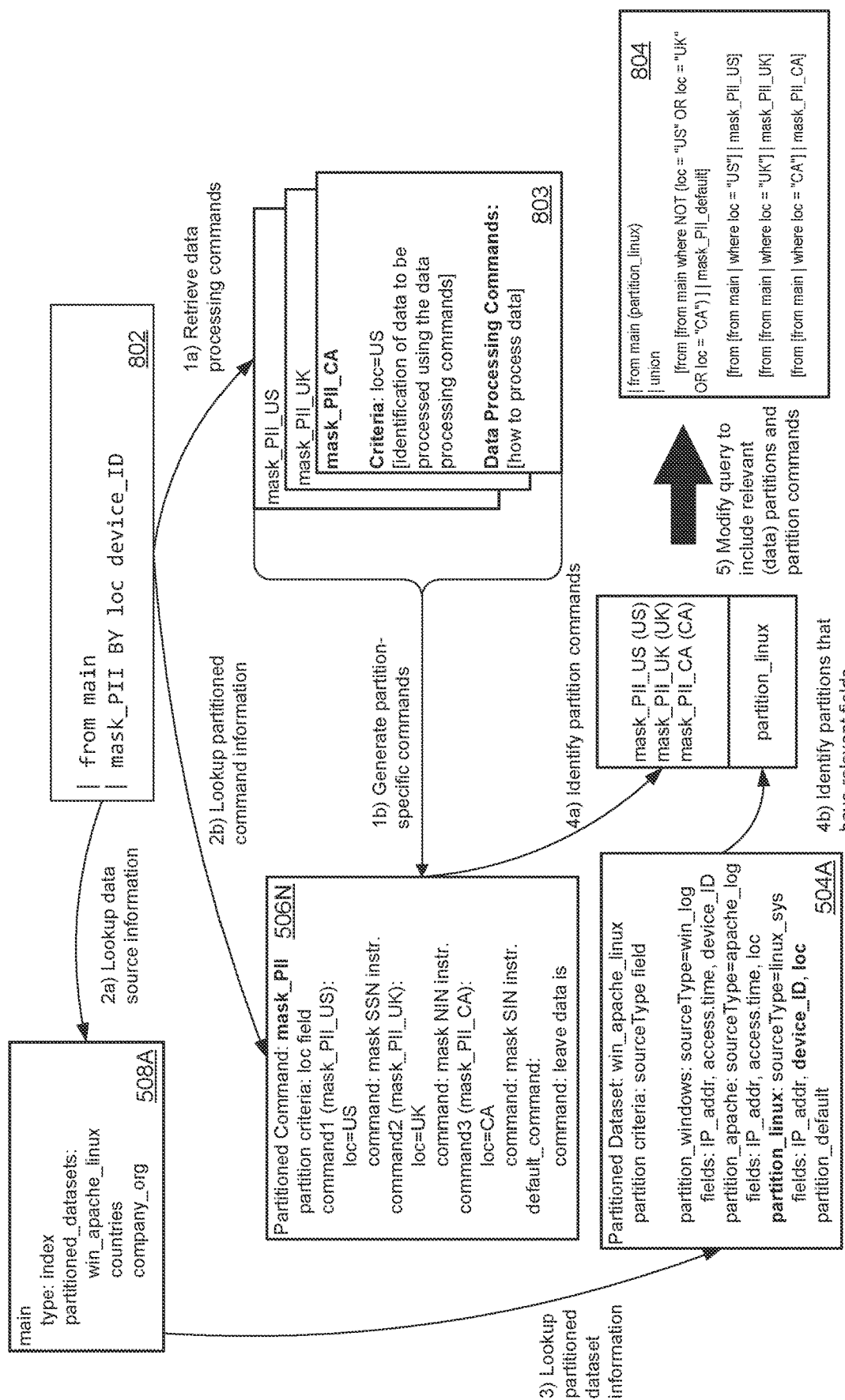
FIG. 8 is a data flow diagram illustrating an embodiment of the data flow and communications between a variety of the components of the data intake and query system to execute a query involving partitioned commands.

FIG. 8 is a data flow diagram illustrating an embodiment of the data flow and communications between the query system 114 as it processes a query 802. In some cases, the query processing described herein with reference to FIG. 8 occurs before the query system 114 executes the query. For example, the steps shown in FIG. 8 may occur as part of a query planning phase.

Although reference is made to the query system 114, it will be understood that the functionality described herein may be implemented in the stream data processing system 142 and/or the stream data processing system 151. In some such cases, the partitioned commands and partitioned dataset definitions (or partitioned dataset records) may be compiled to a pipeline that effectively (continuously) executes the logic of the partitioned commands and/or partitioned datasets.

As shown in reference to the query 802, the query system 114 may receive a query string "| from main|mask_PII|stats count by loc, device_ID." The "from" command may instruct the query system 114 to retrieve data from the "main" index. As described herein, the "mask_PII" may be a partitioned command that is configured to mask PII within the data source associated with the "main" index. Furthermore, "stats count by loc, device_ID" of the query string may instruct the query system 114 to perform a statistical counting, by location and device identification, regarding information within the data source associated with the "main" index.

The query system 114 may parse the query 802 to identify its query parameters. As part of processing the query 802, the query system 114 may identify the data source (or partitioned dataset) "main," the commands "mask_PII," "stats," "count," "by," and the field identifiers "loc" and "device_ID." In some cases, the query system 114 identifies the query parameters of the query using a lookup table, index, configuration file, etc. For example, the query system 114 may include an index or configuration file that lists commands and data sources. Using the configuration file, the query system 114 may determine which query parameters of the query 802 are data sources, commands, and user query parameters.

At 1a), the query system 114 retrieves sets of data processing commands 803 associated with the partitioned command "mask_PII." As described herein, the query system 114 may retrieve the sets of data processing commands 803 using or based on the identity (name or identifier) of the partitioned command. For example, the query system 114 may use the identity of the partitioned command to look up a file or directory that includes the sets of data processing commands 803. As another example, the query system 114 may use the identity of the partitioned command to identify a partitioned command record 506 corresponding to the partitioned command and use the partitioned command record 506 to identify the location of the sets of data processing commands corresponding to the partitioned command.

As described herein, a set of data processing commands 803 may include an identifier, one or more criteria, and one or more data processing commands used to process data that satisfies the one or more criteria. In the illustrated example there are three sets of data processing commands 803 corresponding to mask_PII_US, mask_PII_UK, and mask_PII_CA.

At 1b) the query system 114 uses the sets of data processing commands 803 to modify or generate a body for the partitioned command. Generating or modifying the body may include generating or modifying partition-specific commands (or the partitioned command record 506N) and/or partition-specific criteria. In some cases, generating the set of partition-specific commands may include translating a set of data processing commands from a first query language to a second query language.

As described herein, in some cases, the query system 114 may generate a set of partition-specific commands for some or all of the sets of data processing commands 803. In the illustrated example, the query system 114 generates a set of partition-specific commands for each set of data processing commands 803.

In certain cases, the query system 114 may generate a set of partition-specific commands for a subset of the sets of data processing commands 803. For example, in some cases, the query system 114 may generate the partition-specific commands based on the content of the data. For example, as will be described herein with reference to steps 2a), 3), and 4b), the query system 114 may parse the query, data source information, and partitioned dataset information to identify which datasets will be operated on and the content or characteristics of the data. In the event the query system 114 determines that the data to be processed corresponds to a subset of the sets of data processing commands 803 (e.g., not all of the sets of data processing commands 803 would be used to process the data and/or the criteria for some of the sets of data processing commands 803 would not be satisfied by the data), the query system 114 may use the subset of the sets of data processing commands 803 to generate partition-specific commands for the particular query. By generating the partition-specific commands or partitioned command record 506N based on the data to be processed, the query system 114 may reduce the amount of processing at 1b) and/or the size of the 506N. In this way, the query system 114 may reduce the amount of processing power used and/or processing time to generate the partition-specific commands or 506N and to process and execute the query 802.

In certain cases, the partition-specific commands of the partitioned command record 506N may include executable commands interpretable by the query system 114 to process data. In some cases, the partition-specific commands may include a reference to executable commands (e.g., similar to a function call). In certain cases, a set of partition-specific commands may match or be the same as a corresponding set of data processing commands 803.

In addition, as part of generating the partition-specific commands or body of the partitioned command, the query system 114 may generate logic to enable the assignment of data to the different partition-specific commands. For example, the query system 114 may generate a switch or else statement to enable the query system 114 to assign data to the different partition-specific commands. Accordingly, the query system 114 may generate an executable partitioned command for use in further processing and/or executing the query 802.

By generating the partitioned command record 506N or partitioned command body during query processing (e.g., in real time or after receiving the query), the query system 114 is able to provide an up-to-date version of the partitioned command record 506N for use in processing the query 802 and corresponding data of the query.

In some cases, upon retrieving the sets of data processing commands 803, the query system 114 may determine the last time the partitioned command record 506N was updated. If the partitioned command record 506N was last modified after the most recent modification of any of the sets of data processing commands 803, the query system 114 may skip 1b) and/or not modify or generate the partitioned command record 506N (or particular partition-specific commands within the partitioned command record 506N). If, however, the partitioned command record 506N was last modified before the last modification of any of the sets of data processing commands 803, the query system 114 may decide to generate and/or modify the partitioned command record 506N and proceed to step 1b).

At 2a), the query system 114 looks up information regarding the data source identified in the query 802 (e.g., information regarding the data source "main"). As described herein, at least with reference to FIG. 6, in some cases, this may include analyzing the data source record 508A, which is associated with the data source "main." As part of evaluating the data source record 508A, the query system 114 may determine that there are three partitioned datasets to evaluate, "win_apache_linux," "countries," and "company_org" that may include data relevant to the query 802.

At 2b), the query system 114 looks up information regarding the partitioned commands associated with the query. As described herein, the query 802 may include commands that are partitioned commands and other commands that are not partitioned commands. In some such cases, the query system 114 may perform a lookup to determine which of the commands are partitioned commands and which of the commands are not. For at least the partitioned commands, the query system 114 may lookup information in the metadata catalog. As described herein, the metadata catalog may include a partitioned command record 506 for the partitioned commands in a query (e.g., the partitioned command record 506N for "mask_PII" in the query 802). The partitioned command records 506 may include information regarding: partition criteria for the partitioned command (e.g., how data is to be grouped before processing by the partitioned command), partition-specific commands configured for use in processing different partitions, the partition criteria values (e.g., field values) associated with the different partition-specific commands (e.g., the values used to determine which partition-specific command will operate on a particular partition), etc.

At 3), the query system 114 looks up information regarding the partitioned datasets associated with the query, similar to what is described in FIG. 6. Although not illustrated in FIG. 8, it will be understood that as part of 3), the query system 114 may review the information regarding the partitioned datasets "win_apache_linux," "countries," and "company_org" (identified as being associated with the data source "main.")

At 4a), the query system 114 identifies partition commands (or partition-specific commands) associated with the partitioned command "mask_PII" in the query 802. In the illustrated example, the query system 114 identifies the partition commands using the partitioned command record 506N. Specifically, the query system 114 parses or analyzes the partitioned command record 506N to determine that the partition commands "mask_PII_US," "mask_PII_UK," and "mask_PII_CA" are associated with the partitioned command "mask_PII" (e.g., are configured to be used on different partitions of data that correspond to the partitioned command "mask_PII"). For example, the query system 114 may determine that the partitioned command (e.g., "mask_PII") is a placeholder for the partition commands "mask_PII_US," "mask_PII_UK," and "mask_PII_CA," and that the partition commands "mask_PII_US," "mask_PII_UK," and "mask_PII_CA" are configured to operate on different partitions of data (e.g., partition of data that satisfies the partition criteria value (or partition-specific criteria) "loc=US," partition of data that satisfies the partition criteria value (or partition-specific criteria) "loc=UK," and partition of data that satisfies the partition criteria value "loc=CA," etc.).

At 4b), the query system 114 identifies partitions of the partitioned datasets that include fields associated with the query 802 similar to what is described for step 3) in FIG. 6. For example, the query system 114 may determine that given the query command "stats count by loc, device_ID," the data to be processed includes or is associated with field values for the fields "loc" and "device_ID," and data that does not include field values for these fields will not be included in the final results. Accordingly, the query system 114 may analyze the partitioned dataset records 504 to identify the partitions of the partitioned datasets that include the aforementioned fields. In the illustrated example, the query system 114 determines that data in the partition "partition_linux" includes the fields associated with the query (e.g., "loc" and "device_ID").

At 5), the query system 114 modifies the query 802 to form a modified query 804. As part of modifying the query 802, the query system 114 may generate different partitions (or groups of data) for different partition-specific commands. For example, the query system 114 may determine that data that satisfies the partition criteria value (or partition-specific criteria) "loc=US" should be grouped together (e.g., into a partition) and processed using the partition-specific command "mask_PII_US," determine that data that satisfies the partition criteria value (or partition-specific criteria) "loc-UK" should be grouped together (e.g., into a second partition) and processed using the partition-specific command "mask_PII_UK," determine that data that satisfies the partition criteria value (or partition-specific criteria) "loc-CA" should be grouped together (e.g., into a third partition) and processed using the partition-specific command "mask_PII_CA," and determine that data that does not satisfies the partition criteria value (or partition-specific criteria) "loc=US," "loc=UK," or "loc-CA" should be grouped together (e.g., into a fourth partition) and processed using the partition-specific command default_command. Based on the generated groups or partitions, the query system 114 may generate commands for inclusion into the modified query 804.

In the illustrated example, the modified query 804 references the partition commands (e.g., "mask_PII_US," "mask_PII_UK," and "mask_PII_CA") associated with the partitioned command (e.g., "mask_PII") used in the query 802, and identifies the groups of data (or partitions) that are to be processing using the respective partition commands. Specifically, the modified query 804 indicates that data that satisfies "loc=US" is to be processed using "mask_PII_US," and data that satisfies "loc-UK" is to be processed using "mask_PII_UK," data that satisfies "loc-CA" is to be processed using "mask_PII_CA." Although not illustrated in FIG. 8, it will be understood that the query system 114 may include a command indicating that data that does not satisfy "loc=US," "loc-UK," or "loc=CA" is to be processed using the partition-specific command "default_command."

Although illustrated as grouping or partitioning the data based on the partition commands of the partitioned command "mask_PII," it will be understood that the query system 114 may group or partition data multiple times during the query in different ways depending on the partitioned commands in the query 802. For example, the steps 1*a*), 1*b*) 2*a*), 2*b*) 3), 4*a*), 4*b*) and/or 5) may be repeated multiple times for some or all partitioned commands in the query 802. In some such cases, 5) may include the addition of multiple partition commands for different partitioned commands in different locations within the modified query 804.

The modified query 804 also references the partition "partition_linux" that includes the fields associated with the query (e.g., partition_linux). In the illustrated example, the modified query 804 includes certain partition commands, however, it will be understood that the query system 114 may reference fewer or more partition commands based on the partitioned command record 506 at the time of query modification. For example, a user or the query system 114 may associate more partition commands to a partitioned command at a later time (e.g., add new partition command "mask_PII_EU" to the partitioned command "mask_PII").

During execution of a modified query, the query system 114 may partition (or group) the data so that the different partition commands process the different partitions (or groups) of data. In some cases, the query system 114 may partition the data based on partition criteria values (or partition-specific criteria) of the data. For example, based on the modified query 904, the query system 114 may partition data based on the field value for the field "loc" such that data that has the field value (or partition criteria value or partition-specific criteria) "UK" for the field "loc," is processed using the mask_PII_UK command. Similarly, the partition command "mask_PII_US," may be used to process data that satisfies "loc=US," the partition command "mask_PII_CA," may be used to process data that satisfies "loc=CA," and default_command may be used to process data that does not satisfy "loc=US," "loc=UK," or "loc=CA."

It will be understood that any of the steps may occur in a different order and/or concurrently. For examples, any of steps 1*a*), 1*b*), 2*b*), and 4*a*) may occur before, after, or concurrently with any of steps 2*a*), 3), and 4*b*).

Figure 9:
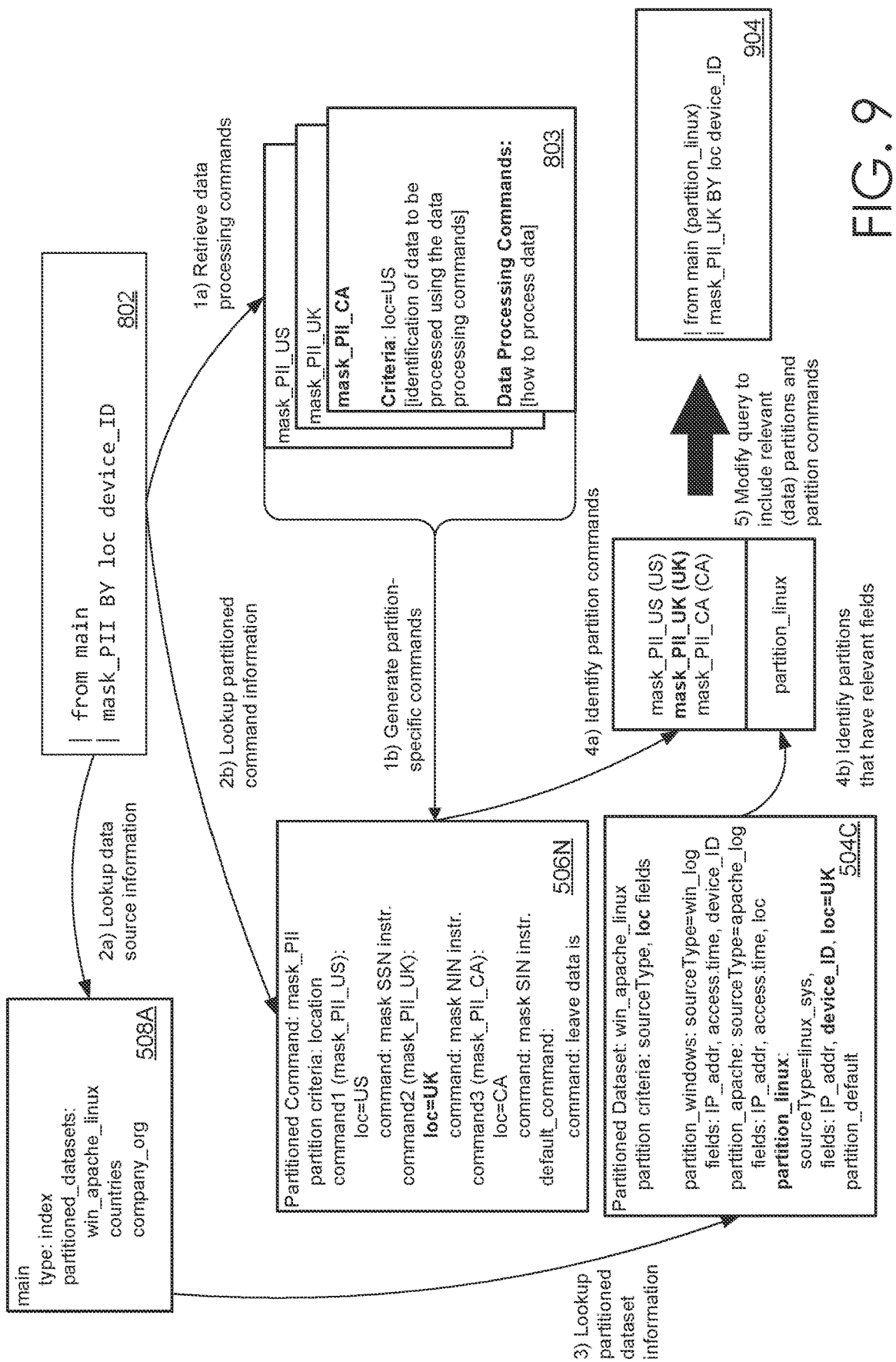
FIG. 9 is a data flow diagram illustrating an embodiment of the data flow and communications between a variety of the components of the data intake and query system to execute a query involving partitioned commands.

FIG. 9 is a data flow diagram illustrating an embodiment of the data flow and communications between the query system 114 as it processes a query 902. In some cases, the query processing described herein with reference to FIG. 9 occurs before the query system 114 executes the query. For example, the steps shown in FIG. 9 may occur as part of a query planning phase. In the illustrated example, the query 902 is the same as the query 802. Moreover, the steps 1*a*), 1*b*), 2*a*), 2*b*), and 3), in FIG. 9, may be similar to or the same as similarly numbered steps in FIG. 8.

Although reference is made to the query system 114, it will be understood that the functionality described herein may be implemented in the stream data processing system 142 and/or the stream data processing system 151. In some such cases, the partitioned commands and partitioned dataset definitions (or partitioned dataset records) may be compiled to a pipeline that effectively (continuously) executes the logic of the partitioned commands and/or partitioned datasets.

At 4*a*), the query system 114 identifies partition commands (or partition-specific commands) associated with the partitioned command "mask_PII" used in the query 902. In the illustrated example, the query system 114 identifies the partition commands using the partitioned command record 506N

At 4*b*), the query system 114 identifies partitions of the partitioned datasets that include fields associated with the query 902. Similar to FIG. 8, the query system 114 may determine that given the query command "stats count by loc, device_ID," the data to be processed includes or is associated with field values for the fields "loc" and "device_ID," and that data that does not include field values for these fields will not be included in the final results. Accordingly, the query system 114 may analyze the partitioned dataset records 504 to identify the partitions of the partitioned datasets that include the aforementioned fields. In the illustrated example, the query system 114 determines that data in the partition "partition_linux" (e.g., in the partitioned dataset record 504C) includes the fields values that may be of use when determining the partition commands (e.g., loc equals "UK").

In the illustrated example, the partitioned dataset record 504C is different from the partitioned dataset record 504A (used in the example illustrated in FIG. 8). Specifically, the partitioned dataset record 504C indicates that the data within that partition has the location United Kingdom (e.g., "loc-UK"), whereas partitioned dataset record 504A does not include the partition criteria value (or partition-specific criteria) "loc=UK" for the partition "partition_linux."

At 5), the query system 114 modifies the query 902 to form a modified query 904. As described herein at least with reference to FIG. 8, in some cases, the query system 114 may determine different groups or partitions of data based on the partition commands. In the illustrated example, as the query system 114 determines that the data from partition "partition_linux" is to be processed using "mask_PII_UK," the query system 114 may not group the data based on the partition criteria values and/or partition commands (e.g., because the data is already part of the same group that will be processed by "mask_PII_UK"). In the illustrated example, the modified query 904 references the partition that includes the fields associated with the query (e.g., "partition_linux") and the partition command (e.g., "mask_PII_UK")

In some cases, using the information obtained from partitioned command record 506N and the partitioned dataset record 504C, the query system 114 may perform one or more optimizations on the query 902. For example, the query system 114 may determine that because the partition "partition_linux" (e.g., the partition to be used during execution of the query) includes the partition criteria value (or partition-specific criteria) "loc=UK," (all of) the data from the partition "partition_linux" will have the location UK. Moreover, as the partition command "mask_PII_UK" is configured to operate on data with "loc=UK," and the other partition commands ("mask_PII_US" and "mask_PII_CA") associated with the partitioned command "mask_PII" are not configured to operate on data with "loc-UK," the query system 114 may determine that the partition commands "mask_PII_US" and "mask_PII_CA" will not be used and may omit them from the modified query 904. The query system 114 may make this determination at step 1*b*, 3*a*), and/or 4). Regardless, the query system 114 may omit partition commands from the modified query 904 that may not be used to execute the query 902 based on an analysis of the data to be processed and/or based on a review of the partitioned dataset records 504. By omitting query commands from the modified query 904 and conditional logic, the query system 114 may reduce the size of the modified query 904, expedite the processing of the modified query 904, reduce the compute resources allocated to the modified query 904, and reduce the execution time of the modified query 904.

During execution of a modified query, the query system 114 may partition the data so that the different partition commands are used to process the different partitions. In some cases, the query system 114 may partition the data based on partition criteria values for the data. For example, based on the modified query 904, the query system 114 may partition data based on the field value for the field "loc" such that data that has the field value "UK" for the field "loc," is processed using the mask_PII_UK command. Similarly, the partition command "mask_PII_US," may be used to process data that satisfies "loc=US," the partition command "mask_PII_CA," may be used to process data that satisfies "loc=CA," and default_command may be used to process data that does not satisfy "loc=US," "loc=UK," or "loc=CA." Moreover, by partitioning the data for the different partition commands, the query system 114 may more easily trace or track partitions as they are being processed as part of the query.

Figure 10:
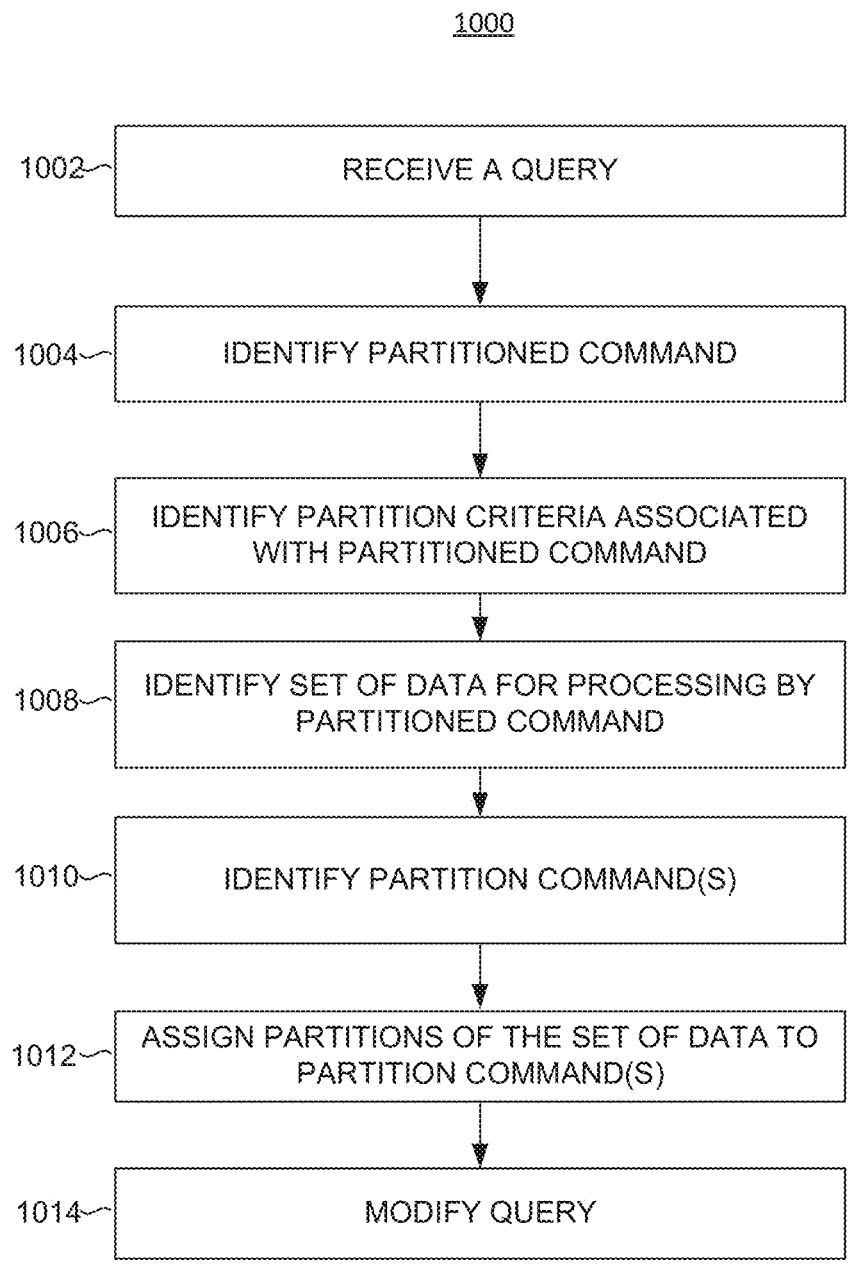
FIG. 10 is a flow diagram illustrating an embodiment of a routine implemented by the query system to execute a query.

FIG. 10 is a flow diagram illustrating an embodiment of a routine 1000 implemented by the query system 114 to execute a query. Although described as being implemented by the query system 114, it will be understood that one or more elements outlined for routine 1000 can be implemented by one or more computing devices/components that are associated with the data processing system 140, such as the stream data processing system 142 and/or the stream data processing system 151. Thus, the following illustrative example should not be construed as limiting. The example routine 1000 can be implemented, for example, by a computing device that comprises a processor and a non-transitory computer-readable medium. The non-transitory computer readable medium can be storing instructions that, when executed by the processor, can cause the processor to perform the operations of the illustrated routine 1000.

At block 1002, the query system 114 receives a query. The query system 114 may receive the query from the client device 106. In receiving the search query, the query system 114 may perform pre-processing on the query to confirm that the client device 106 has appropriate authorizations to request the query be executed. The client device 106 may also perform a semantic or syntax review of the query to verify that the query is a valid query.

At block 1004, the query system 114 identifies a partitioned command. In some cases, the query system 114 identifies the partitioned command as part of parsing the query. In certain cases, the query system 114 identifies the partitioned command based on a partitioned command identifier in the query and/or using a lookup table, configuration file, and/or metadata catalog. For example, the query system 114 may identify the commands in a query and use a lookup table or configuration to identify the commands that are partitioned commands. In some cases, the query system 114 identifies a partitioned command based on a determination that the partitioned command is associated with one or more partition commands or partition-specific commands. For example, if the query system 114 determines that a record for the command (e.g., in a metadata catalog) indicates that there are multiple commands used to process different partitions or groups of data for the command, the query system 114 may determine that the command is a partitioned command.

At block 1006, the query system 114 identifies partition criteria associated with the partitioned command. As described herein, a partitioned command may be associated with partition criteria that indicates a field or other criteria to group or partition the data for the different partition commands. In some cases, the partition criteria may be user determined. In certain cases, the partitioned command uses one criterion to group data. For example, the partitioned command may use one field to group or partition data into different groups. In some cases, the partitioned command uses different partition-specific criteria for different partitions. For example, the partitioned command may identify one field value for one field as the partition criteria value (or partition-specific criteria) for a partition and identify two field values value from two different fields as the partition criteria values for a different partition.

At block 1008, the query system 114 identifies the set of data for processing by the partitioned command. In some cases, the set of data to be processed corresponds to data retrieved from a data source. In certain cases, the set of data corresponds to the output of a preceding command (including a preceding partitioned command). In some cases, the query system 114 identifies the set of data by parsing the query to determine what processing occurs prior to the processing associated with the partitioned command. In certain cases, the query system 114 uses one or more filter criteria to identify the set of data to be processed using the partitioned command.

At block 1010, the query system 114 identifies a set of partition commands (also referred to as partition-specific commands) associated with the partitioned command. The query system 114 may identify the partition commands using the partitioned command in the query. For example, the query system 114 may analyze a record or entry associated with the partitioned command that identifies partition commands associated with the partitioned command. In certain cases, the query system 114 uses a partitioned command record 506 of a metadata catalog to identify the partition commands associated with the partitioned command.

At block 1012, the query system 114 assigns data groups or partitions of the set of data to different partition commands of the partitioned command. As described herein, different partition commands may be associated with different groups or partitions of data. For example, one partition command (e.g., mask_PII_UK) may be configured for use in processing data with a particular field value (UK) for a particular field (loc). Accordingly, the query system 114 may generate groups or partitions of data based on the partition criteria of the partitioned command and assign the partitions of data to particular partition commands.

As described herein, the partition-specific commands and the partitions of the set of data may be associated with particular partition criteria values (e.g., particular field values for particular fields, etc.). For example, each partition of the set of data may be associated with a particular set of field values for one or more fields (or some other form of partition criteria). Similarly, each partition-specific command may be associated with a particular set of field values for one or more fields (or some other form of partition criteria). In some cases, the query system 114 assigns a partition of the set of data that has partition criteria values that match or satisfy the partition criteria values of a partition-specific command to that partition-specific command.

As a non-limiting example and with reference to the partitioned command "IP_addr_extract" in partitioned command record 506A of FIG. 5, the query system 114 may generate three different partitions: data with sourcetype "win_log" (partition 1), data with sourcetype "apache_log" (partition 2), and data with sourcetype that is neither "win_log" nor "apache_log" (partition 3 or default partition). The different partitions may then be assigned to different partition commands of the partitioned command "IP_addr_extract." For example, the aforementioned partition 1 may be assigned to "IP_extract_win_log" (based on the matching partition criteria value (or partition-specific criteria) "sourcetype=win_log"), the partition 2 may be assigned to "IP_extract_apache_log" (based on the matching partition criteria value (or partition-specific criteria) "sourcetype=apache_log") and partition 3 may be assigned to "IP_extract_default" (based on the default nature of "IP_extract_default"). Although the example references one field value and one field, it will be understood that the partitions and partition-specific commands may use multiple values from different fields or other criteria as the partition criteria values (or partition-specific criteria).

At block 1012, the query system 114 modifies the query. In some cases, the query system 114 modifies the query by generating at least one instruction to process the plurality of partitions using the assigned partition-specific commands. In certain cases, the query system 114 may generate an instruction indicating that a particular partition of the set of data is to be processed using a particular partition command. With continued reference to the "IP_addr_extract" example, the query system 114 may generate an instruction such as "where sourcetype=win_log IP_extract_win_log" to indicate that data from the "sourcetype=win_log" partition is to be processed using the partition command "IP_extract_win_log." Similarly, the query system 114 may modify the query for some or all of the partitions of the set of data and/or the partition commands.

Fewer, more, or different commands may be used with the routine 1000. For example, after modifying the query, the query system 114 may further process the query and/or execute it. In some cases, further processing the query may include generating a query execution plan (e.g., that includes query instructions for different computing devices of the query system 114), a directed acyclic graph (DAG), etc. In certain cases, executing the query may include communicating some or all of the query instructions to different computing devices of the query system 114.

In some cases, any one or any combination of the routine 1000 may be combined with the routine 700. For example, as described herein, at least with reference to FIG. 9, the query system may analyze the set of data to be processed (e.g., using a partitioned dataset record 504, determine that one or more partition-specific commands will not be used based on the shape, structure, fields, or content of the data, and omit the partition-specific commands from the modified query.

Figure 11:
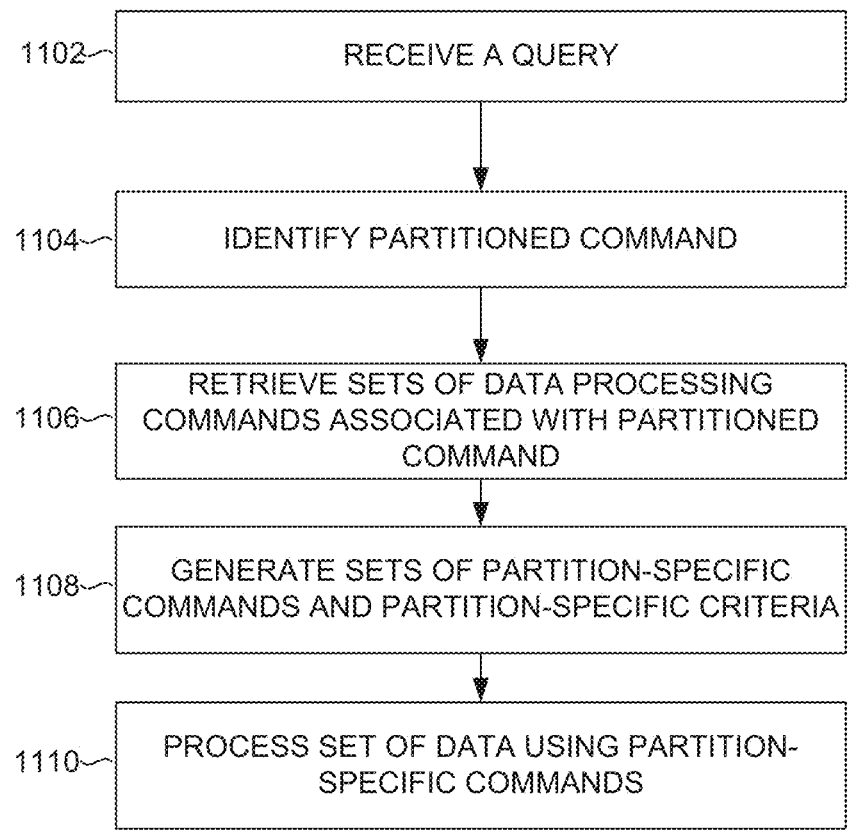
FIG. 11 is a flow diagram illustrating an embodiment of a routine implemented by the query system to generate partition-specific commands.

FIG. 11 is a flow diagram illustrating an embodiment of a routine 1100 implemented by the query system 114 to dynamically generate partition-specific commands and use the generated partition-specific commands to process and/or execute a query. Although described as being implemented by the query system 114, it will be understood that one or more elements outlined for routine 1100 can be implemented by one or more computing devices/components that are associated with the data processing system 140, such as the stream data processing system 142 and/or the stream data processing system 151. Thus, the following illustrative example should not be construed as limiting. The example routine 1100 can be implemented, for example, by a computing device that comprises a processor and a non-transitory computer-readable medium. The non-transitory computer readable medium can be storing instructions that, when executed by the processor, can cause the processor to perform the operations of the illustrated routine 1100.

At block 1102, the query system 114 receives a search query. The query system 114 may receive the query from the client device 106. In receiving the search query, the query system 114 may perform pre-processing on the query to confirm that the client device 106 has appropriate authorizations to request the query be executed. The client device 106 may also perform a semantic or syntax review of the query to verify that the query is a valid query. The client device 106 may also perform compilation of the query to an intermediate format to be executed by other devices supporting streaming, ingest, indexing, search or other data processing stages or modalities.

At block 1104, the query system 114 identifies a partitioned command. In some cases, the query system 114 identifies the partitioned command as part of parsing the query. In certain cases, the query system 114 identifies the partitioned command based on a partitioned command identifier in the query and/or using a lookup table, configuration file, and/or metadata catalog. For example, the query system 114 may identify the commands in a query and use a lookup table or configuration to identify the commands that are partitioned commands. In some cases, the query system 114 identifies a partitioned command based on a determination that the partitioned command is associated with one or more data processing commands, data processing command files, and/or data processing command directories. For example, if the query system 114 determines that there is a directory storing files with data processing commands for different sets of data, the query system 114 may determine that the command is a partitioned command.

At 1106, the query system 114 retrieves sets of data processing commands associated with the partitioned command. In some cases, the query system 114 retrieves the sets of data processing commands using the partitioned command. For example, the query system 114 may use the name or identifier of the partitioned command to identify the sets of data processing commands associated with it.

In some cases, the sets of data processing commands are stored separately such as in separate files of a filesystem directory or different sub-directories of a filesystem directory or in (volatile) memory. In certain cases, the query system 114 may use the identity of the partitioned command to lookup a directory in which the sets of data processing commands are stored. In some cases, the query system 114 may use the identity of the partitioned command to lookup a partitioned command record 506 for the partitioned command and use the partitioned command record 506 to locate the sets of data processing commands associated with the partitioned command. For example, the partitioned command record 506 may include a reference or pointer to the location where the sets of data processing commands are located.

In certain cases, the query system 114 may retrieve the sets of data processing commands based on or in response to receipt of the query, the identification of the partitioned command in the query, the passage of a predetermined time period, etc. In some cases, the query system 114 may retrieve the sets of data processing commands based on a determination that a set of data processing commands has been added, removed, or modified. For example, if the query system 114 determines that a user has added a set of data processing commands to a particular directory or location, it may retrieve the sets of data processing commands. Accordingly, it will be understood that the sets of data processing commands may be retrieved dynamically.

In certain cases, each set of data processing commands corresponds to a different function or function body. The sets of data processing command or functions may be created or generated by different users, different tenants, etc. In certain cases, the sets of data commands are developed asynchronously and without knowledge of other sets of data commands. For example, a user may develop a particular function for processing a particular set of data, while another user may develop another function to perform a similar process on a different set of data. Each of the functions may correspond to different sets of data processing commands associated with a partitioned command.

In some cases, the sets of data processing commands may be written or developed in different search processing languages. For example, one set of data processing commands may be written in SQL, while another set of data processing commands is written in SPL or SPL2, etc.

The various sets of commands may include or otherwise be associated with criteria (e.g., similar to partition criteria and/or partition-specific criteria) that indicates the data on which the set of commands is to operate. For example, if a particular set of commands includes or is associated with the criteria "loc=US," the particular set of data processing commands can be used to process data with a field value "US" for the field "loc."

At 1108, the query system 114 generates a body for the partitioned command. In certain cases, the generated body replaces an empty body or null body. In some cases, the generated body replaces an existing body.

In some cases, generating a body for the partitioned command may include generating partition-specific commands and/or partition-specific criteria for particular partitions or portions of data (e.g., data that satisfies the same criteria or partition-specific criteria). In certain cases, the query system 114 generates the body, partition-specific commands, and/or partition-specific criteria using the sets of data processing commands and corresponding criteria of the sets of data processing commands.

In some cases, the query system 114 generates a set of partition-specific commands using a corresponding set of data processing commands such that a particular set of partition-specific commands corresponds to a particular set of data processing commands. In certain cases, the query system 114 generates a set of partition-specific commands for each of the set of data processing commands.

In certain cases, the query system 114 translates a set of data processing commands from a first query language to a second query language to generate a corresponding set of partition-specific commands.

As described herein, the partition-specific commands may indicate how to process data that satisfies respective partition-specific criteria. The partition-specific criteria may include filters or other criteria used to identify the data that is to be processed by the respective partition-specific commands.

In some cases, the body of the partitioned command may take the form of a switch or else statement with the partition-specific criteria being used to determine which partition-specific commands are to be used to process the data. In certain cases, the body of the partitioned command may include a default partition or default criteria (e.g., no criteria) and include processing commands for data that does not satisfy the partition-specific criteria of some or all of the partition-specific commands.

At 1110, the query system 114 processes the query using the body of the partitioned command. As described herein, the query system 114 may process the query by identifying partitions or different portions of data to be processed by different commands using the partition-specific criteria.

In some cases, as part of processing the query the query system 114 assigns different portions (or partitions) of the data to different partition-specific commands based on the partition-specific criteria. In addition, during query execution, the query system 114 can process the data using the partition-specific commands.

In certain cases, based on the data to be processed by the partitioned command, the query system 114 may modify the query to include partition-specific commands that are to be used to process the set of data. For example, as described herein, there may be multiple sets of partition-specific commands but the set of data may only include data that will be processed by a subset of the sets of partition-specific commands. In some such cases, the query system 114 may include the sets of partition-specific commands that correspond to data in the set of data in a modified query and execute the modified query.

Fewer, more, or different commands may be used with the routine 1100. For example, any one or any combination of the blocks described herein with reference to routines 1000 may be included as part of routine 1100. For example, the query system 114 may modify the query prior to execution and/or further process the query. In some cases, further processing the query may include generating a query execution plan (e.g., that includes query instructions for different computing devices of the query system 114), a directed acyclic graph (DAG), etc. In certain cases, executing the query may include communicating some or all of the query instructions to different computing devices of the query system 114.

As another example, the query system 114 may generate the body of the partitioned command based on the data to be processed by the partitioned command. As described herein, the query system 114 may analyze the data to be processed (e.g., by reviewing partitioned dataset records 504) to identify fields, field values, and other characteristics of the data to be processed. In some cases, the query system 114 may compare the characteristics (e.g., fields, field values, keywords, etc.) of the data to be processed with the criteria of the sets of data processing commands 803. If the query system 114 determines that the criteria for a one or more sets of data processing commands will not be satisfied by the data to be processed, the query system 114 may not use the one or more sets of data processing commands to generate the body of the partitioned command. In this way, the query system 114 may reduce the quantity of sets of data processing commands 803 used to generate the body of the partitioned command and reduce processing time and power used to generate the body of the partitioned command.

6.0 EXAMPLE EMBODIMENTS

Various example embodiments of methods, systems, and non-transitory computer-readable media relating to features described herein can be found in the following clauses:

Clause 1: A method, comprising:
receiving a query, the query identifying data to be processed and a manner of processing the data;

identifying at least one partitioned command in the query;
identifying partition criteria associated with the at least one partitioned command;
identifying a set of data to be processed in accordance with the at least one partitioned command, wherein the set of data is a subset of the data identified by the query;
generating a plurality of partitions for the set of data based on the partition criteria;
identifying a set of partition-specific commands of the at least one partitioned command based on the partition criteria;
assigning the plurality of partitions to the set of partition-specific commands based on the partition criteria, wherein a particular partition of the set of data is assigned to a particular partition-specific command of the at least one partitioned command based on a matching value of the partition criteria for the particular partition and the particular partition-specific command; and
generating at least one instruction to process the plurality of partitions using the set of partition-specific commands, wherein the particular partition of the set of data is processed using the particular partition-specific command of the at least one partitioned command.

Clause 2: The method of clause 1, wherein identifying at least one partitioned command in the query comprises parsing the query to identify at least one command associated with the set of partition-specific commands.

Clause 3: The method of clause 1, wherein identifying at least one partitioned command in the query comprises:
parsing the query to identify a plurality of commands, the plurality of commands indicating the manner of processing the data; and
performing a lookup in a metadata catalog to identify the at least one partitioned command from the plurality of commands.

Clause 4: The method of clause 1, wherein identifying partition criteria associated with the at least one partitioned command comprises identifying at least one field identifier of at least one field used to assign data to different partitions.

Clause 5: The method of clause 1, wherein identifying partition criteria associated with the at least one partitioned command comprises analyzing a partitioned command record of a metadata catalog.

Clause 6: The method of clause 1, wherein identifying the set of data to be processed in accordance with the at least one partitioned command comprises identifying a result of processing data in accordance with another command of the query.

Clause 7: The method of clause 1, wherein identifying the set of data to be processed in accordance with the at least one partitioned command comprises identifying data retrieved from a data source.

Clause 8: The method of clause 1, wherein the partition criteria includes a field, wherein generating the plurality of partitions comprises assigning data records of the set of data to respective partitions of the plurality of partitions based on a field value in the data records, wherein the field value corresponds to the field.

Clause 9: The method of clause 1, wherein the partition criteria includes a field, wherein generating the plurality of partitions comprises identifying a field value associated with a data record of the set of data that corresponds to the field of the partition criteria, and assigning the data record to a partition of the plurality of partitions based on the field value.

Clause 10: The method of clause 1, wherein the partition criteria includes a first field and a second field, wherein generating the plurality of partitions comprises identifying a first field value associated with a data record of the set of data that corresponds to the first field of the partition criteria, identifying a second field value associated with the data record that corresponds to the second field of the partition criteria, and assigning the data record to a partition of the plurality of partitions based on the first field value and the second field value.

Clause 11: The method of clause 1, wherein identifying a set of partition-specific commands of the at least one partitioned command comprises parsing a partitioned command record of a metadata catalog to identify partition-specific commands that correspond to the at least one partitioned command.

Clause 12: The method of clause 1, wherein the partition criteria is a field, wherein generating the plurality of partitions comprises assigning the particular partition to the particular partition-specific command based on a determination that data in the particular partition includes a particular field value for the field and a determination that the particular partition-specific command is configured for use with data that includes the particular field value.

Clause 13: The method of clause 1, wherein the partition criteria includes a first field and a second field, wherein generating the plurality of partitions comprises assigning the particular partition to the particular partition-specific command based on a determination that data in the particular partition includes a first field value for the first field and a second field value for the second field and a determination that the particular partition-specific command is configured for use with data that includes the first field value and the second field value.

Clause 14: The method of clause 1, wherein the at least one partitioned command is a first partitioned command, the partition criteria is first partition criteria, the set of data is a first set of data, the plurality of partitions is a first plurality of partitions, the set of partition-specific commands is a first set of partition-specific commands, the particular partition is a first particular partition, the particular partition-specific command is a first particular partition-specific command, the matching value is a first matching value, the at least one instruction is a first at least one instruction, the method further comprising:
identifying at least one second partitioned command in the query;
identifying second partition criteria associated with the at least one second partitioned command;
identifying a second set of data to be processed in accordance with the at least one second partitioned command, wherein the second set of data is a subset of the data identified by the query;
generating a second plurality of partitions for the second set of data based on the second partition criteria;
identifying a second set of partition-specific commands of the at least one second partitioned command based on the second partition criteria;
assigning the second plurality of partitions to the second set of partition-specific commands based on the second partition criteria, wherein a second particular partition of the second set of data is assigned to a second particular partition-specific command of the at least one partitioned command based on a second matching value of the second partition criteria for the second particular partition and the second particular partition-specific command;

generating a second at least one instruction to process the second plurality of partitions using the second set of partition-specific commands, wherein the second particular partition of the second set of data is processed using the second particular partition-specific command of the at least one second partitioned command.

Clause 15: A system, comprising:

a data store; and one or more processors configured to:

receive a query, the query identifying data to be processed and a manner of processing the data;

identify at least one partitioned command in the query;

identify partition criteria associated with the at least one partitioned command;

identify a set of data to be processed in accordance with the at least one partitioned command, wherein the set of data is a subset of the data identified by the query;

generate a plurality of partitions for the set of data based on the partition criteria;

identify a set of partition-specific commands of the at least one partitioned command based on the partition criteria;

assign the plurality of partitions to the set of partition-specific commands based on the partition criteria, wherein a particular partition of the set of data is assigned to a particular partition-specific command of the at least one partitioned command based on a matching value of the partition criteria for the particular partition and the particular partition-specific command; and generate at least one instruction to process the plurality of partitions using the set of partition-specific commands, wherein the particular partition of the set of data is processed using the particular partition-specific command of the at least one partitioned command.

Clause 16: The system of clause 15, wherein the partition criteria includes a field, wherein to generate the plurality of partitions, the one or more processors are configured to assign data records of the set of data to respective partitions of the plurality of partitions based on a field value in the data records, wherein the field value corresponds to the field.

Clause 17: The system of clause 15, wherein the partition criteria includes a first field and a second field, wherein to generate the plurality of partitions, the one or more processors are configured to identify a first field value associated with a data record of the set of data that corresponds to the first field of the partition criteria, identify a second field value associated with the data record that corresponds to the second field of the partition criteria, and assign the data record to a partition of the plurality of partitions based on the first field value and the second field value.

Clause 18: Non-transitory computer-readable media including computer-executable instructions that, when executed by a computing system, cause the computing system to:

receive a query, the query identifying data to be processed and a manner of processing the data;

identify at least one partitioned command in the query;

identify partition criteria associated with the at least one partitioned command;

identify a set of data to be processed in accordance with the at least one partitioned command, wherein the set of data is a subset of the data identified by the query;

generate a plurality of partitions for the set of data based on the partition criteria;

identify a set of partition-specific commands of the at least one partitioned command based on the partition criteria;

assign the plurality of partitions to the set of partition-specific commands based on the partition criteria, wherein a particular partition of the set of data is assigned to a particular partition-specific command of the at least one partitioned command based on a matching value of the partition criteria for the particular partition and the particular partition-specific command; and generate at least one instruction to process the plurality of partitions using the set of partition-specific commands, wherein the particular partition of the set of data is processed using the particular partition-specific command of the at least one partitioned command.

Clause 19: The non-transitory computer-readable media of clause 18, wherein to identify a set of partition-specific commands of the at least one partitioned command, the computer-executable instructions cause the computing system to analyze a partitioned command record of a metadata catalog to identify partition-specific commands that correspond to the at least one partitioned command.

Clause 20: The non-transitory computer-readable media of clause 18, wherein the partition criteria is a field, wherein to generate the plurality of partitions, the computer-executable instructions cause the computing system to assign the particular partition to the particular partition-specific command based on a determination that data in the particular partition includes a particular field value for the field and a determination that the particular partition-specific command is configured for use with data that includes the particular field value.

Additional examples may be found in the following clauses.

Clause 1: A method, comprising:

receiving a query for execution;

identifying, in the query, a data source identifier, the data source identifier corresponding to a data source that includes a set of data to be processed;

identifying, in the query, a data field identifier associated with a command, wherein the command indicates a manner of processing at least a portion of the set of data;

identifying a partitioned dataset associated with the data source;

identifying, using a metadata catalog, a set of partitions of the partitioned dataset that include a data field that satisfies the data field identifier;

modifying the query to include, as filter criteria, a partition identifier for each of the set of partitions; and executing the modified query.

Clause 2: The method of clause 1, wherein the partitioned dataset includes a plurality of partitions, wherein each of the plurality of partitions includes data records that satisfy partition criteria for the respective partition, and wherein the set of partitions is a subset of the plurality of partitions.

Clause 3: The method of clause 2, wherein the partition criteria for a particular partition of the plurality of partitions includes one or more field values.

Clause 4: The method of clause 2, wherein the metadata catalog includes a plurality of partitioned dataset records corresponding to a plurality of partitioned datasets, wherein the plurality of partitioned datasets includes the partitioned dataset, wherein a particular partitioned dataset record corresponding to the partitioned dataset identifies a plurality of partitions of the partitioned dataset including the set of partitions.

Clause 5: The method of clause 1, wherein the data field identifier is a first data field identifier and the command is a first command, the method further comprising:
  identifying, in the query, a second data field identifier associated with a second command;
  wherein identifying, using the metadata catalog, a set of partitions of the partitioned dataset that include a data field that satisfies the data field identifier comprises identifying, using the metadata catalog, a set of partitions of the partitioned dataset that include a first data field that satisfies the first field identifier and a second data field that satisfies the second field identifier;

Clause 6: The method of clause 1, wherein identifying a partitioned dataset associated with the data source comprises analyzing a data source record of the metadata catalog, wherein the data source record includes a partitioned dataset identifier indicating that the data source includes at least a portion of the partitioned dataset.

Clause 7: The method of clause 6, wherein identifying a set of partitions of the partitioned dataset that include a data field that satisfies the data field identifier comprises analyzing a partitioned dataset record of the metadata catalog, wherein the partitioned dataset record identifies field identifiers associated with a plurality of partitions of the partitioned dataset, wherein the field identifiers indicate how data is assigned to one of the plurality of partitions.

Clause 8: The method of clause 1, wherein the partitioned dataset includes a plurality of partitions, wherein data of a partitioned dataset is assigned to one of the plurality of partitions at ingest.

Clause 9: The method of clause 1, wherein the partitioned dataset includes a plurality of partitions, wherein criteria for assigning data to one of the plurality of partitions is selected by a user.

Clause 10: A system, comprising:
  a data store; and
  one or more processors configured to:
    receive a query for execution;
    identify, in the query, a data source identifier, the data source identifier corresponding to a data source that includes a set of data to be processed;
    identify, in the query, a data field identifier associated with a command, wherein the command indicates a manner of processing at least a portion of the set of data;
    identify a partitioned dataset associated with the data source;
    identify, using a metadata catalog, a set of partitions of the partitioned dataset that include a data field that satisfies the data field identifier;
    modify the query to include, as filter criteria, a partition identifier for each of the set of partitions; and
    execute the modified query.

Clause 11: The system of clause 10, wherein the partitioned dataset includes a plurality of partitions, wherein each of the plurality of partitions includes data records that satisfy partition criteria for the respective partition, and wherein the set of partitions is a subset of the plurality of partitions.

Clause 12: The system of clause 11, wherein the partition criteria for a particular partition of the plurality of partitions includes one or more field values.

Clause 13: The system of clause 11, wherein the metadata catalog includes a plurality of partitioned dataset records corresponding to a plurality of partitioned datasets, wherein the plurality of partitioned datasets includes the partitioned dataset, wherein a particular partitioned dataset record corresponding to the partitioned dataset identifies a plurality of partitions of the partitioned dataset including the set of partitions.

Clause 14: The system of clause 10, wherein the data field identifier is a first data field identifier and the command is a first command, wherein the one or more processors are further configured to:
  identify, in the query, a second data field identifier associated with a second command;
  wherein to identify, using the metadata catalog, a set of partitions of the partitioned dataset that include a data field that satisfies the data field identifier the one or more processors are configured to identify, using the metadata catalog, a set of partitions of the partitioned dataset that include a first data field that satisfies the first field identifier and a second data field that satisfies the second field identifier;

Clause 15: The system of clause 10, wherein to identify a partitioned dataset associated with the data source, the one or more processors are configured to analyze a data source record of the metadata catalog, wherein the data source record includes a partitioned dataset identifier indicating that the data source includes at least a portion of the partitioned dataset.

Clause 16: The system of clause 15, wherein to identify a set of partitions of the partitioned dataset that include a data field that satisfies the data field identifier, the one or more processors are configured to analyze a partitioned dataset record of the metadata catalog, wherein the partitioned dataset record identifies field identifiers associated with a plurality of partitions of the partitioned dataset, wherein the field identifiers indicate how data is assigned to one of the plurality of partitions.

Clause 17: The system of clause 10, wherein the partitioned dataset includes a plurality of partitions, wherein data of a partitioned dataset is assigned to one of the plurality of partitions at ingest.

Clause 18: The system of clause 10, wherein the partitioned dataset includes a plurality of partitions, wherein criteria for assigning data to one of the plurality of partitions is selected by a user.

Clause 19: Non-transitory computer-readable media including computer-executable instructions that, when executed by a computing system, cause the computing system to:
  receive a query for execution;
  identify, in the query, a data source identifier, the data source identifier corresponding to a data source that includes a set of data to be processed;
  identify, in the query, a data field identifier associated with a command, wherein the command indicates a manner of processing at least a portion of the set of data;
  identify a partitioned dataset associated with the data source;
  identify, using a metadata catalog, a set of partitions of the partitioned dataset that include a data field that satisfies the data field identifier;
  modify the query to include, as filter criteria, a partition identifier for each of the set of partitions; and
  execute the modified query.

Clause 20: The non-transitory computer-readable media of clause 19, wherein to identify a set of partitions of the partitioned dataset that include a data field that satisfies the data field identifier, the computer-executable instructions cause the computing system to analyze a partitioned dataset record of the metadata catalog, wherein the partitioned dataset record identifies field identifiers associated with a plurality of partitions of the partitioned dataset, wherein the field identifiers indicate how data is assigned to one of the plurality of partitions.

Additional examples may be found in the following clauses.

Clause 1: A method, comprising:
receiving a query, the query identifying data to be processed and a manner of processing the data;
identifying at least one partitioned command in the query;
identifying a set of data to be processed in accordance with the at least one partitioned command,
retrieving a plurality of sets of data processing commands associated with the at least one partitioned command;
generating a body for the at least one partitioned command, wherein generating the body for the at least one partitioned command comprises generating a plurality of sets of partition-specific commands and a plurality of sets of partition-specific criteria based on the plurality of sets of data processing commands, wherein each set of partition-specific commands of the plurality of sets of partition-specific commands corresponds to a respective set of partition-specific criteria of the plurality of sets of partition-specific criteria; and
processing the query using the plurality of sets of partition-specific commands based on the plurality of sets for partition criteria.

Clause 2: The method of clause 1, wherein processing the set of data using the plurality of sets of partition-specific commands based on the plurality of sets for partition-specific criteria comprises:
assigning different portions of the set of data to the plurality of sets of partition-specific commands based on the plurality of sets of partition-specific criteria, wherein a particular portion of the set of data is assigned to a particular set of partition-specific commands of the plurality of sets of partition-specific commands based on the particular portion of the set of data satisfying a particular set of partition-specific criteria corresponding to the particular set of partition-specific commands; and
generating, based on the assigning, at least one instruction to process the particular portion of the set of data using the particular set of partition-specific commands, wherein the particular portion of the set of data is processed using the particular set of partition-specific commands.

Clause 3: The method of clause 2, wherein the particular set of partition-specific criteria comprises a field identifier and a field value corresponding to the field identifier.

Clause 4: The method of clause 1, wherein the plurality of sets of partition-specific commands are generated in response to the identifying at least one partitioned command in the query.

Clause 5: The method of clause 1, wherein the plurality of sets of partition-specific commands are generated each time a query is received.

Clause 6: The method of clause 1, wherein the plurality of sets of partition-specific commands are generated at a periodic time interval.

Clause 7: The method of clause 1, wherein each set of data processing commands of the plurality of sets of data processing commands is stored in a separate file.

Clause 8: The method of clause 1, wherein the plurality of sets of data processing commands are stored in a same directory.

Clause 9: The method of clause 1, wherein generating a plurality of sets of partition-specific commands and a plurality of sets of partition-specific criteria for the at least one partitioned command comprises modifying a partitioned command record of a metadata catalog.

Clause 10: The method of clause 1, wherein identifying at least one partitioned command in the query comprises parsing the query to identify a plurality of commands, the plurality of commands indicating the manner of processing the data; and performing a lookup in a metadata catalog to identify the at least one partitioned command from the plurality of commands.

Clause 11: The method of clause 1, wherein identifying the set of data to be processed in accordance with the at least one partitioned command comprises identifying a result of processing data in accordance with another command of the query.

Clause 12: The method of clause 1, wherein identifying the set of data to be processed in accordance with the at least one partitioned command comprises identifying data retrieved from a data source.

Clause 13: The method of claim 2, wherein the partition criteria includes a field, wherein assigning different portions of the set of data to the plurality of sets of partition-specific commands comprises identifying a field value associated with a data record of the set of data that corresponds to the field of the partition criteria, and assigning the data record to a partition-specific command based on the field value.

Clause 14: The method of claim 2, wherein the partition criteria includes a first field and a second field, wherein assigning different portions of the set of data to the plurality of sets of partition-specific commands comprises identifying a first field value associated with a data record of the set of data that corresponds to the first field of the partition criteria, identifying a second field value associated with the data record that corresponds to the second field of the partition criteria, and assigning the data record to a partition-specific command based on the first field value and the second field value.

Clause 15: The method of claim 2, wherein the particular set of partition-specific commands comprises a plurality of partition-specific commands.

Clause 16: The method of clause 1, wherein each set of partition-specific commands of the plurality of partition-specific commands corresponds to a respective set of data processing commands of the plurality of data processing commands.

Clause 17: A system, comprising:
at least one processor configured to:
receive a query, the query identifying data to be processed and a manner of processing the data;
identify at least one partitioned command in the query;
identify a set of data to be processed in accordance with the at least one partitioned command,
retrieve a plurality of sets of data processing commands associated with the at least one partitioned command;
generate a body for the at least one partitioned command, wherein to generate the body for the at least one partitioned command, the at least one processor is configured to generate a plurality of sets of partition-specific commands and a plurality of sets of partition-specific criteria based on the plurality of sets of data processing commands, wherein each set of partition-specific commands of the plurality of sets of partition-specific commands corresponds to a respective set of partition-specific criteria of the plurality of sets of partition-specific criteria; and process the query using the plurality of sets of partition-specific commands based on the plurality of sets for partition criteria.

Clause 18: The system of clause 17, wherein to process the set of data using the plurality of sets of partition-specific commands based on the plurality of sets for partition-specific criteria, the at least one processor is configured to:
  assign different portions of the set of data to the plurality of sets of partition-specific commands based on the plurality of sets of partition-specific criteria, wherein a particular portion of the set of data is assigned to a particular set of partition-specific commands of the plurality of sets of partition-specific commands based on the particular portion of the set of data satisfying a particular set of partition-specific criteria corresponding to the particular set of partition-specific commands; and
  generate, based on the assignment, at least one instruction to process the particular portion of the set of data using the particular set of partition-specific commands, wherein the particular portion of the set of data is processed using the particular set of partition-specific commands.

Clause 19: Non-transitory computer-readable media including computer-executable instructions that, when executed by a computing system, cause the computing system to:
  receive a query, the query identifying data to be processed and a manner of processing the data;
  identify at least one partitioned command in the query;
  identify a set of data to be processed in accordance with the at least one partitioned command,
  retrieve a plurality of sets of data processing commands associated with the at least one partitioned command;
  generate a body for the at least one partitioned command, wherein to generate the body for the at least one partitioned command, the computer-executable instructions cause the computing system to generate a plurality of sets of partition-specific commands and a plurality of sets of partition-specific criteria based on the plurality of sets of data processing commands, wherein each set of partition-specific commands of the plurality of sets of partition-specific commands corresponds to a respective set of partition-specific criteria of the plurality of sets of partition-specific criteria; and
  process the query using the plurality of sets of partition-specific commands based on the plurality of sets for partition criteria.

Clause 20: The non-transitory computer-readable media of clause 19, wherein to process the set of data using the plurality of sets of partition-specific commands based on the plurality of sets for partition-specific criteria, the computer-executable instructions cause the computing system to:
  assign different portions of the set of data to the plurality of sets of partition-specific commands based on the plurality of sets of partition-specific criteria, wherein a particular portion of the set of data is assigned to a particular set of partition-specific commands of the plurality of sets of partition-specific commands based on the particular portion of the set of data satisfying a particular set of partition-specific criteria corresponding to the particular set of partition-specific commands; and
  generate, based on the assignment, at least one instruction to process the particular portion of the set of data using the particular set of partition-specific commands, wherein the particular portion of the set of data is processed using the particular set of partition-specific commands.

Additional examples may be found in the following clauses.

Clause 1: A method, comprising:
  receiving a query, the query identifying a set of data to be processed and a manner of processing the set of data;
  identifying, in the query, at least one command used to process the set of data and at least one field identifier associated with the at least one command;
  identifying a plurality of partitioned datasets within the set of data, the plurality of partitioned datasets distributed across multiple data sources;
  identifying, using a metadata catalog, data fields associated with each of the plurality of partitioned datasets;
  identifying a set of partitioned datasets of the plurality of partitioned datasets that include the at least one field;
  dedicating distinct compute resources to process each partitioned dataset of the set of partitioned datasets;
  executing the modified query.

7.0. TERMINOLOGY

Computer programs typically comprise one or more instructions set at various times in various memory devices of a computing device, which, when read and executed by at least one processor, will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Furthermore, use of "e.g.," is to be interpreted as providing a non-limiting example and does not imply that two things are identical or necessarily equate to each other.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices.

Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112 (f) (AIA), other aspects may likewise be embodied as a means-plus-function claim, or in other forms, such as being embodied in a computer-readable medium. Any claims intended to be treated under 35 U.S.C. § 112 (f) will begin with the words "means for," but use of the term "for" in any other context is not intended to invoke treatment under 35 U.S.C. § 112 (f). Accordingly, the applicant reserves the right to pursue additional claims after filing this application, in either this application or in a continuing application.

What is claimed is:

1. A method, comprising:
   receiving a query for execution;
   identifying, in the query, a data source identifier, the data source identifier corresponding to a data source that includes a set of data to be processed;
   identifying, in the query, a data field identifier associated with a command, wherein the command indicates a manner of processing at least a portion of the set of data;
   identifying a partitioned dataset associated with the data source identified in the query;
   identifying, using a metadata catalog, a set of partitions of the partitioned dataset that include a data field that satisfies the data field identifier in the query;
   modifying the query to include, as filter criteria, a partition identifier for each of the set of partitions that include the data field represented by the data field identifier in the query; and
   executing the modified query.

2. The method of claim 1, wherein the partitioned dataset includes a plurality of partitions, wherein each of the plurality of partitions includes data records that satisfy partition criteria for the respective partition, and wherein the set of partitions is a subset of the plurality of partitions.

3. The method of claim 2, wherein the partition criteria for a particular partition of the plurality of partitions includes one or more field values.

4. The method of claim 2, wherein the metadata catalog includes a plurality of partitioned dataset records corresponding to a plurality of partitioned datasets, wherein the plurality of partitioned datasets includes the partitioned dataset, wherein a particular partitioned dataset record corresponding to the partitioned dataset identifies the plurality of partitions of the partitioned dataset including the set of partitions.

5. The method of claim 1, wherein the data field identifier is a first data field identifier and the command is a first command, the method further comprising:
   identifying, in the query, a second data field identifier associated with a second command;
   wherein identifying, using the metadata catalog, the set of partitions of the partitioned dataset that include the data field that satisfies the data field identifier comprises identifying, using the metadata catalog, the set of partitions of the partitioned dataset that include a first data field that satisfies the first field identifier and a second data field that satisfies the second field identifier.

6. The method of claim 1, wherein identifying the partitioned dataset associated with the data source comprises analyzing a data source record of the metadata catalog, wherein the data source record includes a partitioned dataset identifier indicating that the data source includes at least a portion of the partitioned dataset.

7. The method of claim 6, wherein identifying the set of partitions of the partitioned dataset that include the data field that satisfies the data field identifier comprises analyzing a partitioned dataset record of the metadata catalog, wherein the partitioned dataset record identifies field identifiers associated with a plurality of partitions of the partitioned dataset, wherein the field identifiers indicate how data is assigned to one of the plurality of partitions.

8. The method of claim 1, wherein the partitioned dataset includes a plurality of partitions, wherein data of the partitioned dataset is assigned to one of the plurality of partitions at ingest.

9. The method of claim 1, wherein the partitioned dataset includes a plurality of partitions, wherein criteria for assigning data to one of the plurality of partitions is selected by a user.

10. A system, comprising:
    a data store; and
    one or more processors configured to:
    receive a query for execution;
    identify, in the query, a data source identifier, the data source identifier corresponding to a data source that includes a set of data to be processed;
    identify, in the query, a data field identifier associated with a command, wherein the command indicates a manner of processing at least a portion of the set of data;
    identify a partitioned dataset associated with the data source identified in the query;
    identify, using a metadata catalog, a set of partitions of the partitioned dataset that include a data field that satisfies the data field identifier in the query;
    modify the query to include, as filter criteria, a partition identifier for each of the set of partitions that include the data field represented by the data field identifier in the query; and
    execute the modified query.

11. The system of claim 10, wherein the partitioned dataset includes a plurality of partitions, wherein each of the plurality of partitions includes data records that satisfy partition criteria for the respective partition, and wherein the set of partitions is a subset of the plurality of partitions.

12. The system of claim 11, wherein the partition criteria for a particular partition of the plurality of partitions includes one or more field values.

13. The system of claim 11, wherein the metadata catalog includes a plurality of partitioned dataset records corresponding to a plurality of partitioned datasets, wherein the plurality of partitioned datasets includes the partitioned dataset, wherein a particular partitioned dataset record corresponding to the partitioned dataset identifies the plurality of partitions of the partitioned dataset including the set of partitions.

14. The system of claim 10, wherein the data field identifier is a first data field identifier and the command is a first command, wherein the one or more processors are further configured to:
    identify, in the query, a second data field identifier associated with a second command;
    wherein to identify, using the metadata catalog, the set of partitions of the partitioned dataset that include the data field that satisfies the data field identifier the one or more processors are configured to identify, using the metadata catalog, the set of partitions of the partitioned dataset that include a first data field that satisfies the first field identifier and a second data field that satisfies the second field identifier.

15. The system of claim 10, wherein to identify the partitioned dataset associated with the data source, the one or more processors are configured to analyze a data source record of the metadata catalog, wherein the data source record includes a partitioned dataset identifier indicating that the data source includes at least a portion of the partitioned dataset.

16. The system of claim 15, wherein to identify the set of partitions of the partitioned dataset that include the data field that satisfies the data field identifier, the one or more processors are configured to analyze a partitioned dataset record of the metadata catalog, wherein the partitioned dataset record identifies field identifiers associated with a plurality of partitions of the partitioned dataset, wherein the field identifiers indicate how data is assigned to one of the plurality of partitions.

17. The system of claim 10, wherein the partitioned dataset includes a plurality of partitions, wherein data of the partitioned dataset is assigned to one of the plurality of partitions at ingest.

18. The system of claim 10, wherein the partitioned dataset includes a plurality of partitions, wherein criteria for assigning data to one of the plurality of partitions is selected by a user.

19. Non-transitory computer-readable media including computer-executable instructions that, when executed by a computing system, cause the computing system to:
   receive a query for execution;
   identify, in the query, a data source identifier, the data source identifier corresponding to a data source that includes a set of data to be processed;
   identify, in the query, a data field identifier associated with a command, wherein the command indicates a manner of processing at least a portion of the set of data;
   identify a partitioned dataset associated with the data source identified in the query;
   identify, using a metadata catalog, a set of partitions of the partitioned dataset that include a data field that satisfies the data field identifier in the query;
   modify the query to include, as filter criteria, a partition identifier for each of the set of partitions that include the data field represented by the data field identifier in the query; and
   execute the modified query.

20. The non-transitory computer-readable media of claim 19, wherein to identify the set of partitions of the partitioned dataset that include the data field that satisfies the data field identifier, the computer-executable instructions cause the computing system to analyze a partitioned dataset record of the metadata catalog, wherein the partitioned dataset record identifies field identifiers associated with a plurality of partitions of the partitioned dataset, wherein the field identifiers indicate how data is assigned to one of the plurality of partitions.

* * * * *